United States Patent
Yoshikawa et al.

(10) Patent No.: US 9,751,013 B2
(45) Date of Patent: Sep. 5, 2017

(54) STORAGE MEDIUM, INFORMATION PROCESSING SYSTEM, AND INFORMATION PROCESSING METHOD FOR ADJUSTING IMAGES BASED ON MOVEMENT INFORMATION

(75) Inventors: Kazuhiro Yoshikawa, Kyoto (JP); Hitoshi Yamagami, Kyoto (JP); Toshio Noguchi, Suginami-ku (JP)

(73) Assignee: NINTENDO CO., LTD., Kyoto (JP)

( * ) Notice: Subject to any disclaimer, the term of this patent is extended or adjusted under 35 U.S.C. 154(b) by 2049 days.

(21) Appl. No.: 12/827,172

(22) Filed: Jun. 30, 2010

(65) Prior Publication Data

US 2011/0169866 A1   Jul. 14, 2011

(30) Foreign Application Priority Data

Jan. 8, 2010   (JP) .................................. 2010-003089

(51) Int. Cl.
| | |
|---|---|
| G09G 5/00 | (2006.01) |
| A63F 13/428 | (2014.01) |
| A63F 13/5255 | (2014.01) |
| G09G 5/391 | (2006.01) |
| A63F 13/5375 | (2014.01) |

(Continued)

(52) U.S. Cl.
CPC ........ *A63F 13/428* (2014.09); *A63F 13/5255* (2014.09); *G09G 5/391* (2013.01); *A63F 13/211* (2014.09); *A63F 13/44* (2014.09); *A63F 13/5375* (2014.09); *A63F 2300/306* (2013.01); *A63F 2300/6045* (2013.01); *A63F 2300/6676* (2013.01); *G06F 3/016* (2013.01); *G06F 3/038* (2013.01); *G06F 3/0346* (2013.01);

(Continued)

(58) Field of Classification Search
CPC ........ G06F 3/016; G06F 3/038; G06F 3/0346; A63F 13/428; A63F 13/5375; A63F 13/5255; A63F 13/44; A63F 13/211; A63F 2300/306; A63F 2300/6045; A63F 2300/6676; G09G 5/391; G09G 2320/0261; G09G 2354/00
USPC .............................. 345/156–158; 463/30–37
See application file for complete search history.

(56) References Cited

U.S. PATENT DOCUMENTS

2005/0227762 A1* 10/2005 Tahara et al. ................... 463/30
2006/0025218 A1*  2/2006 Hotta .............................. 463/37

(Continued)

FOREIGN PATENT DOCUMENTS

JP      2007-236697        9/2007

OTHER PUBLICATIONS

"Nintendo authorized guidebook, Mario and Sonic at Beijing Olympics (Wii version)", Shogakkukan, (Feb. 2, 2008), pp. 66-67, with a partial translation.

(Continued)

*Primary Examiner* — Jin-Cheng Wang
(74) *Attorney, Agent, or Firm* — Nixon & Vanderhye P.C.

(57) ABSTRACT

First, movement information that allows calculation of a movement of a first input device is sequentially obtained. During a time period in which at least one operation key is in a predetermined input state, a display image is enlarged or reduced in accordance with a change of the movement information. When it is determined that the predetermined input state is canceled, the enlarged or reduced display image is caused to return to its original magnification and an action of at least one first object in the display image is controlled.

7 Claims, 25 Drawing Sheets

(51) Int. Cl.
    *A63F 13/44*     (2014.01)
    *A63F 13/211*     (2014.01)
    *G06F 3/01*     (2006.01)
    *G06F 3/0346*     (2013.01)
    *G06F 3/038*     (2013.01)

(52) U.S. Cl.
    CPC ............ *G06F 2203/04806* (2013.01); *G09G 2320/0261* (2013.01); *G09G 2354/00* (2013.01)

(56) References Cited

U.S. PATENT DOCUMENTS

| | | | |
|---|---|---|---|
| 2007/0211027 A1* | 9/2007 | Ohta | 345/158 |
| 2007/0213128 A1* | 9/2007 | Ohta | 463/36 |
| 2008/0079691 A1* | 4/2008 | Kuboyama et al. | 345/156 |
| 2008/0117167 A1* | 5/2008 | Aonuma et al. | 345/157 |
| 2009/0208191 A1* | 8/2009 | Imai et al. | 386/126 |
| 2010/0001953 A1* | 1/2010 | Yamamoto et al. | 345/158 |
| 2010/0083317 A1* | 4/2010 | Inagaki et al. | 725/44 |
| 2010/0092155 A1* | 4/2010 | Inagaki et al. | 386/96 |
| 2010/0302392 A1* | 12/2010 | Tanabe et al. | 348/211.99 |
| 2010/0304858 A1* | 12/2010 | Asuke et al. | 463/31 |

OTHER PUBLICATIONS

"Red Steel operation manual", RVL-REDJ-JPN, UBISOFT, (Dec. 2, 2006), p. 18 (firing a gun), P20 (zoom-in), with a partial translation.

* cited by examiner

F I G. 1
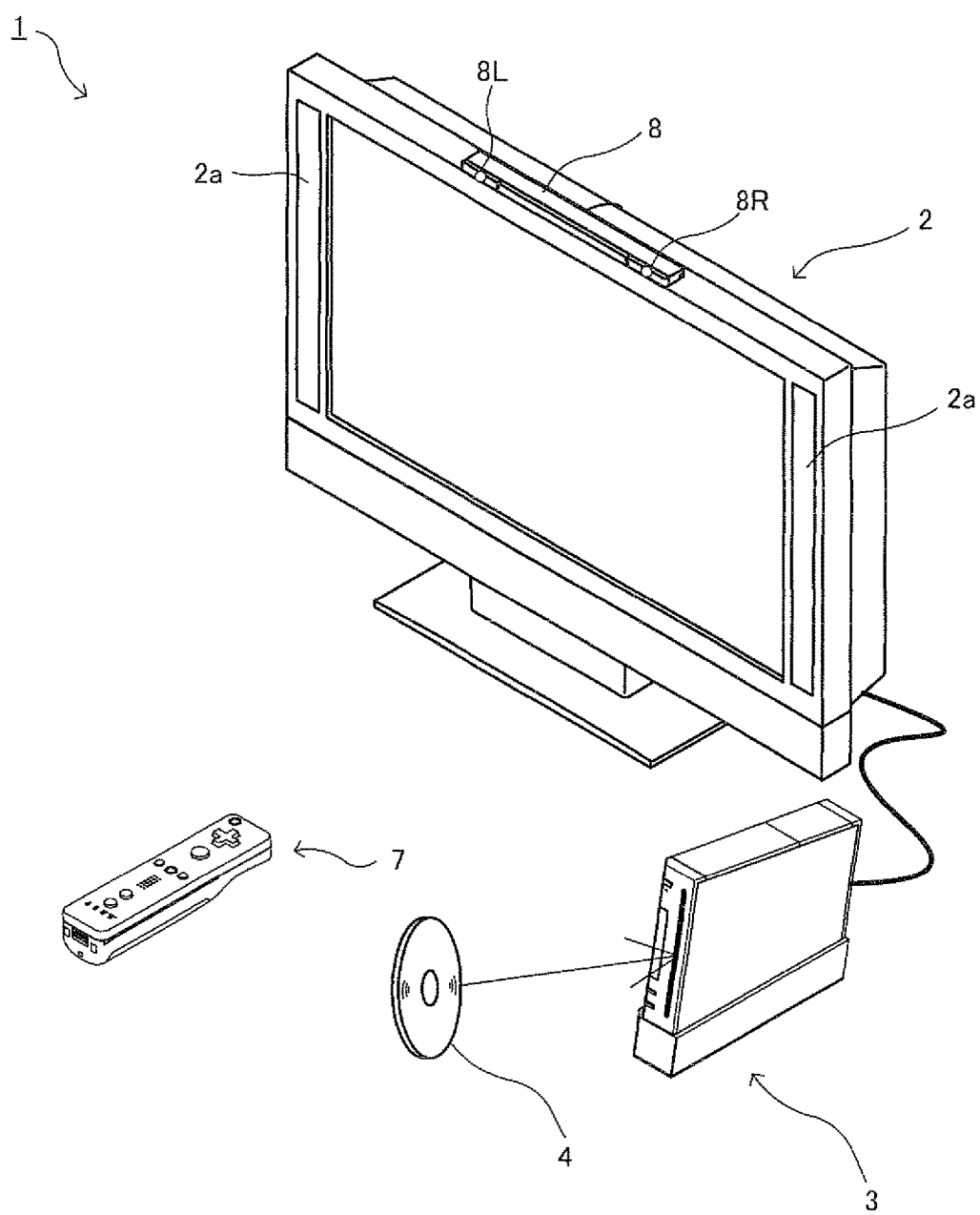

F I G. 3
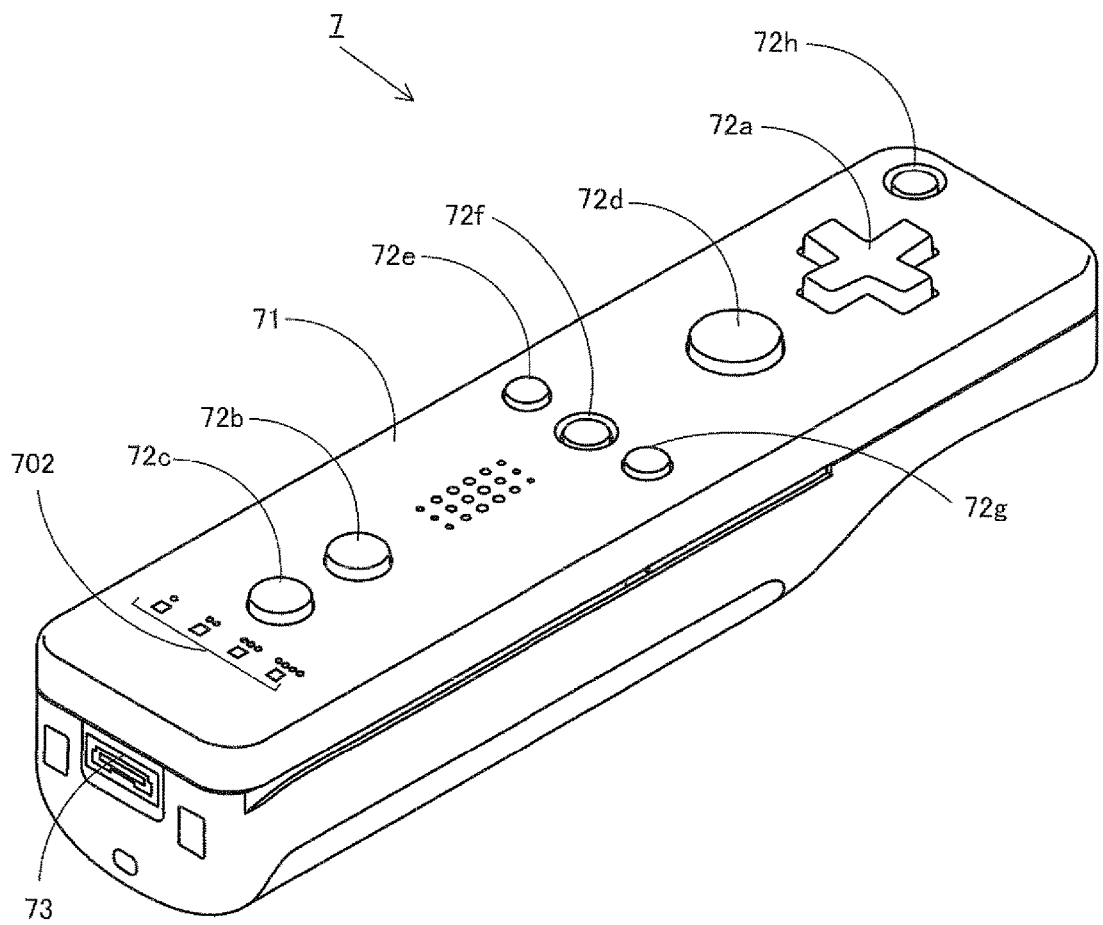
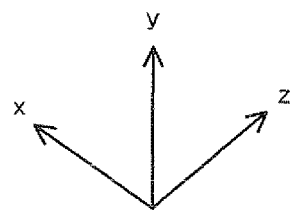

F I G. 6
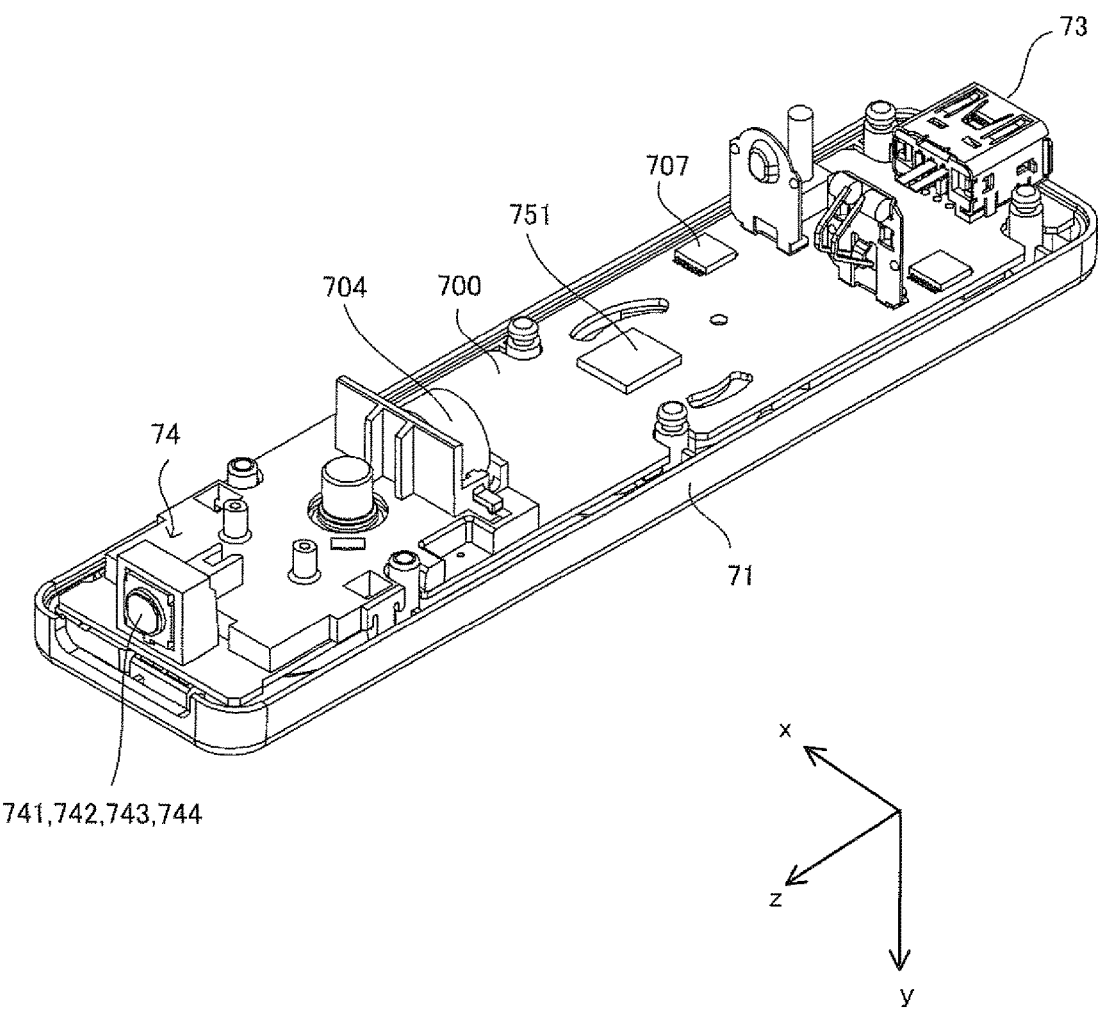

F I G. 1 4
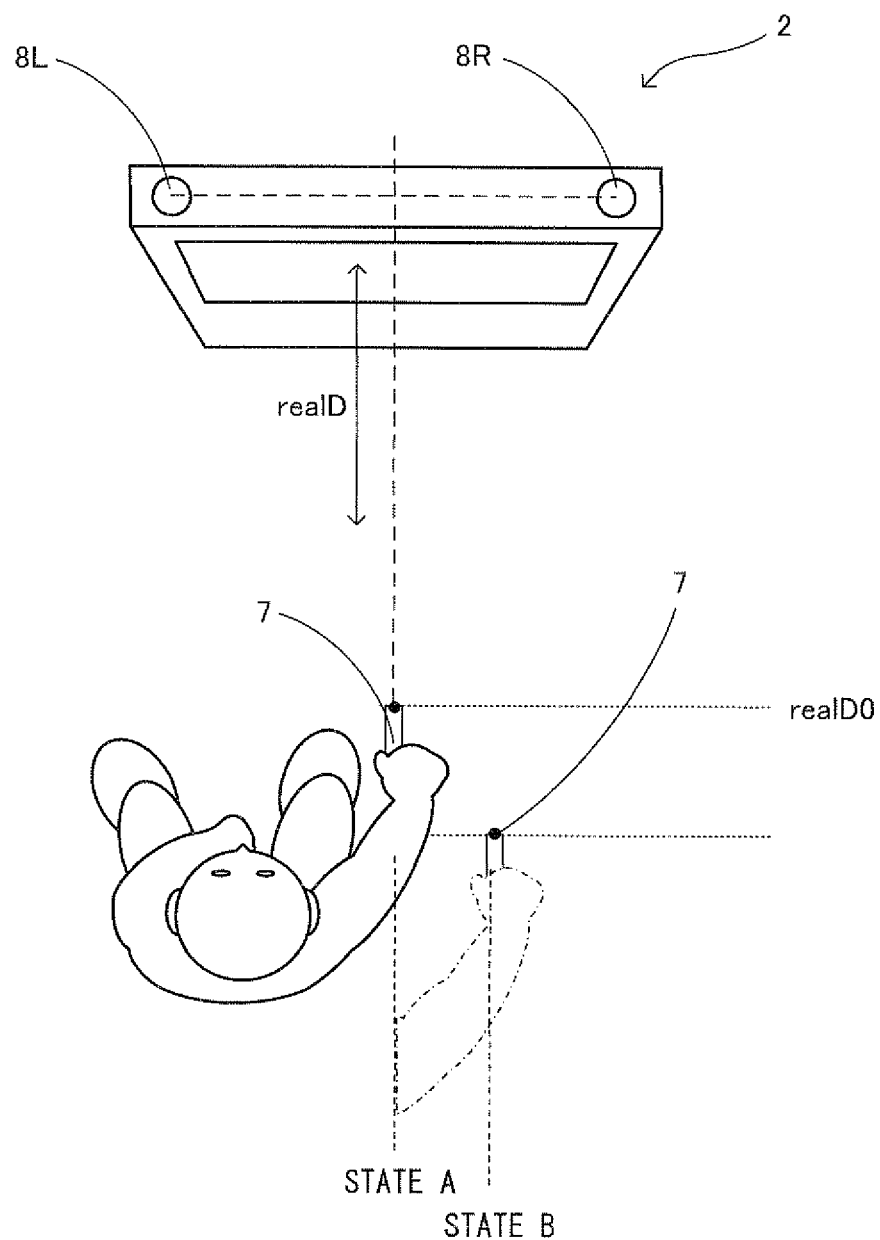

FIG. 20
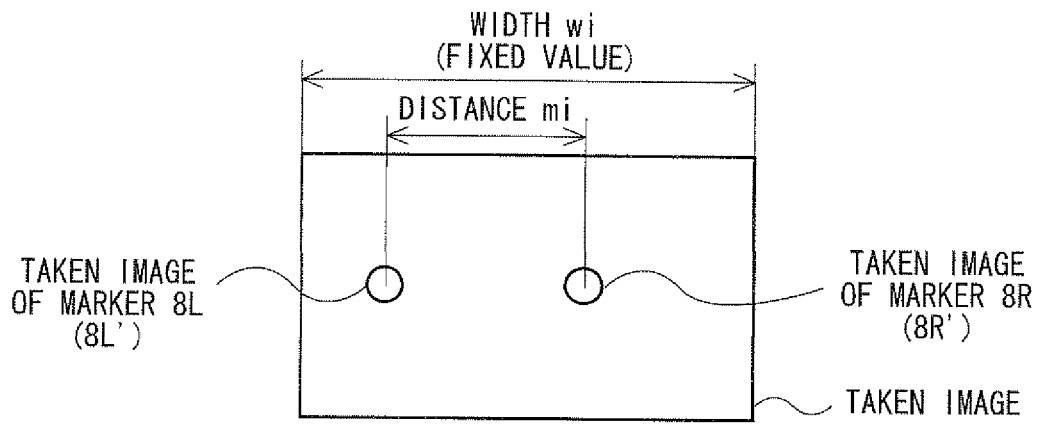
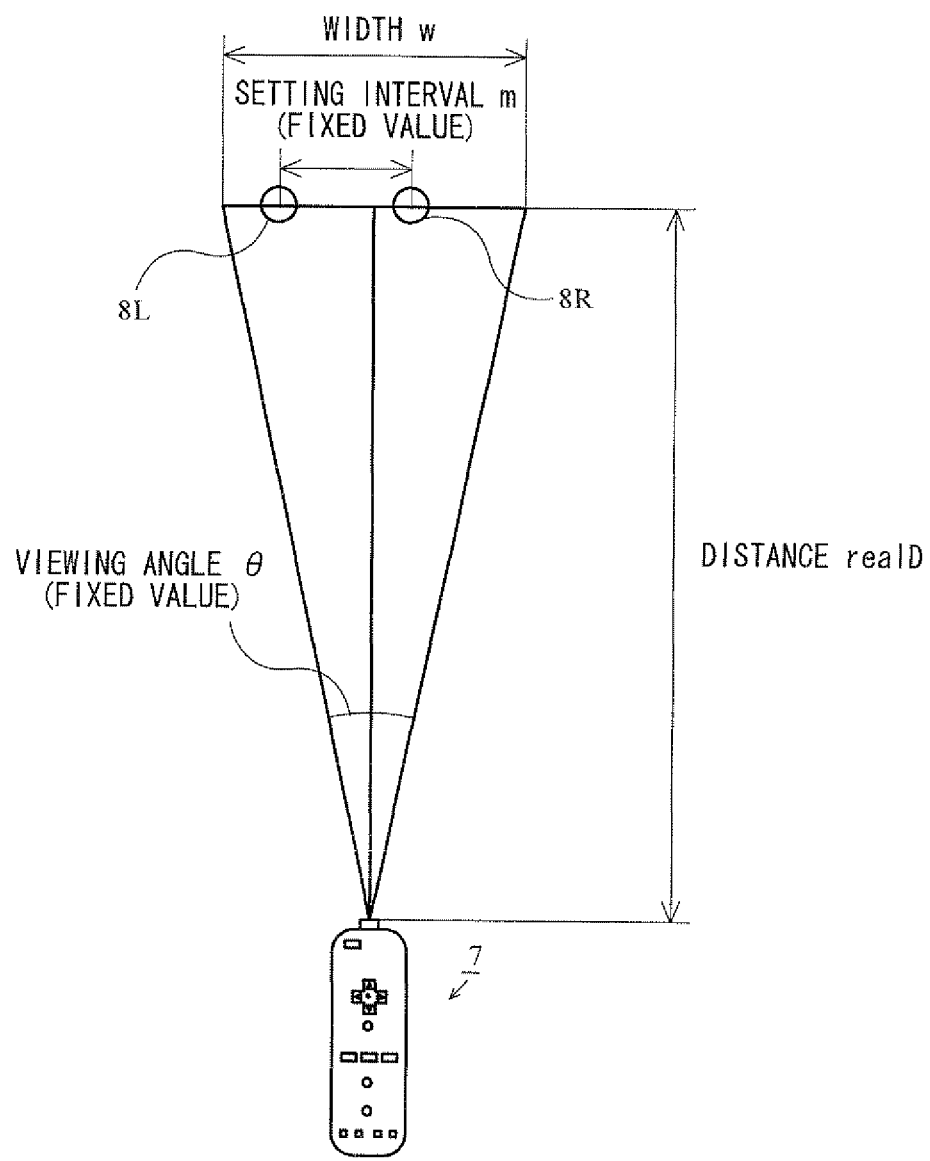

STORAGE MEDIUM, INFORMATION PROCESSING SYSTEM, AND INFORMATION PROCESSING METHOD FOR ADJUSTING IMAGES BASED ON MOVEMENT INFORMATION

CROSS REFERENCE TO RELATED APPLICATION

The disclosure of Japanese Patent Application No. 2010-003089, filed on Jan. 8, 2010, is incorporated herein by reference.

FIELD

The present invention relates to a storage medium, an information processing system, and an information processing method, and more particularly to a computer-readable storage medium storing therein an information processing program for executing predetermined processing based on imaging information which is obtained by imaging means, of an operation device, for taking an image of at least one imaging target, an information processing system, and an information processing method.

BACKGROUND AND SUMMARY

Conventionally, there are known techniques for enlarging or reducing (zoom-in and out) a display image by a player holding and moving an operation device. For example, in an image processing apparatus of Document 1 below, when a player moves a controller (operation device) back and forth with respect to an image display device while pressing a predetermined button of the controller, the moving distance and the like of the controller are calculated. Then, enlargement/reduction of a display image is performed in accordance with the calculated moving distance and the like. Document 1: Japanese Laid-Open Patent Publication No. 2007-236697

Also, for example, in an archery video game of Document 2 below, a player moves a controller (operation device) backward while pressing a predetermined button thereof, with the front surface of the controller facing a display image. When the player aims at a target by adjusting the direction of the controller and then releases the predetermined button that has been pressed, an arrow is shot. Document 2: "Nintendo authorized guidebook, Mario and Sonic at Beijing Olympics (Wii version)" Shogakukan, Feb. 2, 2008, pp. 66-67.

Also, for example, in a video game of Document 3 below, when a player moves a controller (operation device) toward an image display device while pressing an A button of the controller, a display image is enlarged. When the player presses a B button in this state, an action of firing a gun at an aim pointed by the controller is performed. In this manner, the technique of Document 3 allows the player to enlarge the display image and to perform an attack action by operating the controller. Document 3: "Red Steel operation manual", RVL-REDJ-JPN, UBISOFT, Dec. 2, 2006, P 18 (firing a gun), P 20 (zoom-in).

However, the above techniques involve the following problems.

The technique of Document 1 allows enlargement/reduction of an image. However, in order to cancel the enlargement/reduction of the image that has been performed and to cause the enlarged/reduced image to return to its original size, the player needs to move the controller to a reverse direction. This tends to result in onerous operations for the player.

In the video game of Document 2, when the player moves the controller backward while pressing the predetermined button thereof, a target appears in the display image. However, the display image is not enlarged. This results in a relatively less realistic feeling of aiming at the target.

In the video game of Document 3, the player can perform an attack action while zooming-in, and therefore, can aim at the target easily. However, since the zoom-in motion and the attack action are realized by independent operations, respectively, the player needs to perform the zoom-in operation and the canceling operation of the zoomed-in state separately. Therefore, in such a case where the player wants to cancel the zoom quickly and perform the next attack, the operations tend to be onerous for the player.

SUMMARY OF THE INVENTION

Therefore, an object of the present invention is to solve the problems mentioned above. An object of the present invention is to provide a computer-readable storage medium having stored therein an information processing program, an information processing system, and an information processing method, capable of realizing, through a series of simple operations performed by a player, processing of an action of an object in a display image and processing of canceling an enlargement or reduction of the display image.

The present invention has the following features to attain the object mentioned above. It is noted that supplementary descriptions and the like are only examples provided to facilitate the understanding of the present invention in relation to the below-described embodiment, rather than limiting the scope of the present invention in any way.

The present invention is a computer-readable storage medium having stored therein an information processing program to be executed by a computer of an information processing apparatus that includes a first input device having at least one operation key and that generates a display image. The information processing program stored in the storage medium causes the computer to function as input state determination means, movement information acquisition means, first image processing means, and second image processing means. The input state determination means determines an input state of the at least one operation key. The movement information acquisition means sequentially obtains movement information. The first image processing means enlarges or reduces the display image in accordance with a change of the movement information during a time period in which the at least one operation key is determined by the input state determination means to be in a predetermined input state. The second image processing means causes, when the input state determination means determines that the predetermined input state is canceled, the enlarged or reduced display image to return to the original magnification of the display image and controls an action of at least one first object in the display image.

Accordingly, the processing of an action of an object in a display image and the processing of canceling the enlargement or reduction of the display image can be realized by a series of simple operations performed by a user (player).

In the present invention, the first input device may include imaging means for taking an image of a predetermined imaging target, and the information processing program may cause the computer to further function as coordinate identification means. In this case, the coordinate identification means sequentially identifies, based on a position of the predetermined imaging target in the image taken by the imaging means, a pointing coordinate on the display image pointed at by the first input device. Further, in this case, the second image processing means controls a movement of the at least one first object toward the position indicated by the pointing coordinate at the time when the input state determination means determines that the predetermined input state is canceled.

Accordingly, it is possible to control the movement of the at least one first object toward the pointing position identified based on the position of the imaging target, whereby the user can perform an intuitive operation.

Further, in the present invention, the predetermined input state may be an input state in which the at least one operation key is pressed.

Further, in the present invention, at least during the time period in which the at least one operation key is determined by the input state determination means to be in the predetermined input state, the first image processing means may further display the pointing coordinate on the display image.

Accordingly, the user can aim at the target referring to the pointing coordinate at the time when the display image is enlarged (or reduced).

Further, in the present invention, the information processing program may cause the computer to further function as time period measurement means and first threshold value determination means. In this case, the time period measurement means measures the time period in which the at least one operation key is determined by the input state determination means to continuously be in the predetermined input state. Further, in this case, the first threshold value determination means determines whether or not the time period is equal to or greater than a first threshold value. Still further, in this case, when it is determined that the predetermined input state is canceled and when it is determined that the time period is equal to or greater than the first threshold value, the second image processing means causes the enlarged or reduced display image to return to the original magnification of the display image and controls the action of the at least one first object in the display image.

Accordingly, the control of the action is not performed until a state in which the moving amount of the first input device is equal to or greater than a predetermined amount continues for a predetermined period of time, and therefore, it is possible to prevent the user from performing an erroneous operation. Also when the information processing apparatus is a game apparatus and the first object is an arrow object and the like, the user is required to wait for a predetermined period of time before operating the arrow object and the like, and hence the user is required to perform a careful operation, whereby the fun of the game is enhanced.

Still further, in the present invention, the information processing program may cause the computer to further function as time period measurement means. In this case, the time period measurement means measures the time period in which the at least one operation key is determined by the input state determination means to continuously be in the predetermined input state. Further, in this case, the first image processing means enlarges or reduces the display image at a rate in accordance with the time period.

Accordingly, the display image is enlarged or reduced in accordance with the time period in which the at least one operation key is determined to continuously be in the predetermined input state. Therefore, the user can freely cause the display image to be enlarged or reduced by performing an intuitive operation.

Still further, in the present invention, the information processing program may cause the computer to further function as moving amount calculation means. In this case, the moving amount calculation means calculates, based on the movement information, a moving amount at least in a predetermined direction of a movement of the first input device since a time point when the input state determination means determines that the at least one operation key has entered the predetermined input state. Further in this case, the time period measured by the time period measurement means has an upper limit value; the upper limit value is determined so as to increase in accordance with an increase of the moving amount; and when the time period exceeds the upper limit value, the time period is set at the upper limit value.

Accordingly, the upper limit value of the time period measured by the time period measurement means is determined in accordance with the moving amount of the first input device. Therefore, when a certain period of time has elapsed, the greater the moving amount of the first input device is, the greater the rate of enlargement (or reduction) of the display image becomes. As a result, the user can freely cause the display image to be enlarged or reduced by an intuitive operation.

Still further, in the present invention, when the moving amount is reduced and the time period has exceeded the upper limit value corresponding to the reduced moving amount, the time period may be set at the upper limit value corresponding to the reduced moving amount.

Accordingly, when the moving amount that has become large of the first input device becomes small again, the upper limit value also becomes small; and the time period by which the rate of the enlargement (or reduction) of the display image is determined is also reduced. Therefore, when the moving amount that has become large of the first input device becomes small again, the rate that has become large of the enlargement (or reduction) of a display image also becomes small. As a result, the user can cause the display image to be enlarged or reduced by an intuitive operation without having an uncomfortable feeling.

Further, in the present invention, the information processing program may cause the computer to further function as moving amount calculation means and second threshold value determination means. In this case, the moving amount calculation means calculates, based on the movement information, a moving amount at least in a predetermined direction of a movement of the first input device since a time point when the input state determination means determines that the at least one operation key has entered the predetermined input state. Further, in this case, the second threshold value determination means determines whether or not the moving amount is equal to or greater than a second threshold value. Still further, in this case, when it is determined that the predetermined input state is canceled and when it is determined that the moving amount is equal to or greater than the second threshold value, the second image processing means causes the enlarged or reduced display image to return to the original magnification of the display image and controls the action of the at least one first object in the display image.

Accordingly, the control of an action of the first object is not performed unless the moving amount of the first input device is equal to or greater than a predetermined amount. Therefore, it is possible to prevent the user from performing an erroneous operation. In addition, when the first object is an arrow object, the user can have a feeling that the arrow flies, which feeling would be felt when the user actually draws the bowstring by the amount that is equal to or greater than the predetermined amount.

Further, in the present invention, the information processing program may cause the computer to further function as moving amount calculation means. In this case, the moving amount calculation means calculates, based on the movement information, a moving amount at least in a predetermined direction of a movement of the first input device since a time point when the input state determination means determines that the at least one operation key has entered the predetermined input state. In this case, the first image processing means enlarges or reduces the display image at a rate in accordance with the moving amount.

Accordingly, the rate of the enlargement or reduction of the display image is changed based on the moving amount of the first input device, the user can freely cause the display image to be enlarged or reduced by an intuitive operation.

Further, in the present invention, the first input device further may include imaging means for taking an image of at least one predetermined imaging target, and the movement information acquisition means may sequentially obtain movement information indicating a size of the at least one predetermined imaging target or an interval between the at least one predetermined imaging target in the image taken by the imaging means.

Accordingly, it is possible to calculate the moving amount of the first input device based on the image taken by the imaging means.

Further, in the present invention, the information processing program may cause the computer to further function as moving amount calculation means and first moving speed determination means. In this case, the moving amount calculation means calculates, based on the movement information, a moving amount at least in a predetermined direction of a movement of the first input device since a time point when the input state determination means determines that the at least one operation key has entered the predetermined input state. Further, in this case, the first moving speed determination means determines, based on the moving amount, a moving speed of the at least one first object. Still further, in this case, the second image processing means controls, at the moving speed, a movement of the at least one first object.

Accordingly, since the moving speed of the first object is determined in accordance with the moving amount of the first input device, the user can freely determine the speed of the first object by an intuitive operation.

Further, in the present invention, the information processing program may cause the computer to further function as second moving speed determination means. In this case, the second moving speed determination means determines, based on the time period measured by the time period measurement means, a moving speed of the at least one first object. Further, in this case, the second image processing means controls, at the moving speed, a movement of the at least one first object.

Accordingly, the at least one first object moves at a speed in accordance with a time period in which the at least one operation key is determined to be in a predetermined input state. Therefore, the user can freely determine the moving speed of the at least one first object by an intuitive operation.

Further, in the present invention, the first input device may further include imaging means for taking an image of a predetermined imaging target, and the information processing program may cause the computer to further function as coordinate identification means. In this case, the coordinate identification means sequentially identifies, based on a position of the predetermined imaging target in the image taken by the imaging means, a pointing coordinate on the display image pointed at by the first input device. Further, in this case, at least during the time period in which the at least one operation key is determined by the input state determination means to be in the predetermined input state, the first image processing means further displays the pointing coordinate on the display image.

Accordingly, the user can cause the display image to be enlarged (or reduced) and aim at the target with reference to the pointing coordinate at the same time, through a series of operations.

Further, in the present invention, the first input device may further include imaging means for taking an image of a predetermined imaging target, and the information processing program may cause the computer to further function as coordinate identification means, target object arrangement means, and marking means. In this case, the coordinate identification means sequentially identifies, based on a position of the predetermined imaging target in the image taken by the imaging means, a pointing coordinate on the display image pointed at by the first input device. Further, in this case, the target object arrangement means arranges on the display image at least one second object which is a target. Still further, in this case, the marking means sets, during the time period in which the at least one operation key is determined by the input state determination means to be in the predetermined input state and if the pointing coordinate designates one of the at least one second object, a marking on the designated one of the at least one second object. Still further, in this case, the second image processing means controls a movement of the at least one first object toward respectively at least one position indicated respectively by at least one marking that has been set.

Accordingly, the user can set a marking on a target object, through a simple operation, by pointing at the target object in the display image that has been enlarged (or reduced). In other words, the user can cause the display image to be enlarged (or reduced) and set a marking on the target object at the same time, through a series of operations. Moreover, the user can cause a first object to automatically move toward the target object on which the marking has been set.

Further, in the present invention, the marking means may include marking number measurement means for measuring the number of the at least one marking that has been set, and may cancel, when the number measured by the marking number measurement means reaches a predetermined number, an oldest marking that is present.

Accordingly, due to the predetermined number of the target objects on which the markings can be set, it is possible to cause the user to carefully select the target objects on which the markings are to be set.

Further, in the present invention, the first input device further may include imaging means for taking an image of at least one predetermined imaging target, the movement information acquisition means may sequentially obtain movement information indicating a size of the at least one predetermined imaging target or an interval between the at least one predetermined imaging target in the image taken by the imaging means, and the information processing program may cause the computer to further function as first distance calculation means, second distance calculation means, comparison means, and first distance resetting means. In this case, the first distance calculation means calculates, based on the movement information, a first distance between the imaging means and the at least one predetermined imaging target at the time when the input state determination means determines that the at least one operation key is in the predetermined input state. Further, in this case, the second distance calculation means calculates, after the first distance is calculated, based on the movement information, a second distance between the imaging means and the at least one predetermined imaging target. Still further, in this case, comparison means determines whether or not the second distance is smaller than the first distance. Further, in this case, first distance resetting means resets, when the comparison means determines that the second distance is smaller than the first distance, the second distance as a first distance. Further, in this case, during the time period in which the at least one operation key is determined by the input state determination means to be in the predetermined input state, the first image processing means enlarges or reduces the display image in accordance with a change of a difference between the first distance and the second distance.

Accordingly, even when the first input device has moved toward the predetermined imaging target when the at least one operation key is in the predetermined input state, it is possible to reset the reference position on which the moving amount of the first input device is calculated, at the position to which the first input device has moved. Specifically, even when the user has moved the first input device toward a predetermined imaging target with the at least one operation key pressed, it is not necessary for the user to cancel the depression of the at least one operation key at the position to which the first input device has been moved. As a result, the operability for the user is greatly improved.

Further, in the present invention, the information processing apparatus may further include a second input device, the second input device may include means for obtaining inclination calculation data that allows calculation of an inclination angle of the second input device, and the information processing program may cause the computer to further function as inclination angle calculation means. In this case, the inclination angle calculation means calculates, based on the inclination calculation data, the inclination angle of the second input device. Further, in this case, the second image processing means controls, further based on the inclination angle, the action of the at least one first object.

Accordingly, since the user can operate the first object by inclining the second input device, the flexibility of the operation performed by the user is substantially improved.

Further, in the present invention, the information processing apparatus may be a game apparatus, and the at least one first object may be at least one arrow object.

Accordingly, the processing of an action of the arrow object in a game image and the processing of canceling the enlargement or reduction of the game image can be realized through a series of simple operations performed by the player.

Further, the present invention is a computer-readable storage medium having stored therein an information processing program to be executed by a computer of a game apparatus that includes a first input device having at least one operation key and that generates a game image. The information processing program stored in the storage medium causes the computer to function as input state determination means, movement information acquisition means, first image processing means, and second image processing means. The input state determination means determines an input state of the at least one operation key. The movement information acquisition means sequentially obtains movement information of the first input device. The first image processing means enlarges or reduces the game image in accordance with a change of the movement information during a time period in which the at least one operation key is determined by the input state determination means to be in a predetermined input state. The second image processing means causes, when the input state determination means determines that the predetermined input state is canceled, the enlarged or reduced game image to return to the original magnification of the game image and controls a shooting of at least one arrow object in the game image.

Accordingly, the processing of an action of the arrow object in a game image and the processing of canceling the enlargement or reduction of the game image can be realized through a series of simple operations performed by the player.

Further, in the present invention, the first input device may include imaging means for taking an image of a predetermined imaging target, and the information processing program may cause the computer to further function as coordinate identification means. In this case, the coordinate identification means sequentially identifies, based on a position of the predetermined imaging target in the image taken by the imaging means, a pointing coordinate on the game image pointed at by the first input device. Further, in this case, the second image processing means controls a movement of the at least one arrow object toward the position indicated by the pointing coordinate at the time when the input state determination means determines that the predetermined input state is canceled.

Accordingly, since the movement of the arrow object can be controlled toward the pointing position that is identified based on the position of the imaging target, the user can perform an intuitive operation.

Further, in the present invention, the information processing program may cause the computer to further function as time period measurement means and first threshold value determination means. In this case, the time period measurement means measures the time period in which the at least one operation key is determined by the input state determination means to continuously be in the predetermined input state. Further, in this case, the first threshold value determination means determines whether or not the time period is equal to or greater than a first threshold value. Still further, in this case, when it is determined that the predetermined input state is canceled and when it is determined that the time period is equal to or greater than the first threshold value, the second image processing means causes the enlarged or reduced game image to return to the original magnification of the game image and controls an action of the at least one arrow object in the game image.

Accordingly, the control of the action is not performed until a state in which the moving amount of the first input device is equal to or greater than a predetermined amount continues for a predetermined period of time. Therefore, it is possible to prevent the player from performing an erroneous operation. Moreover, the player is required to wait for a predetermined period of time before operating the arrow object, and hence the player is required to perform a careful operation, whereby the fun of the game is enhanced.

In the above, a case where the present invention is structured as a computer-readable storage medium having stored therein an information processing program has been described. However, the present invention may be structured as an information processing system or an information processing method. However, the processing described above may be shared by a plurality of apparatuses (or systems) that communicate with each other via a wired or wireless connection.

According to the present invention, the processing of an action of an object in a display image and the processing of canceling an enlargement or reduction of the display image can be realized by a series of simple operations performed by a user (player).

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is an external view of a game system 1 according to an embodiment of the present invention;

FIG. 3 is a perspective view of a controller 7 in FIG. 1, seen from a top rear side thereof;

FIG. 6 is a perspective view, seen from a front side of the controller 7, showing a state where a lower housing of the controller 7 in FIG. 4 is removed;

FIG. 14 is a view specifically illustrating a motion of the player moving the controller 7 away from a television 2 while pressing A and B buttons;

FIG. 20 is a view illustrating the process of step S5 in FIG. 17;

DESCRIPTION OF THE PREFERRED EMBODIMENTS

Figure 2:
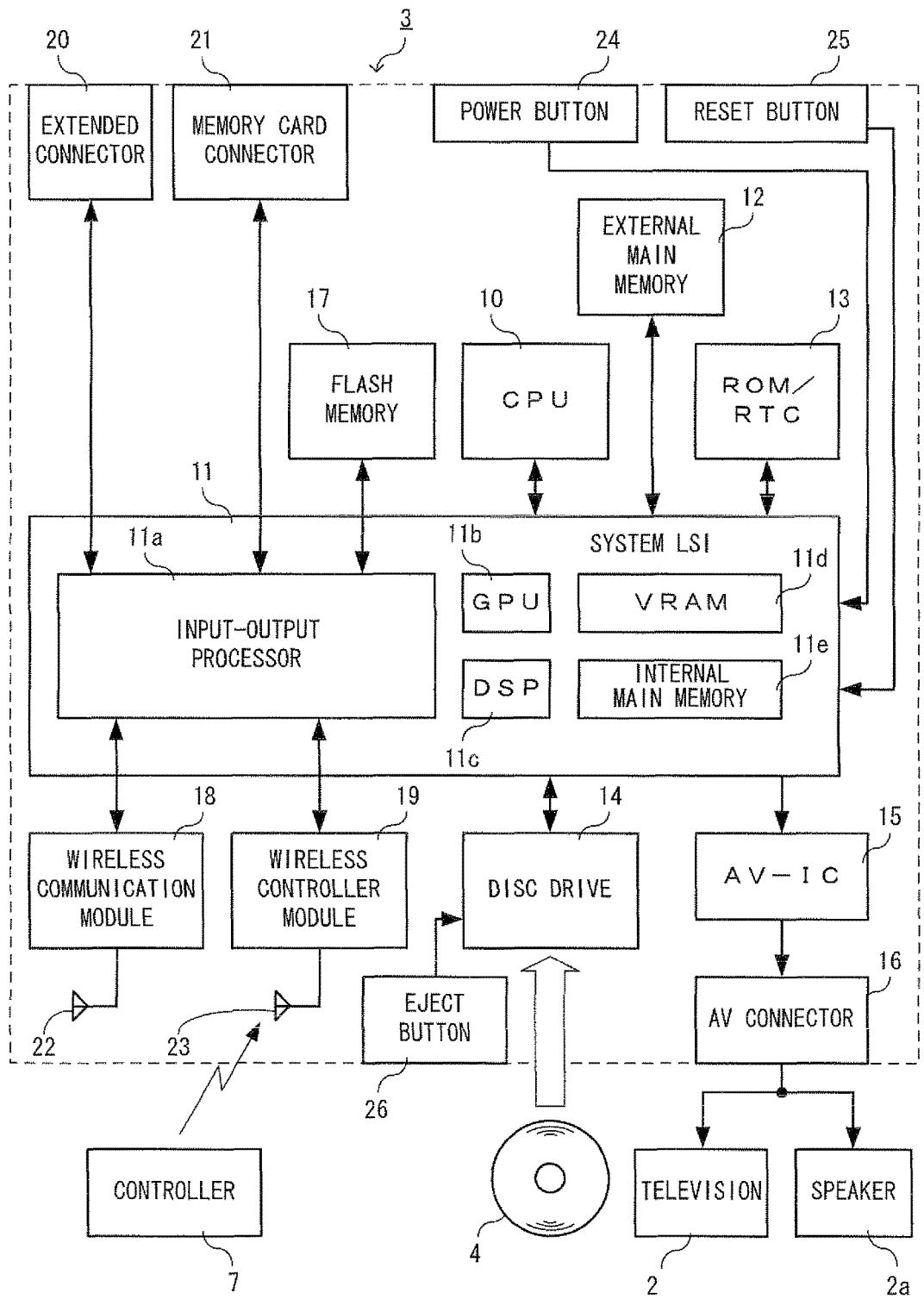
FIG. 2 is a block diagram showing a configuration of a game apparatus main body 3 in FIG. 1.

Hereinafter, embodiments of the present invention will be described with reference to the drawings. It is noted that the present invention is not limited by the embodiments described below.

(First Embodiment)
[Overall Configuration of Game System]

With reference to FIG. 1, an information processing apparatus according to a first embodiment of the present invention will be described. Hereinafter, in order to give a specific description, an example of a game system 1 using the information processing apparatus of the present invention will be described. FIG. 1 is an external view of the game system 1. Hereinafter, the game system 1 will be described, using a stationary game apparatus as an example of the information processing apparatus of the present invention.

As shown in FIG. 1, the game system 1 includes a television receiver (hereinafter, referred to merely as a television) 2, a game apparatus main body 3, an optical disc 4, a controller 7, and a marker section 8. The game system 1 executes game processing at the game apparatus main body 3 in accordance with a game operation using the controller 7.

The optical disc 4, which typifies an information storage medium and is exchangeable with respect to the game apparatus main body 3, is detachably inserted in the game apparatus main body 3. The optical disc 4 stores a game program which is to be executed by the game apparatus main body 3. The game apparatus main body 3 has an insertion slot for the optical disc 4 at its front surface. The game apparatus main body 3 reads and executes the game program stored in the optical disc 4 which is inserted in the insertion slot for executing the game processing.

The television 2 as an example of a display device is connected to the game apparatus main body 3 via a connection cord. The television 2 displays game images which are obtained as the result of the game processing executed by the game apparatus main body 3. The marker section 8 is mounted adjacent to the screen of the television 2 (on the upper surface of the screen in FIG. 1). The marker section 8 has a marker 8R and a marker 8L at its opposite ends, respectively. The marker 8R has one or more infrared LEDs which output infrared lights forward from the television 2. The marker 8L has the same configuration as the marker 8R. The marker section 8 is connected to the game apparatus main body 3, and the game apparatus main body 3 is capable of controlling illumination of each infrared LED of the marker section 8.

Figure 10:
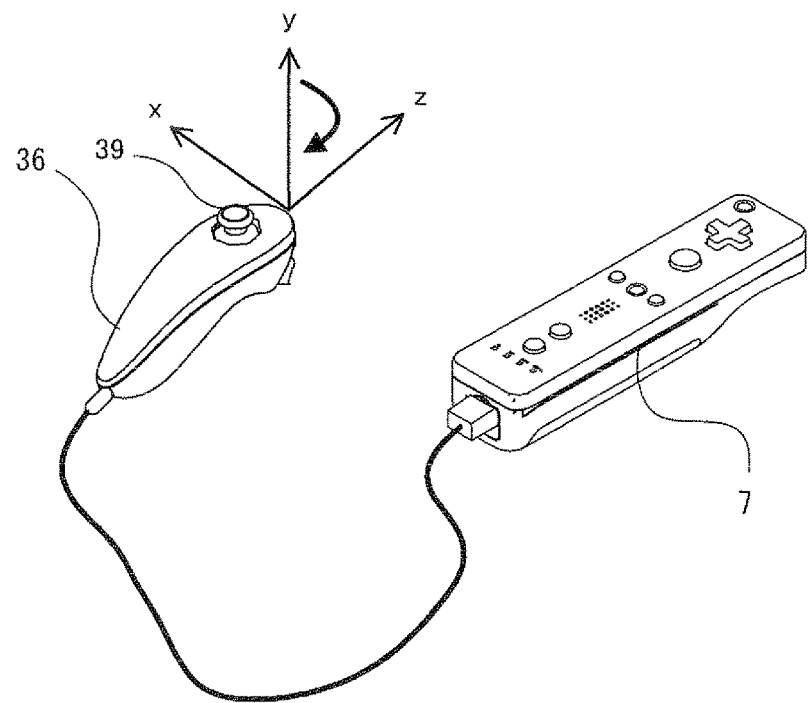
FIG. 10 is a view showing a state where an extended controller 36 is connected to a connector 73 of the controller 7.
Figure 11:
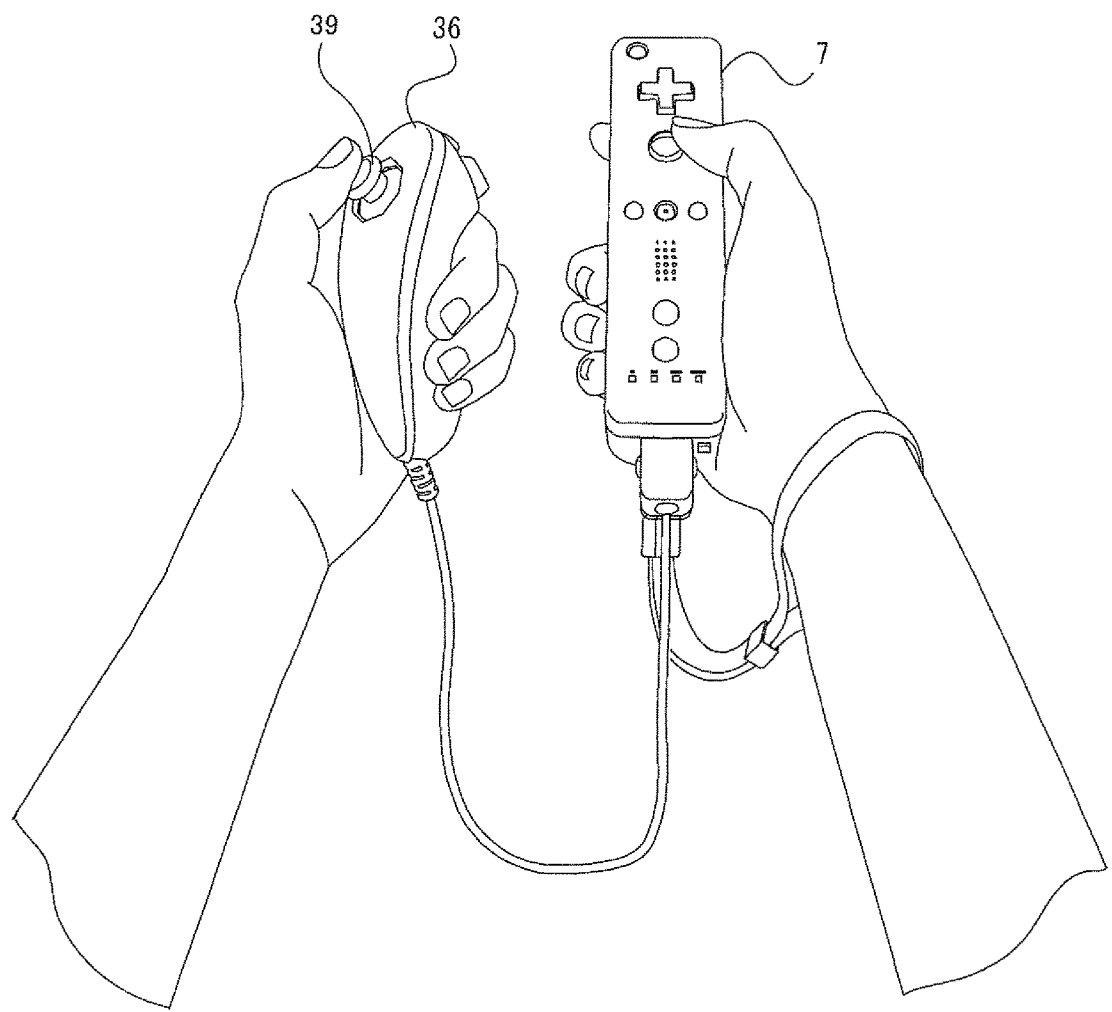
FIG. 11 is a view showing a state where a player holds the controller 7 and the extended controller 36.

The controller 7 is an input device which provides the game apparatus main body 3 with operation data which indicates contents of an operation made to the controller 7. When an extended controller 36 below described with reference to FIG. 10 and FIG. 11 is connected to the controller 7, the controller 7 also provides the game apparatus main body 3 with contents of the operation made to the extended controller 36. The controller 7 is connected to the game apparatus main body 3 by wireless communication. In the present embodiment, the technology of, for example, Bluetooth (registered trademark) is used for the wireless communication between the controller 7 and the game apparatus main body 3. It is noted that in an alternative embodiment, the controller 7 may be connected to the game apparatus main body 3 via a wire.

[Internal Configuration of Game Apparatus Main Body 3]

Next, an internal configuration of the game apparatus main body 3 will be described with reference to FIG. 2. FIG. 2 is a block diagram showing a configuration of the game apparatus main body 3. The game apparatus main body 3 includes a CPU 10, a system LSI 11, an external main memory 12, a ROM/RTC 13, a disc drive 14, an AV-IC 15, and the like.

The CPU 10 executes the game processing by executing the game program stored in the optical disc 4, and functions as a game processor. The CPU 10 is connected to the system LSI 11. In addition, the external main memory 12, the ROM/RTC 13, the disc drive 14, and the AV-IC 15 are connected to the system LSI 11. The system LSI 11 performs processing such as control of data transfer between the system LSI 11 and each component connected to the system LSI 11, generation of an image to be displayed, obtaining data from an external device, and the like. An internal configuration of the system LSI 11 will be described later. The volatile external main memory 12 stores a program such as the game program read from the optical disc 4, a game program read from a flash memory 17, and the like, and various data, and is used as a work area and a buffer area for the CPU 10. The ROM/RTC 13 includes a ROM (so-called boot ROM) which stores a program for starting up the game apparatus main body 3, and a clock circuit (RTC: Real Time Clock) for counting time. The disc drive 14 reads program data and texture data from the optical disc 4, and writes these data into an internal main memory 11e, which will be described below, or the external main memory 12.

The system LSI 11 is provided with an input-output processor 11a, a GPU (Graphics Processor Unit) 11b, a DSP (Digital Signal Processor) 11c, a VRAM 11d, and the internal main memory 11e. Although not shown in the drawings, these components 11a to 11e are connected to each other via an internal bus.

The GPU 11b forms a part of rendering means, and generates an image according to a graphics command (command for generating graphics) from the CPU 10. More specifically, the GPU 11b performs, in accordance with the graphics command, computing processing required for displaying 3D graphics, for example, processing of coordinate conversion from 3D coordinates into 2D coordinates which is performed prior to rendering, and processing of rendering such as attaching texture, thereby generating game image data. In addition to the graphics command, the CPU 10 provides the GPU 11b with an image generation program required for generating the game image data. The VRAM 11d stores data, such as polygon data and texture data, which are required for the GPU 11b to execute the graphics command. In generating an image, the GPU 11b creates the image data using the data stored in the VRAM 11d.

The DSP 11c functions as an audio processor, and generates audio data using sound data and sound waveform (tone color) data which are stored in the internal main memory 11e and the external main memory 12. Like the external main memory 12, the internal main memory 11e stores a program and various data, and is used as a work area and a buffer area for the CPU 10.

The image data and the sound data thus generated are read by the AV-IC 15. The AV-IC 15 outputs the image data to the television 2 via an AV connector 16, and the sound data to speakers 2a built in the television 2. Thus, an image is displayed on the television 2, and sound is outputted from the speakers 2a.

The input-output processor (I/O process) 11a performs transmission and reception of data to and from each component connected to the input-output processor 11a, and downloads data from an external device. The input-output processor 11a is connected to the flash memory 17, a wireless communication module 18, a wireless controller module 19, an extended connector 20, and a memory card connector 21. An antenna 22 is connected to the wireless communication module 18, and an antenna 23 to the wireless controller module 19.

The input-output processor 11a is connected to a network via the wireless communication module 18 and the antenna 22, so that the input-output processor 11a is communicable with another game apparatus connected to the network and various servers connected to the network. The input-output processor 11a periodically accesses the flash memory 17 to detect whether there are data required to be transmitted to the network. If there are such data, the input-output processor 11a transmits the data to the network via the wireless communication module 18 and the antenna 22. The input-output processor 11a receives data transmitted from the other game apparatus and data downloaded from a download server via the network, the antenna 22 and the wireless communication module 18, and stores the received data in the flash memory 17. The CPU 10 reads the data stored in the flash memory 17 by executing the game program, and uses the data in the game program. In addition to the data transmitted or received between the game apparatus main body 3 and the other game apparatus and various servers, the flash memory 17 may store saved data (result data or midstream data of the game) of the game played using the game apparatus main body 3.

The input-output processor 11a receives operation data transmitted from the controller 7 via the antenna 23 and the wireless controller module 19, and stores (temporarily stores) the operation data in the buffer area of the internal main memory 11e or the external main memory 12.

In addition, the extended connector 20 and the memory card connector 21 are connected to the input-output processor 11a. The extended connector 20 is a connector for an interface such as USB and SCSI, and the communication with the network is enabled by connecting a medium such as an external storage medium, a peripheral device such as another controller, or a wired connector for communication to the extended connector 20 instead of the wireless communication module 18. The memory card connector 21 is a connector for connecting thereto an external storage medium such as a memory card. For example, the input-output processor 11a accesses the external storage medium via the extended connector 20 and the memory card connector 21 for storing data in the external storage medium and reading data from the external storage medium.

The game apparatus main body 3 is provided with a power button 24, a reset button 25, and an eject button 26. The power button 24 and the reset button 25 are connected to the system LSI 11. When the power button 24 is turned on, electric power is supplied to each component of the game apparatus main body 3 via an AC adaptor (not shown). In the state where the power has been turned on, the power button 24 is pressed to shift to a low power standby mode. Even in the low power standby mode, electric power is supplied to the game apparatus main body 3. Because electric power is always supplied to the game apparatus main body 3, the game apparatus main body 3 can be always connected to a network such as the Internet even in this state. For turning off the power once the power is turned on, the power button 24 is pressed for a predetermined period of time or longer. The reset button 25 is pressed to cause the system LSI 11 to restart a boot program of the game apparatus main body 3. The eject button 26 is connected to the disc drive 14. The eject button 26 is pressed to eject the optical disc 4 from the disc drive 14.

Next, the controller 7 will be described with reference to FIGS. 3 and 4. FIG. 3 is a perspective view of the controller 7 seen from a top rear side thereof, and FIG. 4 is a perspective view of the controller 7 seen from a bottom front side thereof.

Figure 4:
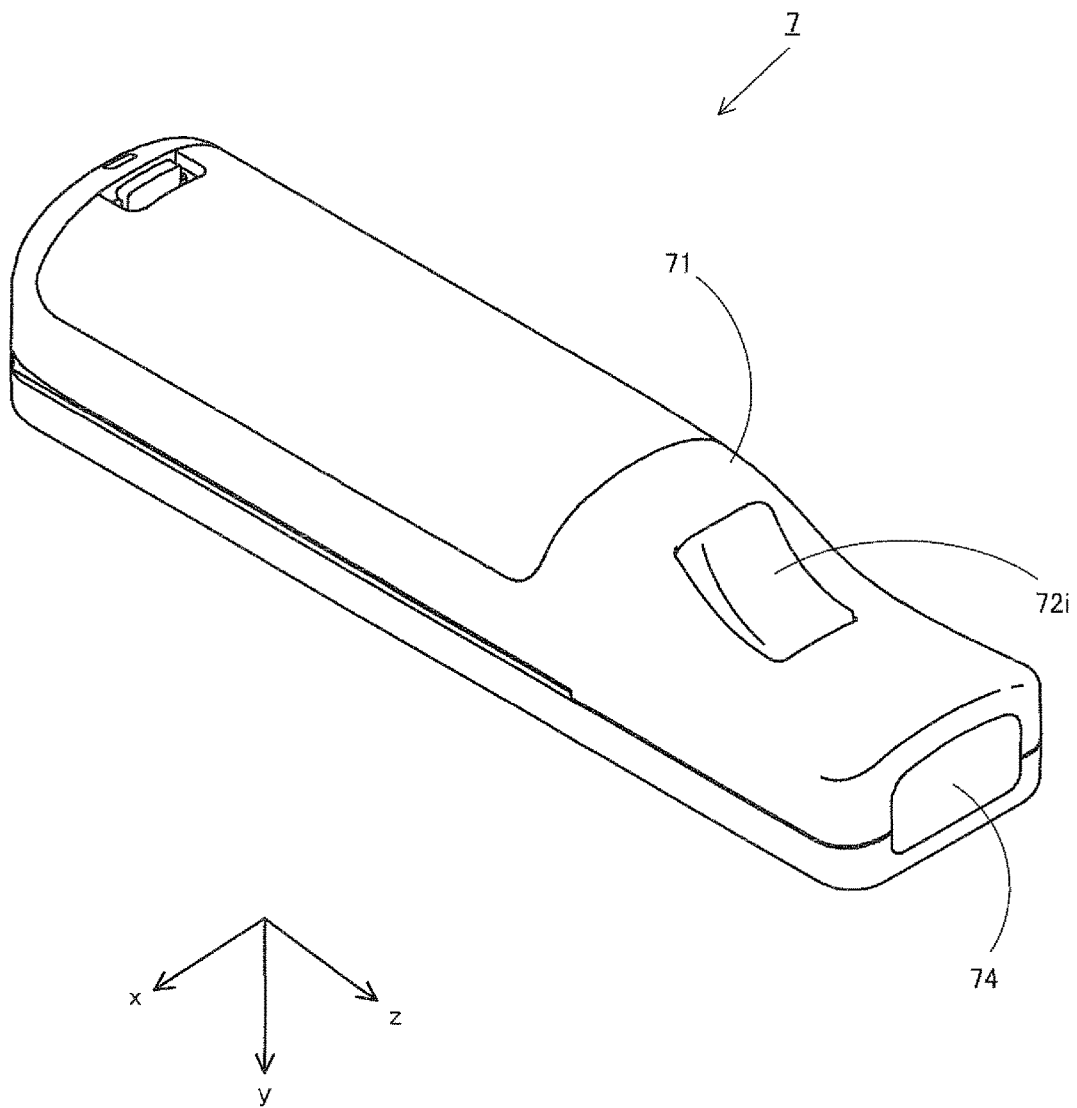
FIG. 4 is a perspective view of the controller 7 in FIG. 1, seen from a bottom front side thereof.

As shown in FIGS. 3 and 4, the controller 7 includes a housing 71 and an operation section 72 including a plurality of operation buttons which are provided on surfaces of the housing 71. The housing 71 of the present embodiment has a generally parallelepiped shape extending in a longitudinal direction from front to rear. The overall size of the housing 71 is small enough to be held by one hand of an adult or even a child, and, for example, the housing 71 is formed by plastic molding.

At the center of a front part of a top surface of the housing 71, a cross key 72a is provided. The cross key 72a is a cross-shaped four-direction push switch. The cross key 72a includes operation portions corresponding to four directions (front, rear, right and left), which are respectively located on cross-shaped projecting portions arranged at intervals of 90 degrees. A player selects one of the front, rear, right and left directions by pressing one of the operation portions of the cross key 72a. Through an operation of the cross key 72a, the player can, for example, indicate a direction in which a player object or the like appearing in a virtual game world is to move, or select an option from a plurality of options.

The cross key 72a is an operation section for outputting an operation signal in accordance with the above-described direction input operation performed by the player. Such an operation section may be provided in another form. For example, the cross key 72a may be replaced with an operation section which includes four push switches arranged in a square and which outputs an operation signal in accordance with the push button pressed by the player. In addition to the four push switches of the operation section, a center switch may be provided at the center of the four push switches to form a composite operation section including the four push switches and the center switch. Alternatively, the cross key 72a may be replaced with an operation section which includes an inclinable stick (or joystick) projecting from a top surface of the housing 71 and which outputs an operation signal in accordance with an inclining direction of the stick. Still alternatively, the cross key 72a may be replaced with an operation section which includes a disc-shaped and horizontally slidable member and which outputs an operation signal in accordance with a sliding direction of the disc-shaped member. Still alternatively, the cross key 72a may be replaced with a touch pad.

Behind the cross key 72a on the top surface of the housing 71, a plurality of operation buttons 72b to 72g are provided. The operation buttons 72b to 72g are each an operation section for, when the player presses ahead thereof, outputting a corresponding operation signal. For example, functions as a number one button, a number two button and an A button are assigned to the operation buttons 72b to 72d, respectively. Also, functions as a minus button, a home button and a plus button are assigned to the operation buttons 72e to 72g, respectively. Operation functions are assigned to the operation buttons 72b to 72g in accordance with the game program executed by the game apparatus main body 3. In an exemplary arrangement shown in FIG. 3, the operation buttons 72b to 72d are arranged in a line at the center in a front-rear direction on the top surface of the housing 71. The operation buttons 72e to 72g are arranged on the top surface of the housing 71 in a line in a left-right direction between the operation buttons 72b and 72d. The operation button 72f has a top surface thereof buried in the top surface of the housing 71, so as not to be inadvertently pressed by the player.

In front of the cross key 72a on the top surface of the housing 71, an operation button 72h is provided. The operation button 72h is a power switch for turning on and off the power to the game apparatus main body 3 by remote control. The operation button 72h also has a top surface thereof buried in the top surface of the housing 71, so as not to be inadvertently pressed by the player.

Behind the operation button 72c on the top surface of the housing 71, a plurality of LEDs 702 are provided. Here, a controller type (number) is assigned to the controller 7 such that the controller 7 is distinguishable from the other controllers 7. The LEDs 702 are used for, for example, informing the player of the controller type which is currently set for the controller 7. More specifically, when the controller 7 transmits transmission data to the game apparatus main body 3, one of the plurality of LEDs 702 which corresponds to the controller type of the controller 7 is lit up.

On the top surface of the housing 71, a plurality of holes are provided between the operation button 72b and the operation buttons 72e to 72g for emitting sound from a speaker (a speaker 706 in FIG. 5), which will be described below, to the outside therethrough.

On a bottom surface of the housing 71, a recessed portion is formed. As described below in detail, the recessed portion is formed in a position in which an index finger or middle finger of the player is located when the player holds the controller 7 such that the front surface thereof faces the markers 8L and 8R. On a slope surface of the recessed portion, an operation button 72i is provided. The operation button 72i is an operation section functioning as, for example, a B button.

On a front surface of the housing 71, an image pickup element 743 constituting a part of an imaging information calculation section 74 is provided. The imaging information calculation section 74 is a system for analyzing image data of an image taken by the controller 7, thereby identifying an area having a high brightness in the image and detecting a position of a center of gravity, a size and the like of the area. The imaging information calculation section 74 has, for example, a maximum sampling period of about 200 frames/sec, and therefore can trace and analyze even a relatively fast motion of the controller 7. A configuration of the imaging information calculation section 74 will be described below in detail. On a rear surface of the housing 71, a connector 73 is provided. The connector 73 is, for example, an edge connector, and is used for engaging and connecting the controller 7 with a connection cable.

For giving a more specific description, a coordinate system set with respect to the controller 7 will be defined. As shown in FIGS. 3 and 4, mutually perpendicular x-axis, y-axis, and z-axis are defined with respect to the controller 7. More specifically, the longitudinal direction of the housing 71 or the front-rear direction of the controller 7 corresponds to z-axis, and the direction toward the front surface of the controller 7 (the surface in which the imaging information calculation section 74 is provided) is a positive direction of z-axis. The up-down direction of the controller 7 corresponds to y-axis, and the direction toward the top surface of the housing 71 (the surface on which the operation button 72a is provided) is a positive direction of y-axis. The left-right direction of the controller 7 corresponds to x-axis, and the direction toward the left side surface housing 71 (the side surface which is not shown in FIG. 3 but shown in FIG. 4) is a positive direction of x-axis.

Figure 5:
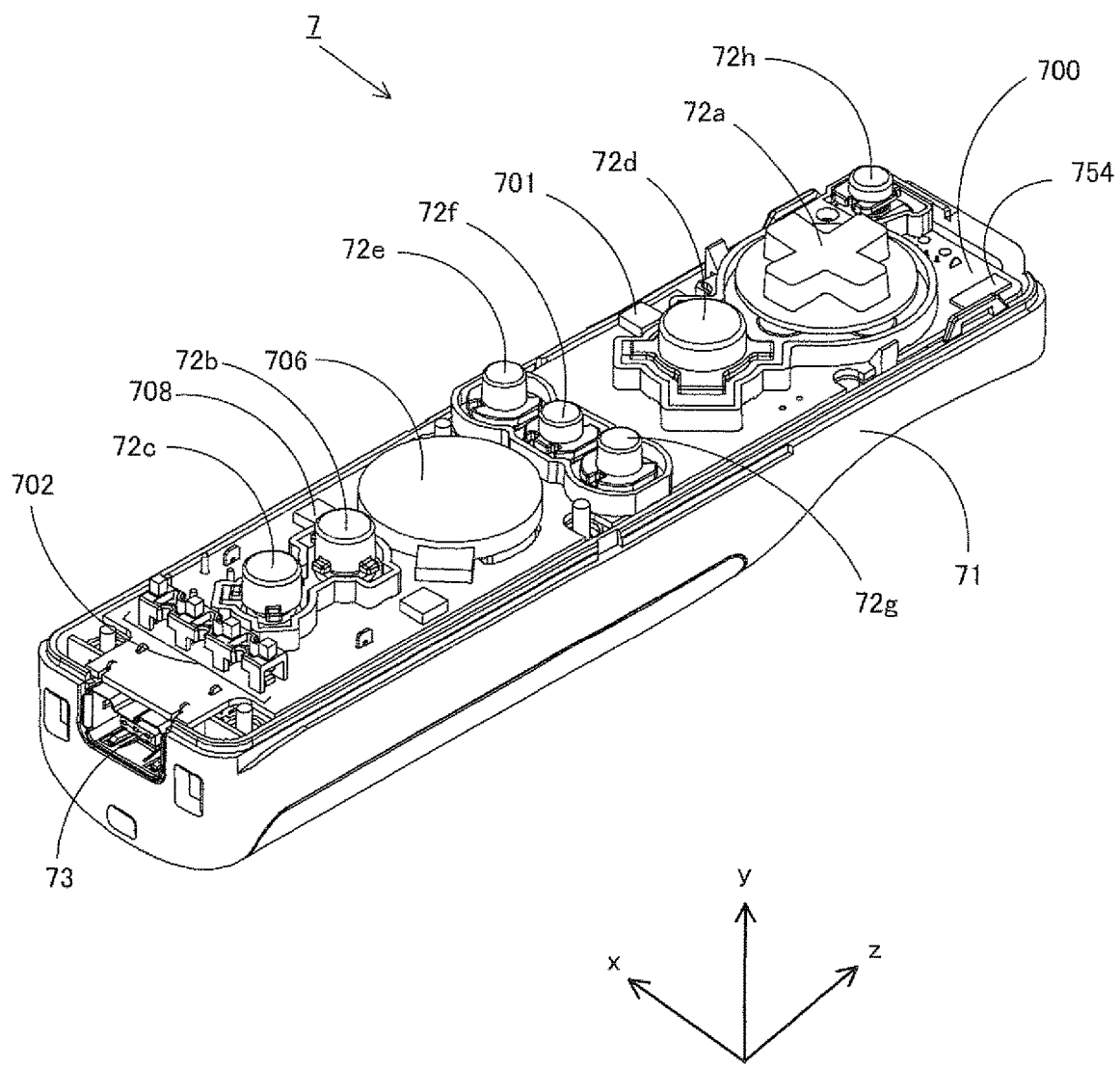
FIG. 5 is a perspective view, seen from a rear side of the controller 7, showing a state where an upper housing of the controller 7 in FIG. 3 is removed.

Next, an internal structure of the controller 7 will be described with reference to FIGS. 5 and 6. FIG. 5 is a perspective view showing a state where an upper housing (a part of the housing 71) of the controller 7 is removed as seen from a rear side thereof. FIG. 6 is a perspective view showing a state where a lower housing (a part of the housing 71) of the controller 7 is removed as seen from a front side thereof. FIG. 6 is a perspective view showing a reverse side of a substrate 700 shown in FIG. 5.

As shown in FIG. 5, the substrate 700 is fixed inside the housing 71. On a top main surface of the substrate 700, the operation buttons 72a to 72h, an acceleration sensor 701, the LEDs 702, and an antenna 754 and the like are provided. These components are connected to a microcomputer 751, and the like (see FIGS. 6 and 7) by lines (not shown) formed on the substrate 700 and the like. The microcomputer 751 as an example of button data generation means of the present invention functions to generate operation button data in accordance with a type of the operation button 72a and the like. This function is a known technique, and achieved, for example, by the microcomputer 751 detecting contact/non-contact of the line by a switch mechanism such as a tact switch located below a key top. More specifically, the operation button is pressed to contact with the line, thereby conducting a current therethrough. The microcomputer 751 detects which operation button the line, in which the current conduction occurs, leads to, and generates a signal in accordance with a type of the operation button.

The controller 7 functions as a wireless controller by a wireless module 753 (see FIG. 7) and the antenna 754. In the housing 71, a crystal oscillator (not shown) is provided for generating a basic clock of the microcomputer 751, which will be described below. On the top main surface of the substrate 700, the speaker 706 and an amplifier 708 are provided. The acceleration sensor 701 is provided on the left side of the operation button 72d on the substrate 700 (i.e. on the periphery of the substrate 700, not on the center thereof). The acceleration sensor 701 is capable of detecting acceleration included in a component caused by a centrifugal force in accordance with rotation of the controller 7 about the longitudinal direction thereof, in addition to change of direction of gravitational acceleration. Thus, the game apparatus main body 3 or the like can be sensitive enough to determine the rotation of the controller 7 from detected acceleration data using a predetermined calculation.

As shown in FIG. 6, at a front edge of a bottom main surface of the substrate 700, the imaging information calculation section 74 is provided. The imaging information calculation section 74 includes an infrared filter 741, a lens 742, the image pickup element 743 and an image processing circuit 744 which are located in this order from the front surface of the controller 7. These components are attached to the bottom main surface of the substrate 700. At a rear edge of the bottom main surface of the substrate 700, the connector 73 is attached. On the bottom main surface of the substrate 700, a sound IC 707 and the microcomputer 751 are provided. The sound IC 707 is connected to the microcomputer 751 and the amplifier 708 by lines formed on the substrate 700 and the like, and outputs a sound signal to the speaker 706 via the amplifier 708 in accordance with the sound data transmitted from the game apparatus main body 3.

On the bottom main surface of the substrate 700, a vibrator 704 is attached. The vibrator 704 is, for example, a vibration motor or a solenoid. The vibrator 704 is connected to the microcomputer 751 by a line formed on the substrate 700 and the like, and actuated or unactuated in accordance with vibration data transmitted from the game apparatus main body 3. The controller 7 is vibrated by an actuation of the vibrator 704, and the vibration is conveyed to the player holding the controller 7. Thus, a so-called vibration-feedback game is realized. Because the vibrator 704 is located in the front portion of the housing 71, the housing 71 is vibrated substantially, and hence the player holding the controller 7 easily feels the vibration.

Figure 7:
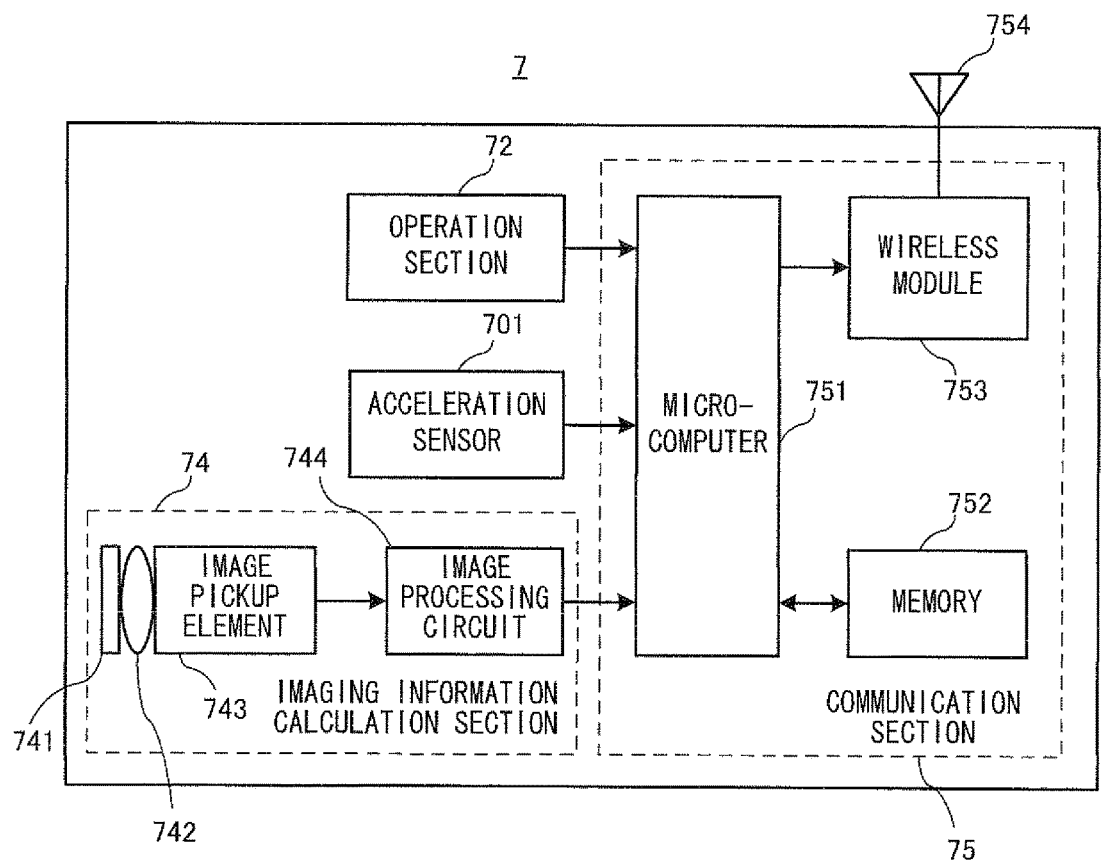
FIG. 7 is a diagram illustrating an internal configuration of the controller 7 in FIG. 3.

Next, an internal constitution of the controller 7 will be described with reference to FIG. 7. FIG. 7 is a block diagram showing an internal configuration of the controller 7.

As shown in FIG. 7, the controller 7 includes therein a communication section 75 in addition to the operation section 72, the imaging information calculation section 74, the acceleration sensor 701, the vibrator 704, the speaker 706, the sound IC 707, and the amplifier 708.

The imaging information calculation section 74 includes the infrared filter 741, the lens 742, the image pickup element 743, and the image processing circuit 744. The infrared filter 741 allows, among lights incident on the front surface of the controller 7, only an infrared light to pass therethrough. Here, the markers 8L and 8R located adjacent to the screen of the television 2 are infrared LEDs which output infrared lights forward from the television 2. Thus, by providing the infrared filter 741, images of the markers 8L and 8R can be more accurately taken. The lens 742 converges the infrared light which has passed through the infrared filter 741, and outputs the infrared light to the image pickup element 743. The image pickup element 743 is a solid-state image pickup element such as a CMOS sensor or a CCD. The image pickup element 743 takes an image of the infrared light collected by the lens 742. In other words, the image pickup element 743 takes an image of only the infrared light which has passed through the infrared filter 741. Then, the image pickup element 743 generates image data of the image. Hereinafter, an image taken by the image pickup element 743 is referred to as a taken image. The image data generated by the image pickup element 743 is processed by the image processing circuit 744. The image processing circuit 744 calculates a position of an imaging target whose image is to be taken (the markers 8L and 8R) in the taken image. Hereinafter, a method for calculating the position of the imaging target will be described with reference to FIG. 8.

Figure 8:
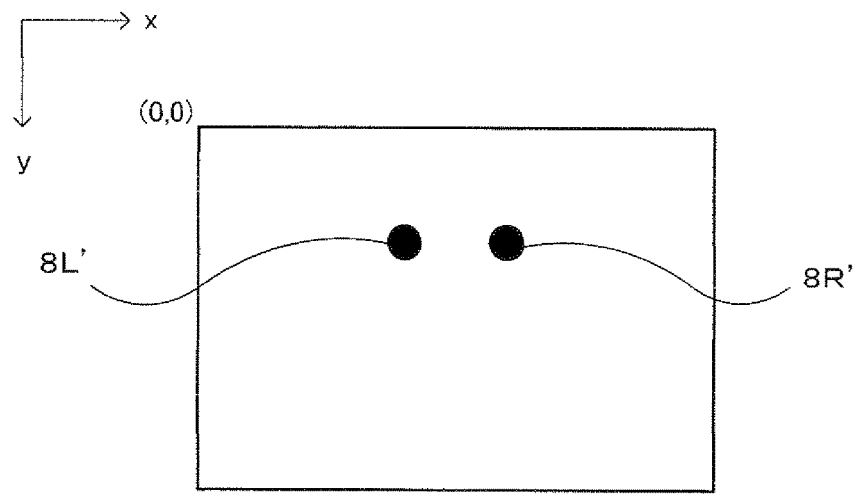
FIG. 8 is a view showing an example of a taken image.

FIG. 8 is a view showing an example of a taken image. In the taken image shown in FIG. 8, an image 8L' of the marker 8L and an image 8R' of the marker 8R are aligned side by side. When a taken image is inputted, the image processing circuit 744 calculates a coordinate indicating a position of each area, in the taken image, which meets a predetermined condition. Here, the predetermined condition is a condition for identifying an image of the imaging target (a target image), and is specifically that an area (high brightness area) has a brightness of a predetermined value or larger and a size of a predetermined range or larger. The predetermined condition may be a condition for identifying the imaging target, and in an alternative embodiment, the predetermined condition may include a condition regarding a color of an image.

When calculating a position of the target image, the image processing circuit 744 identifies the high brightness area as a candidate for the target image from the whole area of the taken image. This is because the target image appears as a high brightness area in image data of the taken image. Next, based on the size of the identified high brightness area, the image processing circuit 744 executes determination processing of determining whether or not the high brightness area is the target image. The taken image may include images other than the target image by sunlight incoming through a window and light from a fluorescent lamp in a room, in addition to the images 8L' and 8R' of the two markers 8L and 8R which are target images. In this case, the images other than the images 8L' and 8R' of the markers 8L and 8R appear as high brightness areas. The above determination processing is processing for distinguishing the images 8L' and 8R' of the markers 8L and 8R, which are target images, from the other images, and accurately identifying the target images. Specifically, in the determination processing, whether or not the identified high brightness area has a size of a predetermined range or smaller is determined. When the high brightness area has a size of the predetermined range or smaller, it is determined that the high brightness area indicates a target image. When the high brightness area does not have a size of the predetermined range or smaller, it is determined that the high brightness area indicates an image other than the target images.

Further, the image processing circuit 744 calculates a position of the high brightness area which is determined to indicate a target image as the result of the determination processing. Specifically, the image processing circuit 744 calculates a position of the center of the high brightness area. It is noted that the position of the center can be calculated on a scale smaller than the resolution of the image pickup element 743. Here, the resolution of an image taken by the image pickup element 743 is 126×96, and the position of the center is calculated on a scale of 1024×768. In other words, the coordinate of the position of the center is represented by integer values of (0, 0) to (1024, 768). As shown in FIG. 8, a position in the taken image is represented by a coordinate system (xy coordinate system) whose origin is at the upper left corner of the taken image, whose y-axis positive direction is the downward direction, and whose x-axis positive direction is the rightward direction.

As described above, the image processing circuit 744 calculates a coordinate indicating a position of each area, in the taken image, which meets the predetermined condition. Hereinafter, a coordinate calculated by the image processing circuit 744 is referred to as a marker coordinate. The marker coordinate is a coordinate indicating the position of an imaging target in a coordinate system for representing a position in a plane corresponding to the taken image. The image processing circuit 744 outputs the marker coordinate to the microcomputer 751 of the communication section 75. Data of the marker coordinate is transmitted as operation data by the microcomputer 751 to the game apparatus main body 3. Because the marker coordinate changes in accordance with the facing direction (orientation) and the position of the controller 7, the game apparatus main body 3 can calculate the facing direction and the position of the controller 7 using the coordinate values. It is noted that although the image processing circuit 744 and/or the microcomputer 751 of the controller 7 execute processing up to calculation of the marker coordinate from the taken image in the present embodiment, for example, the taken image may be transmitted to the game apparatus main body 3 and the CPU 10 of the game apparatus main body 3 may execute the same processing as the processing thereafter.

The controller 7 preferably includes a three-axis (x-axis, y-axis, and z-axis) acceleration sensor 701. The three-axis acceleration sensor 701 detects linear acceleration in three directions, i.e., an up-down direction, a left-right direction, and a front-rear direction. In an alternative embodiment, a two-axis accelerometer which detects only linear acceleration along each of the up-down direction and the left-right direction (or another pair of directions) may be used depending on the type of control signals used in the game processing. As a non-limiting example, the two-axis or three-axis acceleration sensor 701 may be of the type available from Analog Devices, Inc. or STMicroelectronics N.V. Preferably, the acceleration sensor 701 may be of electrostatic capacitance or capacitance-coupling type which is based on silicon micro-machined HEMS (Micro Electra Mechanical systems) technology. However, any other suitable accelerometer technology (e.g., piezoelectric type or piezoresistance type) now existing or later developed may be used to provide the two-axis or three-axis acceleration sensor 701.

As one skilled in the art understands, accelerometers, as used in the acceleration sensor 701, are only capable of detecting acceleration along a straight line (linear acceleration) corresponding to each axis of the acceleration sensor. In other words, the direct output of the acceleration sensor 701 is signals indicative of linear acceleration (static or dynamic) along each of the one, two or three axes thereof. As a result, the acceleration sensor 701 cannot directly detect physical characteristics such as movement along a non-linear (e.g. arcuate) path, rotation, rotational movement, angular displacement, inclination, position, orientation and the like.

However, through processing by a computer such as the processor of the game apparatus main body 3 (e.g. the CPU 10) or the processor of the controller 7 (e.g. the microcomputer 751) based on the linear acceleration signals outputted from the acceleration sensor 701, additional information relating to the controller 7 can be inferred or calculated, as one skilled in the art will readily understand from the description herein. For example, when the processing is performed by the computer on the assumption that the controller 7 provided with the acceleration sensor 701 is in static state (or when the processing is performed while only gravitational acceleration is detected by the acceleration sensor 701), if the controller 7 is actually in static state, the detected acceleration is used to determine whether or not the controller 7 is inclined relative to the direction of gravity or how many degrees the controller 7 is inclined relative to the direction of gravity. More specifically, when a state where the detection axis of the acceleration sensor 701 extends in a vertically-down direction is set as a standard state, it is possible to determine whether or not the controller 7 is inclined by determining whether 1G (gravitational acceleration) is applied in the direction of the detection axis of the acceleration sensor 701. It is also possible to determine how many degrees the controller 7 is inclined with respect to the vertically-downward direction by determining the magnitude of the acceleration applied in the above detection axis direction. In addition, in the case of a multi-axis acceleration sensor, it is possible to determine in detail how many degrees each axis is inclined relative to the direction of gravity through processing of a signal of acceleration detected for each axis. In this case, a processor may perform processing based on the output from the acceleration sensor 701 for calculating inclination angle data of the controller 7. Alternatively, processing may be performed so as to infer rough inclination of the controller 7 based on the output from the acceleration sensor 701 without calculating the inclination angle data. As described above, the acceleration sensor 701 is used in combination with the processor to determine inclination, orientation or position of the controller 7. On the other hand, on the assumption that the acceleration sensor 701 is in dynamic state, the acceleration sensor 701 detects acceleration corresponding to motion of the acceleration sensor 701 in addition to a gravitational acceleration component. Thus, it is possible to determine the direction of the motion of the controller 7 by eliminating the gravitational acceleration component through predetermined processing. More specifically, various movements and/or positions of the controller 7 can be calculated or inferred through processing of the acceleration signal generated by the acceleration sensor 701 when the controller 7 provided with the acceleration sensor 701 is subjected to dynamic acceleration by the hand of the player. It is noted that even on the assumption that the acceleration sensor 701 is in dynamic state, it is possible to determine inclination of the controller 7 relative to the direction of gravity by eliminating acceleration corresponding to the motion of the acceleration sensor 701 through predetermined processing. In an alternative embodiment, the acceleration sensor 701 may include an embedded signal processor or another type of a dedicated processor for performing any desired processing of the acceleration signals outputted from accelerometers therein prior to outputting signals to the microcomputer 751. For example, the embedded or dedicated processor could convert the detected acceleration signal into a corresponding tilt angle (or another suitable parameter) when the acceleration sensor 701 is intended to detect static acceleration (i.e., gravitational acceleration).

In an alternative embodiment, a gyro-sensor of any suitable technology incorporating, for example, a rotating or vibrating element may be used as a sensor for detecting motion of the controller 7. Exemplary MEMS gyro-sensors which may be used in this embodiment are available from Analog Devices, Inc. Unlike the linear acceleration sensor 701, a gyro-sensor is capable of directly detecting rotation (or angular rate) around an axis defined by the gyroscopic element (or elements) therein. Thus, due to the fundamental differences between a gyro-sensor and a linear acceleration sensor, corresponding changes need to be made to the processing operations which are performed on the output signals from these devices depending on which device is selected for a particular application.

Specifically, when a gyro-sensor is used instead of an acceleration sensor to calculate inclination and orientation, significant changes are necessary. More specifically, when a gyro-sensor is used, the value of inclination is initialized at the start of detection. Then, data on angular velocity which is outputted from the gyro-sensor is integrated. Furthermore, a change amount in inclination from the value of tilt previously initialized is calculated. In this case, the calculated inclination is determined as a value corresponding to an angle. In contrast, when an acceleration sensor is used, inclination is calculated by comparing the value of the gravitational acceleration of each axial component with a predetermined reference. Therefore, the calculated inclination can be represented as a vector. Thus, without initialization, an absolute direction can be determined with an accelerometer. The type of the value calculated as an inclination is also different between a gyro-sensor and an accelerometer; i.e., the value is an angle when a gyro-sensor is used and is a vector when an accelerometer is used. Therefore, when a gyro-sensor is used instead of an acceleration sensor, data on inclination also needs to be processed by a predetermined conversion that takes into account the fundamental differences between these two devices. Due to the fact that the nature of gyro-sensors is known to one skilled in the art, as well as the fundamental differences between accelerometers and gyro-sensors, further details are not provided herein. While gyro-sensors provide certain advantages due to their ability to directly detect rotation, acceleration sensors are generally more cost-effective as compared with the gyro-sensors when used for the controller of the present embodiment.

The communication section 75 includes the microcomputer 751, a memory 752, the wireless module 753, and the antenna 754. The microcomputer 751 controls the wireless module 753 for wirelessly transmitting the transmission data while using the memory 752 as a storage area during processing. The microcomputer 751 controls the operations of the sound IC 707 and the vibrator 704 in accordance with the data which the wireless module 753 receives from the game apparatus main body 3 via the antenna 754. The sound IC 707 processes the sound data and the like transmitted from the game apparatus main body 3 via the communication section 75. The microcomputer 751 actuates the vibrator 704 in accordance with the vibration data (e.g. a signal for actuating or unactuating the vibrator 704) transmitted from the game apparatus main body 3 via the communication section 75.

Data from the controller 7 including an operation signal (key data) from the operation section 72, acceleration signals (acceleration data of directions of x-axis, y-axis, and z-axis which is hereinafter referred to merely as acceleration data) from the acceleration sensor 701, and the process result data from the imaging information calculation section 74 are outputted to the microcomputer 751. The microcomputer 751 temporarily stores the input data (the key data, the acceleration data, and the process result data) in the memory 752 as the transmission data which is to be transmitted to the wireless controller module 19. The wireless transmission from the communication section 75 to the wireless controller module 19 is performed periodically at a predetermined time interval. Because game processing is generally performed at a cycle of 1/60 sec., data needs to be collected and transmitted at a cycle of a shorter time period. Specifically, the game processing unit is 16.7 ms (1/60 sec.), and the transmission interval of the communication section 75 structured using the Bluetooth technology is 5 ms. At the transmission timing to the wireless controller module 19, the microcomputer 751 outputs the transmission data stored in the memory 752 as a series of operation information to the wireless module 753. The wireless module 753 uses, for example, the Bluetooth technology to modulate the operation data onto a carrier wave of a predetermined frequency and to radiate the resultant radio signal from the antenna 754. Thus, the key data from the operation section 72 provided in the controller 7, the acceleration data from the acceleration sensor 701, and the process result data from the imaging information calculation section 74 are modulated into the radio signal by the wireless module 753 and transmitted from the controller 7. The wireless controller module 19 of the game apparatus main body 3 receives the radio signal, and the game apparatus main body 3 demodulates or decodes the radio signal to obtain the series of operation information (the key data, the acceleration data, and the process result data). Based on the obtained operation information and the game program, the CPU 10 of the game apparatus main body 3 performs the game processing. In the case where the communication section 75 is structured using the Bluetooth technology, the communication section 75 can have a function of receiving transmission data which is wirelessly transmitted from another device.

[Outline of Game Assumed in the Present Embodiment]

Figure 9:
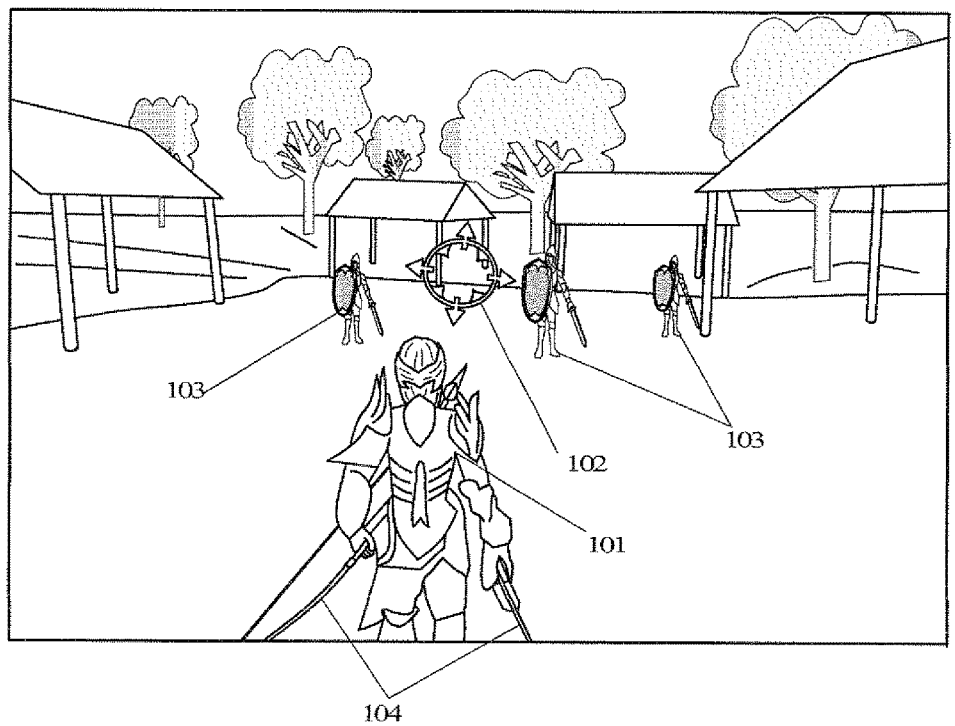
FIG. 9 is a view showing an example of a game image assumed in an embodiment of the present invention.

Next, with reference to FIG. 9 to FIG. 15, an outline of the game assumed in the present embodiment will be described. The game assumed in the present embodiment is a fighting game set in a virtual three-dimensional space. FIG. 9 is a view showing an example of a game image assumed in the present embodiment. In FIG. 9, a player object 101, a pointer 102, an enemy object 103, and the like are displayed on the game image. In the present game, the game image is rendered in a so-called third person viewpoint in which a virtual camera is located behind the player object 101. The player object 101 holds a bow-and-arrow object 104. In the present game, the player object 101 defeats the enemy object 103 using the bow-and-arrow object 104.

Next, operations performed in the present game will be described. In the present game, as shown in FIG. 10, the player controls the player object 101, using the extended controller 36 connected to the connector 73 of the controller 7. Here, the extended controller 36 includes an analog stick 39 capable of performing an analog input. Also, the extended controller 36 includes an acceleration sensor (not shown) similar to the already described acceleration sensor 701 included in the controller 7. A computer such as a processor (for example, the CPU 10) of the game apparatus main body 3 or a processor (for example, the microcomputer 751) of the controller 7 performs a process based on an acceleration signal outputted by the acceleration sensor of the extended controller 36, whereby the inclination, the orientation, and the like of the extended controller 36 are calculated in the same manner as the inclination, the orientation, and the like of the controller 7. When playing the game, for example, as shown in FIG. 11, the player holds the controller 7 with a right hand and the extended controller 36 with a left hand. In this case, the player holds the controller 7 such that the front surface of the controller 7 (that is, a side having an entrance through which light is incident on the imaging information calculation section 74 taking an image of the light) held with the right hand faces the markers 8L and 8R (that is, toward the television 2). In this state, the player can perform a game operation by tilting the controller 7, changing a position on the screen at which the controller 7 points (a pointing position), or changing the distance between the controller 7 and the markers 8L and 8R (the television 2). In the game of the present embodiment, an operation for moving the player object 101 is mainly performed with the extended controller 36 held with the left hand, and an operation for moving the pointer 102 and an attack operation with the bow-and-arrow object 104 is mainly performed with the controller 7 held with the right hand. Here, the present game is a fighting game as described above, and an attack action performed by the player object 101 is an action of "shooting" the enemy object 103 using the bow-and-arrow object 104. Therefore, hereinafter, an operation for performing such an attack is referred to as an "arrow-shooting operation".

First, an operation for moving the player object 101 using the extended controller 36 will be briefly described. When the player tilts the analog stick 39 of the extended controller 36, held with the left hand, in the upward direction, the player object 101 moves forward. When the player tilts the analog stick 39 in the downward direction, the player object 101 moves backward. When the player tilts the analog stick 39 in the rightward direction, the player object 101 moves horizontally rightward (moves rightward without changing the facing direction of the player object; e.g. a motion of rightward side stepping while facing forward). When the player tilts the analog stick 39 in the leftward direction, the player object 101 moves horizontally leftward.

Figure 12:
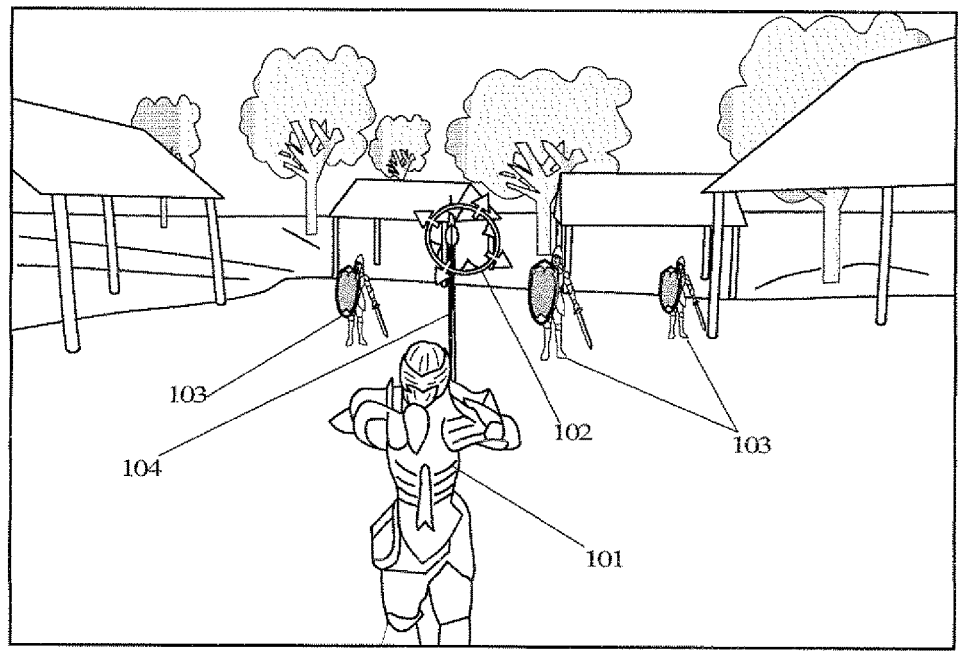
FIG. 12 is an example of the game image assumed in an embodiment of the present invention.
Figure 13:
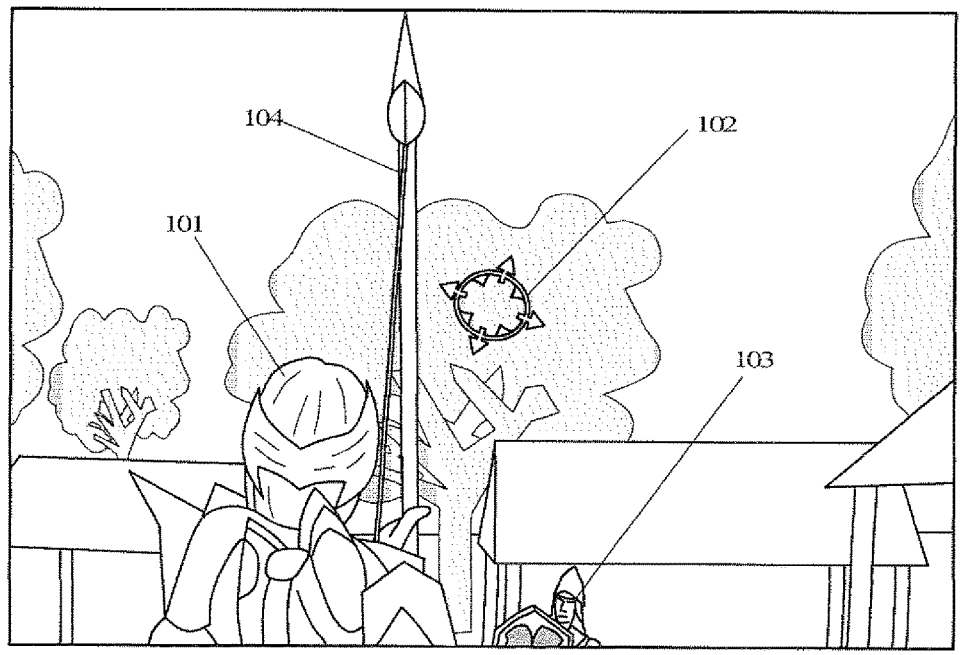
FIG. 13 is an example of the game image assumed in an embodiment of the present invention.

Next, an operation using the controller 7 will be briefly described. First, in the game image as shown in FIG. 9, the pointer 102 is displayed at a position at which the controller 7 points (a pointing position). The pointer 102 indicates the direction in which an arrow is to be shot. When the player presses the operation buttons 72d and 72i of the controller 7 (see FIG. 3 and FIG. 4; hereinafter, referred to as an A Button and a B button, respectively), the player object 101 holds the bow-and-arrow object 104 ready to shoot as shown in FIG. 12. Next, when the player moves the controller 7 away from the markers 8L and 8R (television 2) with the A and B buttons pressed, the player object 101 performs a motion of drawing the bow of the bow-and-arrow object 104, and concurrently, the game image is enlarged (zoomed-in) as shown in FIG. 13. Here, the player can aim at the enemy object 103 or the like by adjusting the orientation and the like of the controller 7 so as to move the pointer 102 while seeing the enlarged image.

FIG. 14 is a view specifically illustrating a motion of the player moving the controller 7 away from the marker 8L and 8R (television 2) while pressing the A and H buttons. In FIG. 14, the player holds the controller 7 with its front surface facing the markers 8L and 8R (television 2). Here, the distance from the midpoint of the markers 8L and 8R to the front surface of the controller 7 is a distance real D. For example, a state A shown in FIG. 14 is a state where the player has pressed both the A and B buttons of the controller 7 at the position of a distance real D0. The state A corresponds to the state where the player object 101 holds the bow-and-arrow object 104 ready to shoot as described above (see FIG. 12). Then, the player moves the controller 7 backward with respect to the television 2 while pressing both of the A and B buttons. Accordingly, the distance real D from the midpoint of markers 8L and 8R to the front surface of the controller 7 increases, resulting in a state B shown in FIG. 14. The state B corresponds to the state where the bow is drawn and concurrently, the game image is enlarged as described above (see FIG. 13).

Figure 15:
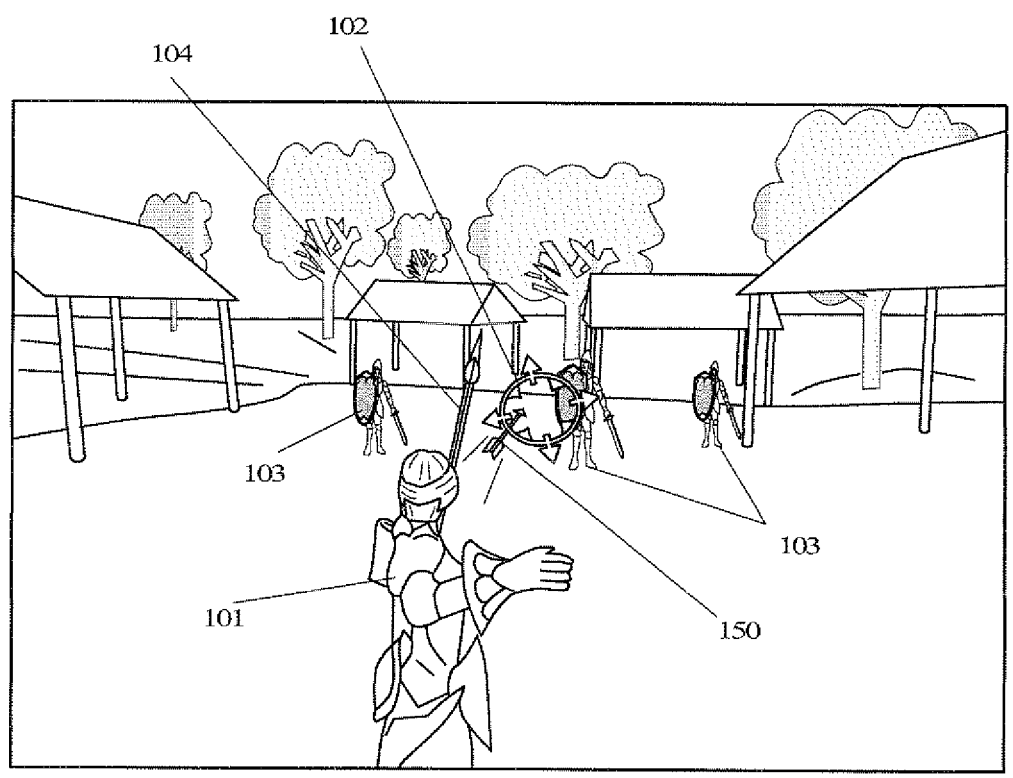
FIG. 15 is an example of the game image assumed in an embodiment of the present invention.

Next, as shown in FIG. 15, when the user releases at least one of the A and B buttons that have been pressed, the player object 101 shoots an arrow 150, and concurrently, the enlarged image (see FIG. 13) returns to the original magnification (the magnification shown in FIG. 9 and FIG. 12; hereinafter referred to as a base magnification).

As described above, the player performs operations of: drawing the controller 7 while pressing the A and B buttons; adjusting the orientation and the like of the controller 7 to aim at the target while looking at the enlarged game image; and then releasing at least one of the A and B buttons that have been pressed. In this manner, the player can cause the player object 101 to perform a series of operations of drawing the bow and releasing the arrow. At the same time when the player object 101 shoots an arrow, the enlarged game image automatically returns to its game image at the base magnification. In this manner, the player can easily aim at the target when the player object 101 draws the bow, and can proceed to the next operation without performing onerous operations after the player object 101 has shot the arrow. Moreover, since the operations described above are similar to the operations performed by a person drawing an actual bow, the player can have a realistic feeling as if the player were shooting an arrow.

[Details of Game Processing]

Figure 16:
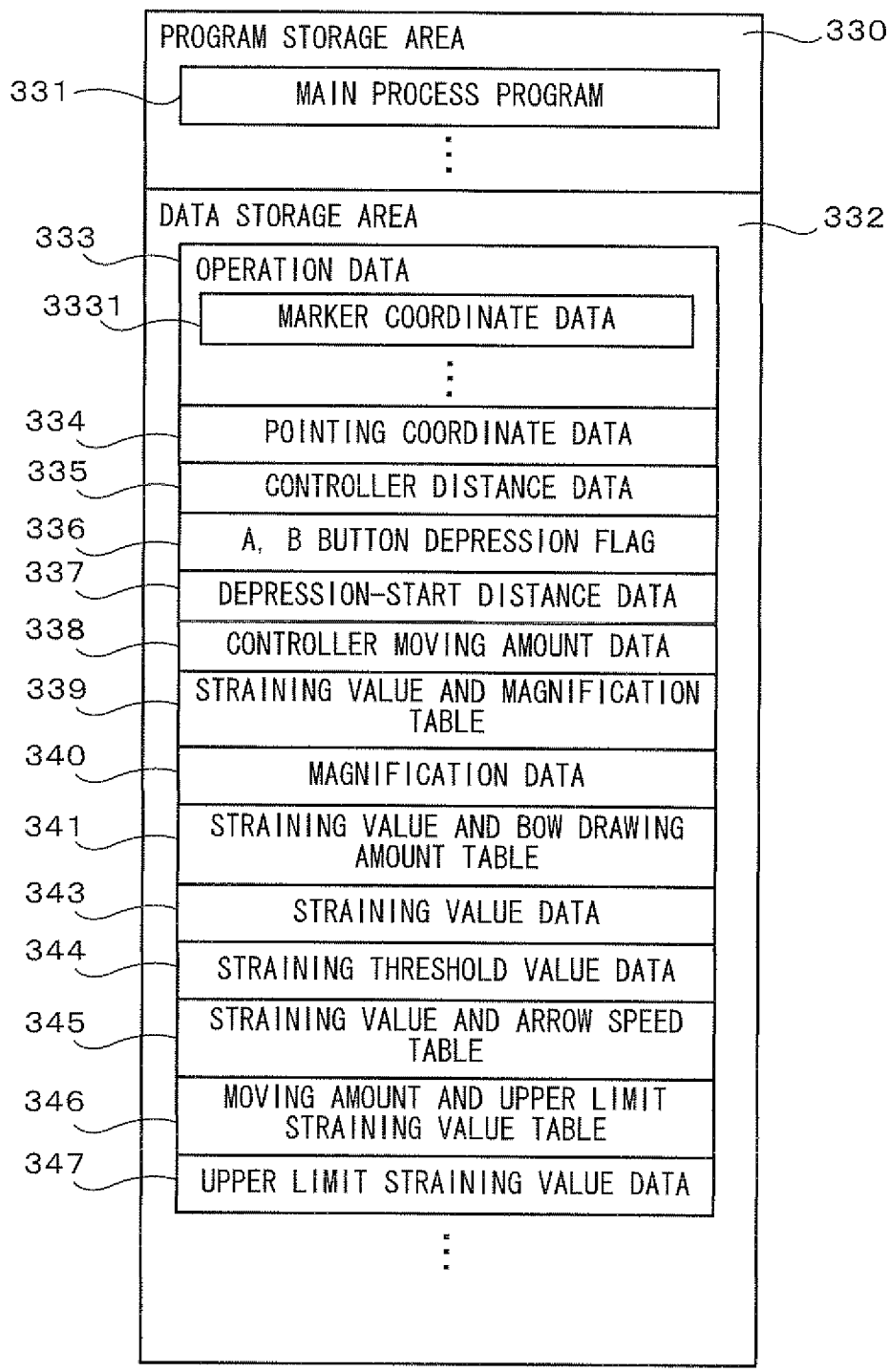
FIG. 16 is a view showing a memory map of an external main memory 12 in the game apparatus main body 3 according to a first embodiment of the present invention.

Next, the game processing performed by the game apparatus main body 3 will be described in detail. First, data to be stored in the external main memory 12 in the game processing will be described. FIG. 16 is a view showing a memory map of the external main memory 12 in the game apparatus main body 3. As shown in FIG. 16, the external main memory 12 includes a program storage area 330 and a data storage area 332. A part of the data to be stored in the program storage area 330 and the data storage area 332 is stored in the optical disc 4, and is transferred to and stored in the external main memory 12 at the time of the execution of the game program.

Stored in the program storage area 330 are programs, such as a main process program 331 for performing processing of a flow chart shown in below-described FIG. 17, and the like.

The data storage area 332 stores operation data 333, pointing coordinate data 334, controller distance data 335, an A, B button depression flag 336, depression-start distance data 337, controller moving amount data 338, a straining value and magnification table 339, magnification data 340, a straining value and bow drawing amount table 341, straining value data 343, straining threshold value data 344, straining value and arrow speed table 345, a moving amount and upper limit straining value table 346, upper limit straining value data 347, and the like.

The operation data 333 is data obtained from the controller 7, and includes marker coordinate data 3331 indicating the above-described marker coordinate (see FIG. 8). When at least one of the markers 8L and 8R as shown in FIG. 8 does not appear in the taken image, a value (e.g. a NULL value) indicating this is set in the marker coordinate data 3331. In addition, the operation data 333 includes data indicating contents of operations by the player, such as data indicating a state of pressing of each button, acceleration data, data indicating contents of an operation performed on the extended controller 36 (an operation of the above-described analog stick 39, and the like).

The pointing coordinate data 334 is data calculated based on the marker coordinate data 3331, and indicates a pointing coordinate of a position pointed at by the controller 7.

The controller distance data 335 is data indicating a current value of the distance real D between the controller 7 and the television 2 as described above with reference to FIG. 14.

The A, B button depression flag 336 is a flag indicating whether or not the A and B buttons are in a state where they are both pressed. The flag set at ON indicates a state where the A and B buttons are both pressed, and the flag set at OFF indicates a state where at least one of the A and B buttons is not pressed.

The depression-start distance data 337 is data indicating the value of the controller distance data 335 at the time when both of the A and B buttons are pressed. In other words, the depression-start distance data 337 is data indicating the distance real D between the controller 7 and the television 2 (real D0 in FIG. 14) at the time when both of the A and B buttons are pressed.

The controller moving amount data 338 is data indicating a value obtained by subtracting a value indicated by the depression-start distance data 337 from a value indicated by the controller distance data 335. It is noted that the controller moving amount data 338 is calculated only when the value indicated by the controller distance data 335 is greater than the value indicated by the depression-start distance data 337. That is, the controller moving amount data 338 is data indicating the distance (moving amount) by which the controller 7 is moved backward, with respect to the television 2, from the position where the controller 7 has been at the time when both of the A and B buttons are pressed (state A in FIG. 14).

The straining value and magnification table 339 is a table that associates a straining value indicated by the straining value data 343 with a magnification of a game image, and that indicates the relationship in which the magnification of the game image increases in accordance with an increase of the straining value indicated by the straining value data 343. In addition, in the straining value and magnification table 339, the magnification corresponding to the straining value 0 indicated by the straining value data 343 is 1-fold (base magnification), which serves as the base magnification on which the magnification of the game image is determined. It is noted that the straining value and magnification table 339 may be replaced with a formula indicating a proportional relationship, and the like.

The magnification data 340 is data indicating a magnification of the game image determined by using the straining value and magnification table 339. It is noted that the initial value (a value at the time when the game is started) of the magnification indicated by the magnification data 340 is 1-fold (base magnification).

The straining value and bow drawing amount table 341 is a table that associates a straining value indicated by the straining value data 343 with an amount (length) by which a bow is drawn in the game space, and that indicates the relationship in which the amount by which the bow is drawn increases in accordance with an increase of the straining value indicated by the straining value data 343. It is noted that the straining value and bow drawing amount table 341 may be replaced with a formula indicating a proportional relationship, and the like.

The straining value data 343 is data indicating a straining value which is increased in accordance with the time period during which the moving amount indicated by the controller moving amount data 338 maintains a positive value.

In other words, the straining value data 343 is data indicating a straining value, which is a value to be increased in accordance with the time period during which the controller 7 is being drawn. It is noted that the straining value may be linearly increased at a predetermined rate, or alternatively, may be non-linearly increased.

The straining threshold value data 344 is data indicating a predetermined threshold value used with respect to the straining value indicated by the straining value data 343. For example, the straining threshold value data 344 is data indicating a straining value corresponding to a time period of 3 seconds during which the moving amount indicated by the controller moving amount data 338 maintains a positive value.

The straining value and arrow speed table 345 is a table that associates a straining value indicated by the straining value data 343 with a speed at which an arrow object flies in the game space, and that indicates the relationship in which the speed at which the arrow object flies increases in accordance with an increase of the straining value indicated by the straining value data 343. It is noted that the straining value and arrow speed table 345 may be replaced with a formula indicating a proportional relationship, and the like.

The moving amount and upper limit straining value table 346 is a table that associates a moving amount indicated by the controller moving amount data 338 with an upper limit of the straining value indicated by the straining value data 343, and that indicates the relationship in which the upper limit of the straining value indicated by the straining value data 343 increases in accordance with an increase of the moving amount indicated by the controller moving amount data 338. It is noted that the moving amount and upper limit straining value table 346 may be replaced with a formula indicating a proportional relationship, and the like.

The upper limit straining value data 347 is data indicating an upper limit of the straining value indicated by the straining value data 343, the upper limit having being determined by using the moving amount and upper limit straining value table 346.

Figure 18:
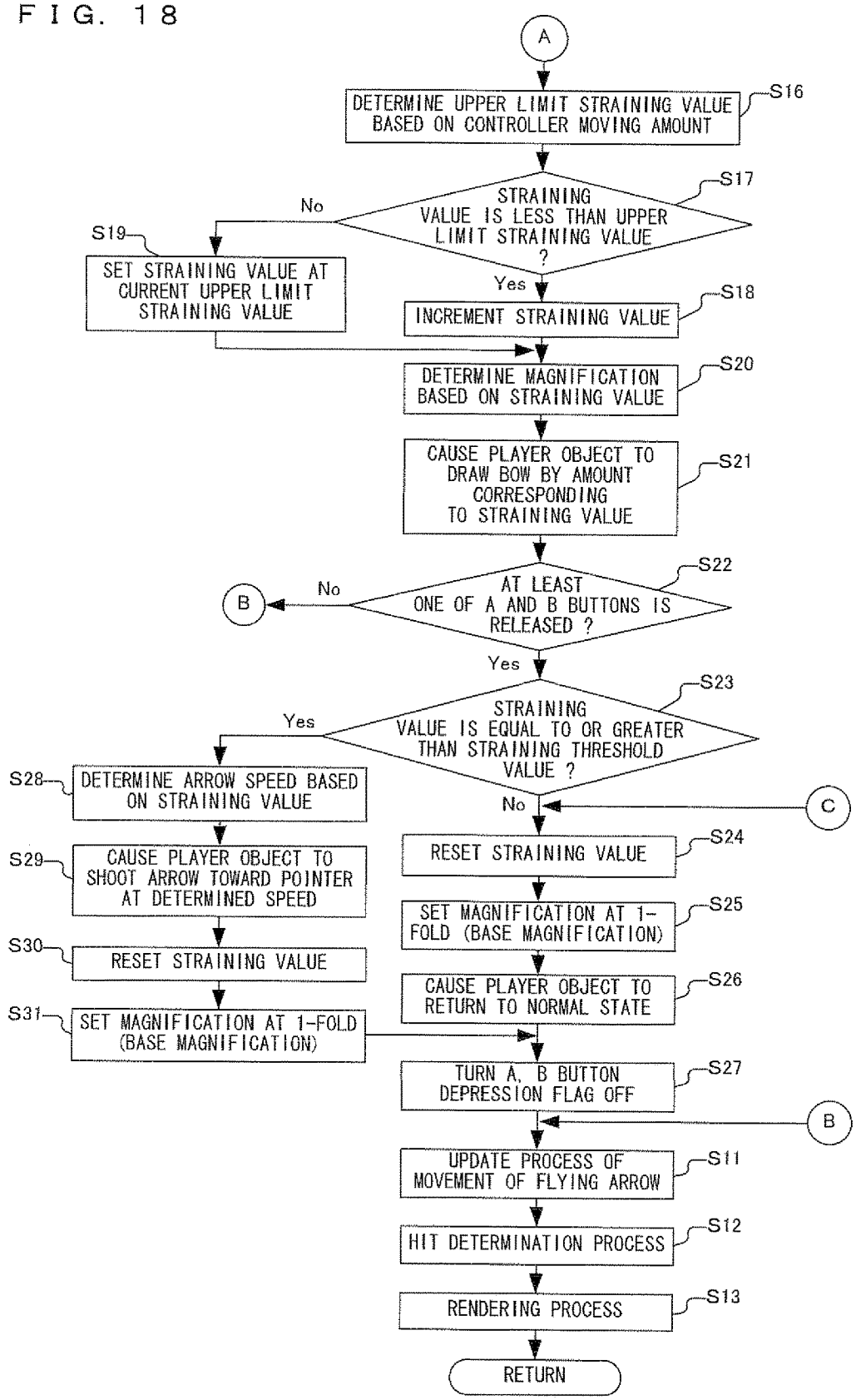
FIG. 18 is a flowchart showing processing according to the first embodiment of the present invention.
Figure 19:
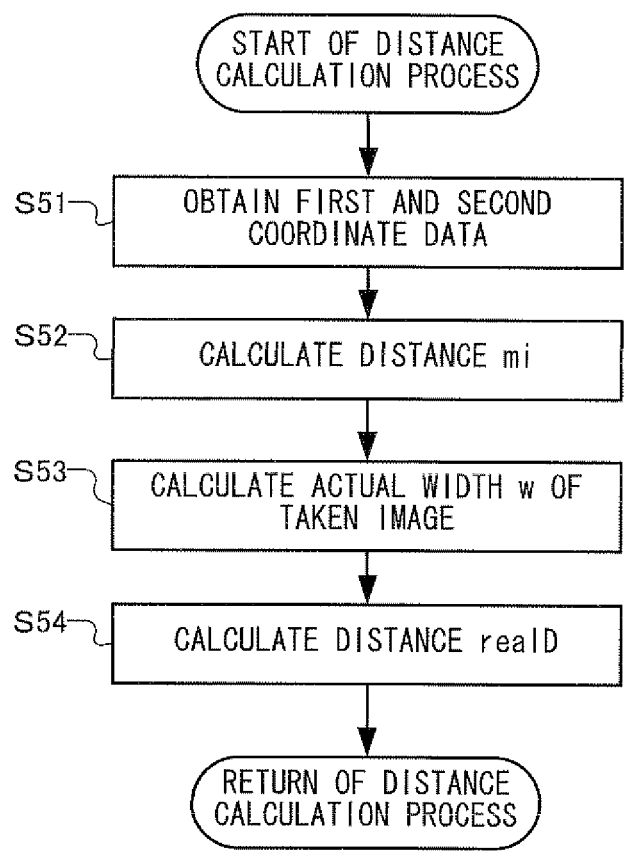
FIG. 19 is a flowchart showing a process of step S5 in FIG. 17.

Next, with reference to FIG. 17 to FIG. 20, the game processing performed by the game apparatus main body 3 will be described. FIG. 17 and FIG. 18 are flowcharts showing the game processing performed by the game apparatus main body 3. FIG. 19 is a subroutine showing in detail a distance calculation process in FIG. 17 (step S5). FIG. 20 is a view illustrating the distance calculation process in FIG. 17. The processing of the flow charts in FIG. 17 and FIG. 18 is repeated every frame (for example, 1/60 second), whereby the game proceeds. In the following, a typical flow of the processing performed per frame will be described. In addition, in the following, only the processing regarding the arrow-shooting operation among the operations of the whole game processing will be described. Other processing that is not directly relevant to the present invention will not be described in detail.

First, in step S1, the CPU 10 arranges objects (the player object, the enemy object, and the like) in the game space (virtual space).

Next, in step S2, the CPU 10 obtains, from the external main memory 12, marker coordinate data 3331 which is among the operation data.

Next, in step S3, the CPU 10 determines whether or not the markers have been detected in an image taken by the controller 7. In other words, the CPU 10 determines whether or not the front surface of the controller 7 faces the television 2. Specifically, the CPU 10 determines whether or not the images (8L', 8R') of the markers 8L and 8R appear in the taken image as shown in FIG. 8. When at least one of the markers 8L and 8R does not appear in the taken image, a value (e.g. a NULL value) indicating this is set in the marker coordinate data 3331. Therefore, by determining whether or not such a value is set, the CPU 10 can determine whether or not the front surface of the controller 7 faces the television 2. As a result of the determination in step S3, when the CPU 10 has not detected at least one of the markers 8L or 8R (NO in step S3), the processing proceeds to step S11 shown in FIG. 18. On the other hand, when the CPU 10 has detected both of the markers 8L and 8R (YES in step S3), the processing proceeds to step S4.

In step S4, the CPU 10 calculates a pointing coordinate that represents a position, on the screen of the television 2, pointed at by the controller 7. Hereinafter, an example of a method for calculating the pointing coordinate will be described. As described above, the marker coordinate data 3331 includes two marker coordinates corresponding to the markers 8L and 8R (see FIG. 8), respectively. The CPU 10 calculates the midpoint of the two marker coordinates. The position of the midpoint is represented by using an xy coordinate system for representing a position in a plane corresponding to the taken image. Next, the CPU 10 converts the coordinates (x, y) indicating the position of the midpoint into coordinates (x', y') in an x'y' coordinate system for representing a position in the screen of the television 2. This conversion can be performed by using a function for converting the coordinate of the midpoint calculated from the taken image into a coordinate in the screen of the television 2 corresponding to the actual pointing position of the controller 7 at the time when the image is taken. In this case, because the pointing position of the controller 7 is moved in a direction reverse to the positions of the marker coordinates in the taken image, the conversion is performed such that right and left and up and down are inverted. The coordinate represented by x'y' coordinate values calculated in this manner is the pointing coordinate of the controller 7. The CPU 10 updates the pointing coordinate data 334 of the external main memory 12 using the calculated pointing coordinate. In the game image, a pointer 102 is displayed at the pointing coordinate (see FIG. 9).

Next, in step S5, the CPU 10 performs the distance calculation process for calculating the current distance (real D in FIG. 14) between the controller 7 and the television 2 (markers 8L and 8R). In the distance calculation process, the CPU 10 uses the marker coordinates contained in the marker coordinate data 3331. The marker coordinates are coordinates representing the positions of the image 8L' of the marker 8L and the image 8R' of the marker 8R, respectively, in the image taken by the controller 7, as described with reference to FIG. 8. Here, data of the marker coordinate representing the position of the image 8L' of the marker 8L is first coordinate data. Data of the marker coordinate representing the position of the image 8R' of the marker 8R is second coordinate data. Hereinafter, the processing in step S5 will be described in detail with reference to FIG. 19 and FIG. 20.

In FIG. 19, the CPU 10 obtains the first coordinate data and the second coordinate data from the external main memory 12 (step S51), so as to calculate a distance mi (step S52). Here, as shown in FIG. 20, the distance mi is the distance between the two points in the taken image. These two points correspond to the image 8L' and the image 8R', whose coordinates have been obtained as the first coordinate data and the second coordinate data, respectively. Therefore, the CPU 10 can calculate the distance mi by using the first coordinate data and the second coordinate data. Specifically, if the first coordinate data is position coordinates (Lx, Ly) and the second coordinate data is position coordinates (Rx, Ry), the distance mi is calculated by using:

$$mi = \sqrt{(Rx-Lx)^2 + (Ry-Ly)^2}$$

Next, the CPU 10 calculates a width w (see FIG. 20) which indicates, in association with the setting positions of the markers 8L and 8R, a width along which the image pickup element 743 can take an image (step S53). Here, the width w is calculated by using the following formula:

$$w = wi \times m / mi,$$

where m is the setting interval between the markers 8L and 8R (an actual setting interval; for example, 20 cm) and is a fixed value; and wi is the width wi of the image taken by the image pickup element 743, the width wi corresponding to the width w, and is a fixed value. Since both of the setting interval m and the width wi are fixed values, these values are prestored in storage means (not shown) in the game apparatus main body 3. It is noted that the player may determine the setting interval m by setting the markers 8L and 8R at any interval in accordance with the player's environment. In such a case, if the player inputs the interval between the setting positions of the markers 8L and 8R as the setting interval m, the width w can be similarly obtained by using the above formula.

Next, the CPU 10 calculates the current distance real D between the markers 8L and 8R and the image pickup element 743 (controller 7) (see FIG. 20) by using the width w and a viewing angle θ of the image pickup element 743, updates the controller distance data 335 stored in the external main memory 12 with the calculated current distance real D (step S54), and ends the processes of the subroutine. Here, the current distance real D is calculated by using the following formula:

$$\text{real } D=(w/2)/\{\tan(\theta/2)\}.$$

Being a fixed value, the viewing angle θ is prestored in the storage means (not shown) in the game apparatus main body 3.

In the above description, with respect to the image taken by the controller 7, the current distance real D is calculated by using a distance between the marker coordinates respectively indicating the positions of the image 8L' of the marker 8L and the image 8R' of the marker 8R. However, with respect to the image taken by the controller 7 (i.e. the taken image), the current distance real D may be calculated by using at least one of the image 8L' of the marker 8L and the image 8R' of the marker 8R. Here, there is a relationship in which the size (diameter, for example) of the image 8L' (or image 8R') decreases in accordance with an increase of the current distance real D. Therefore, by using this relationship, the current distance real D can be calculated based on the diameter of the image 8L' (or image 8R'). Specifically, it is assumed that when the current distance real D is 1 m, the diameter of the image 8L' (or image 8R') in the image taken by the controller 7 is 5 mm, for example. Moreover, it is assumed that when the current distance real D is 2 m, the diameter of the image 8L' (or image 8R') in the image taken by the controller 7 is 3 mm, for example. In this case, if the diameter of the image 8L' is 4 mm, the current distance real D can be calculated to be 1.5 m. Further, the value of the real D may be determined, not by using such a calculation method, but by using a table associating the distance between the marker coordinates respectively indicating the positions of the image 8L' of the marker 8L and the image 8R' of the marker 8R, with the current distance real D, or by using a table associating the diameter of at least one of the image 8L' of the marker 8L, and the image 8R' of the marker 8R, with the current distance real D.

Next, in step S6, the CPU 10 determines, with reference to the operation data 333, whether or not the A and B buttons are in the state where they are both pressed. When it is determined that the A and B buttons are not in the state where they are both pressed (No in step S6), the processing proceeds to step S24 in FIG. 18. On the other hand, when it is determined that the A and B buttons are in the state where they are both pressed (YES in step S6), the processing proceeds to step S7.

In step S7, the CPU 10 checks whether or not the flag is ON with reference to the A, B button depression flag 336. When the A, B button depression flag 336 is ON (YES in step S7), the processing proceeds to step S14. In such a case, the A and B buttons of the controller 7 are already in the state where they are both pressed. On the other hand, when the A, B button depression flag 336 is not ON (NO in step S7), the processing proceeds to step S8. In such a case, the pressing of the A and B buttons is started.

In step S8, the CPU 10 causes the player object 101 to hold a bow and arrow ready to shoot in the game space (see FIG. 12). At this time, the player object 101 in the game space is in a state where the player object 101 has not drawn the bowstring of the bow yet.

Next, in step S9, the CPU 10 stores latest controller distance data 335 calculated in step S5 as depression-start distance data 337 (distance A) in the external main memory 12. In other words, the CPU 10 stores the distance A between the controller 7 and the television 2 at the time when the pressing of both of the A and B buttons of the controller 7 is started.

Next, in step S10, the CPU 10 turns the A, B button depression flag 336 ON.

Next, in step S11 (see FIG. 18), when there is an arrow flying in the game space, the CPU 10 causes the arrow to move in the game space and updates the position of the arrow.

Next, in step S12, when there is an arrow flying in the game space, the CPU 10 determines whether or not the arrow has hit an enemy. When the arrow has hit an enemy, the CPU 10 does damage, for example, to the enemy in the game space.

Next, in step S13, the CPU 10 notifies the GPU 11*b* of a graphics command (command for generating graphics) based on a value of magnification data 340 stored in the external main memory 12, states and a positional relationship of objects in the game space, and the like. Then, the GPU 11*b* performs a rendering process of the game image in accordance with the notification, and the television 2 displays the game image. Subsequently, the processing returns to step S1 in FIG. 17.

In the time period of one frame described above, the processing is performed by using a route of steps S1 to S13. That is, in the time period of the present single frame, the player performs an action of starting pressing of both the A and B buttons with the front surface of the controller 7 facing the television 2. Accordingly, the game image generated in the present step S13 is a game image reflecting the process of step S8 (the process of causing the player object 101 to hold the bow and arrow ready to shoot in the game space) and having a game image magnification of 1-fold (base magnification) (see FIG. 12).

Next, a case where the processes of steps S1 to S7 have been performed and the A, B button depression flag 336 is ON (YES in step S7) in step S7 will be described. In this case, the processing proceeds to step S14.

In step S14, the CPU 10 determines whether or not a value indicated by latest controller distance data 335 calculated in step S5 (distance B) is greater than the value indicated by the depression-start distance data 337 stored in step S9 in the external main memory 12 (distance A). In other words, the CPU 10 determines whether or not the controller 7 is moved backward, with respect to the television 2, from the position where the controller 7 had been at the time when the pressing of both of the A and B buttons of the controller 7 was started. When the distance B is not greater than the distance A (NO in step S14), the processing proceeds to step S32. In such a case, the controller 7 has approached the television 2, or the controller 7 maintains a certain distance from the television 2. On the other hand, when the distance B is greater than the distance A (YES in step S14), the processing proceeds to step S15. In such a case, the controller 7 has been moved away from the television 2.

In step S15, by performing subtraction of the distance A from the distance B, the CPU 10 calculates the distance (moving amount) by which the controller 7 has been moved backward, with respect to the television 2, from the position where the controller 7 had been at the time when the pressing of both of the A and B buttons of the controller 7 was started. Then, the CPU 10 updates the controller moving amount data 338 with the value of the calculated distance.

Next, in step S16 in FIG. 18, using the moving amount and upper limit straining value table 346, the CPU 10 determines an upper limit straining value based on the moving amount indicated by the latest controller moving amount data 338 calculated in step S15, and updates the upper limit straining value data 347 with the determined upper limit straining value. As described above, the upper limit of the straining value (upper limit straining value) indicated by the straining value data 343 increases in accordance with an increase of the value of the controller moving amount data 338. Subsequently, the processing proceeds to step S17.

In step S17, the CPU 10 determines whether or not the current straining value indicated by the current straining value data 343 is less than the upper limit straining value indicated by the upper limit straining value data 347 determined by using the moving amount and upper limit straining value table 346. When it is determined that the straining value indicated by the straining value data 343 is less than the upper limit straining value indicated by the upper limit straining value data 347 (YES in step S17), the processing proceeds to step S18. On the other hand, when it is determined that the straining value indicated by the straining value data 343 is not less than the upper limit straining value indicated by the upper limit straining value data 347 (NO in step S17), the processing proceeds to step S19.

In step S18, the CPU 10 increments the straining value indicated by the straining value data 343. Subsequently, the processing proceeds to step S20.

On the other hand, in step S19, the CPU 10 sets the straining value indicated by the straining value data 343, at the current upper limit straining value indicated by the current upper limit straining value data 347. Accordingly, for example, even when the player moves the controller 7 away from the television 2 and then moves the controller 7 back again to the vicinity of the television 2, it is possible to maintain the straining value equal to or less than the upper limit straining value such that the straining value indicated by the straining value data 343 does not exceed the upper limit straining value indicated by the upper limit straining value data 347. Subsequently, the processing proceeds to step S20.

In step S20, the CPU 10 determines, with reference to the straining value and magnification table 339, a magnification for the game image corresponding to the straining value indicated by the latest straining value data 343, and updates the magnification data 340 with the determined magnification. As described above, the straining value and magnification table 339 is a table that indicates the relationship in which the magnification of the game image increases in accordance with an increase of the straining value indicated by the straining value data 343.

Next, in step S21, the CPU 10 determines, with reference to the straining value and bow drawing amount table 341, an amount (length) by which the bow is drawn in the game space and which corresponds to the straining value indicated by the latest straining value data 343, and causes, by using the determined amount, the player object 101 to draw the bow in the game space (see FIG. 13).

Next, in step S22, with reference to the operation data 333, the CPU 10 determines whether or not at least one of the A and B buttons that have been pressed is released (canceled). When it is determined that at least one of the A and B buttons is released (YES in step S22), the processing proceeds to step S23. On the other hand, when it is determined that the A and B buttons are still in the state where they are both pressed (NO in step S22), the processing proceeds to step S11. In such a case, the above-described processes of steps S11 to S13 are performed subsequently.

In the time period of one frame described above, the processing is performed by using the route of steps S1 to S7, S14 to S22, and S11 to S13. That is, in the time period of the present single frame, the player performs an action of moving (drawing) the controller 7 away from the television 2, from the position where the controller 7 has been at the time when the pressing of both of the A and B buttons is started, with the front surface of the controller 7 facing the television 2 and the A, B buttons thereof pressed. Accordingly, the game image generated in the present step S13 is a game image reflecting the process of step S21 (the process of causing the player object 101 to draw the bow in the game space). Also, the game image is the game image enlarged (zoomed-in) at the latest magnification determined in step S20 (the latest magnification indicated by the magnification data 340) (see FIG. 13).

Next, a case where the processing has been performed by using the route of steps S1 to S7, and S14 to S22, and where it is determined, in step S22, that at least one of the A and B buttons is released (YES in step S22) will be described. In this case, the processing proceeds to step S23.

In step S23, the CPU 10 determines whether the straining value indicated by the straining value data 343 is equal to or greater than a straining threshold value indicated by the straining threshold value data 344. As described above, the straining threshold value indicated by the straining threshold value data 344 is a value corresponding to, for example, three seconds. When the straining value indicated by the straining value data 343 is equal to or greater than the straining threshold value indicated by the straining threshold value data 344 (YES in step S23), the processing proceeds to step S28. On the other hand, the straining value indicated by the straining value data 343 is less than the straining threshold value indicated by the straining threshold value data 344 (NO in step S23), the processing proceeds to step S24.

In step S24, the CPU 10 resets the straining value indicated by the straining value data 343.

Next, in step S25, the CPU 10 sets the magnification indicated by the magnification data 340 at 1-fold (base magnification).

Next, in step S26, the CPU 10 causes the player object 101 to return to its normal state where the player object 101 does not hold the bow and arrow ready to shoot in the game space.

Next, in step S27, the CPU 10 turns the A, B button depression flag 336 OFF. Subsequently, the processes of the above-described steps S11 to S13 are performed.

In the time period of one frame described above, the processing is performed by using the route of steps S1 to S7, S14 to S27, S11 to S13. That is, in the time period of the present single frame, the player releases at least one of the pressed A and B buttons before the state where the controller 7 is being drawn has continued for a predetermined time period (for example, the time period needed for the straining value to become the value corresponding to three seconds) since the player had pressed the A and B buttons with the front surface of the controller 7 facing the television 2. Accordingly, the game image generated in the present step S13 is a game image reflecting the process of step S26 (the process of causing the player object 101 to return to its normal state where the player object 101 does not hold the bow and arrow ready to shoot in the game space). Also, the game image is expressed at the magnification of 1-fold (base magnification) set in step S25 (see FIG. 9). Even when the state where the controller 7 with the A and B buttons pressed is being drawn has continued for a predetermined time period, if the upper limit straining value is set lower than the straining threshold value due to a small moving amount indicated by the controller moving amount data 338, the straining value does not exceed the straining threshold value. Therefore, the processing is performed by using the above-described route.

Next, description is given on a case where the processing has been performed by using the route of steps S1 to S7, S14 to S23, and where, in step S23, the straining value indicated by the straining value data 343 is equal to or greater than the straining threshold value indicated by the straining threshold value data 344 (YES in step S23). In this case, the processing proceeds to step S28.

In step S28, with reference to the straining value and arrow speed table 345, the CPU 10 determines a speed of the arrow corresponding to the straining value indicated by the latest straining value data 343.

Next, in step S29, the CPU 10 causes the player object 101 to shoot the arrow 150 at the speed of the arrow determined in step S28 toward the position indicated by the pointer 102 in the game space. It is noted that in one example configuration, the greater the speed at which an arrow is shot, the further the arrow flies.

Next, in step S30, the CPU 10 resets the straining value indicated by the straining value data 343.

Next, in step S31, the CPU 10 sets the magnification indicated by the magnification data 340 at 1-fold (base magnification). Subsequently, the above-described processes of steps S27, and S11 to S13 are performed.

In the time period of one frame described above, the processing is performed by using the route of steps S1 to S7, S14 to S23, S28 to S31, S27, and S11 to S13. That is, in the time period of the present single frame, the player releases at least one of the pressed A and B buttons after the state where the controller 7 is being drawn has continued for a predetermined time period (for example, the time period needed for the straining value to become the value corresponding to three seconds) since the player had pressed the A and B buttons with the front surface of the controller 7 facing the television 2. Accordingly, the game image generated in the present step S13 is a game image reflecting the process of step S29 (the process of causing, in the game space, the player object 101 to shoot the arrow 150 at the speed of the arrow determined in step S28). Also, the game image is expressed at the magnification of 1-fold (base magnification) set in step S31 (see FIG. 15).

Next, in step S14 in FIG. 17, a case where the distance B is not greater than the distance A (NO in step S14) will be described. In this case, the controller 7 has approached the television 2, or the controller 7 maintains a certain distance from the television 2. In this case, the processing proceeds to step S32.

In step S32, the CPU 10 replaces the distance A (the value indicated by the depression-start distance data 337) with the distance B (the value indicated by the latest controller distance data 335 calculated in step S5). Accordingly, when the player moves the controller 7 toward the television 2 with the A and B buttons pressed, it is possible to calculate, in the process of step S15 in the subsequent frame periods, the distance between the position to which the controller 7 has been moved toward the television and the position to which the controller has been subsequently moved backward away from the television. That is, it is possible to correct the reference position on which the moving amount of the controller 7 is calculated. As a result, operability is improved. Subsequently, the above-described processes of steps S11 to S13 are performed. In such a case, the game image generated in step S13 indicates a state where the player object 101 is holding the bow but not drawing the bowstring, and is expressed at the magnification of 1-fold (base magnification).

Next, a case where at least one of the markers 8L and 8R is not detected in step S3 (NO in step S3) will be described. In this case, the processing proceeds to step S11, and the above-described processes of steps S11 to S13 are performed. That is, this is a case where the front surface of the controller 7 does not face the television 2. In this case, the contents of the arrow-shooting operation of the game image generated in step S13 are the same as those of the image generated in the immediately preceding frame.

Next, description is given on a case where it is determined in step S6 that the A and B buttons are not in the state where they are both pressed (NO in step S6). In this case, the processing proceeds to the above-described step S24, and is performed by using the route of steps S24 to S27 and S11 to S13. In this case, the game image generated in the present step S13 is a game image reflecting the process of step S26 (the process of causing, in the game space, the player object 101 to return to its normal state where the player object 101 does not hold the bow and arrow ready to shoot). Also, the game image is expressed at the magnification of 1-fold (base magnification) set in step S25 (see FIG. 9)

As described above, according to the first embodiment of the present invention, the player object 101 draws the bowstring to the extent corresponding to the distance by which the player draws the controller 7 with the A and B buttons pressed, and in addition, the game image is enlarged (zoomed-in) in accordance with the distance by which the controller 7 is drawn. Thereafter, when the player releases at least one of the pressed A and buttons, the player object 101 shoots the arrow, and concurrently, the enlarged game image returns to its original magnification (base magnification). Therefore, according to the present invention, only by performing a simple operation of releasing at least one of the pressed A and B buttons, the player can cause the player object 101 to shoot the arrow, and concurrently, can cause the enlarged game image to return to its original magnification.

In addition, the operations performed on the controller 7 described above are similar to the actions of shooting an actual arrow. Specifically, the operation of pressing the A and B buttons of the controller 7 is similar to the action of fitting an actual arrow to the actual bowstring of a bow. The operation of drawing the controller 7 with the A and B buttons pressed is similar to the action of drawing the actual arrow fitted to the actual bowstring of the bow. The operation of adjusting the pointing direction of the controller 7 so as to aim at the target is similar to the action of aiming at the target with the actual bow and arrow. The operation of releasing at least one of the A and B buttons that have been pressed is similar to the action of releasing the actual arrow. In this manner, the arrow-shooting operations described above are similar to the actions of shooting an actual arrow. In addition, according to the present invention, as described above, enlargement/reduction of the game image is automatically performed in accordance with the arrow-shooting operations performed by the player. As a result, the player can play the game with a highly realistic feeling, without performing onerous operations, thereby enabling the entertaining feature of the game to be enhanced.

(Second Embodiment)

Figure 24:
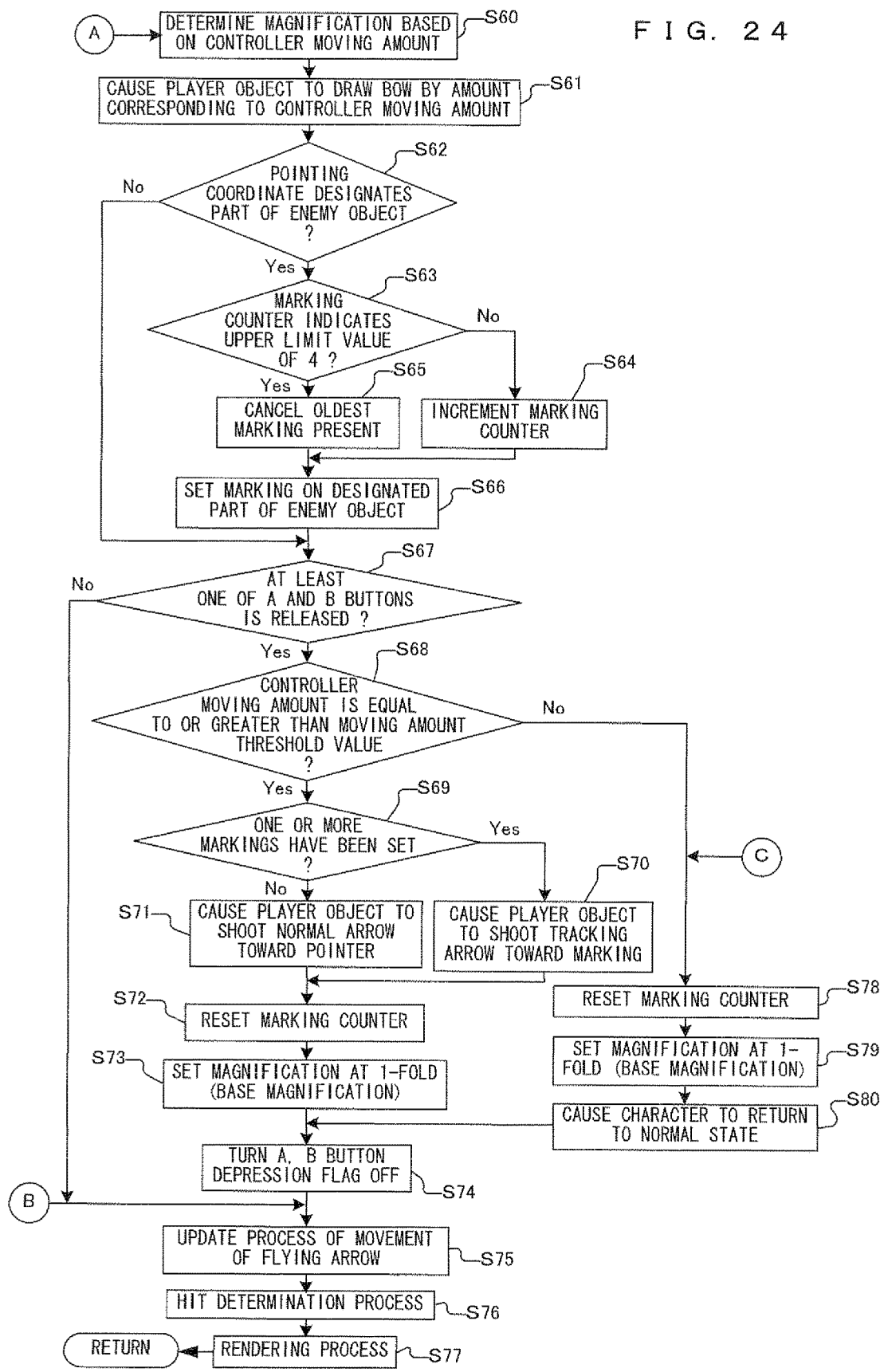
FIG. 24 is a flowchart showing processing according to the second embodiment of the present invention.

Processing according to a second embodiment has, in addition to the features described in the first embodiment, a feature particularly characterized in that the shot arrow locks on the target on which a marking has been set, and the like. Specifically, an information processing apparatus according to the second embodiment is different from the information processing apparatus according to the first embodiment in the following features: a part of the data stored in the external main memory 12 of the former is different from that of the latter, and below-described processing according to the flow chart in FIG. 24 is performed instead of the processing according to the flow chart in FIG. 18. Therefore, in the following, description of the contents similar to those of the first embodiment will be omitted in principle.

Figure 21:
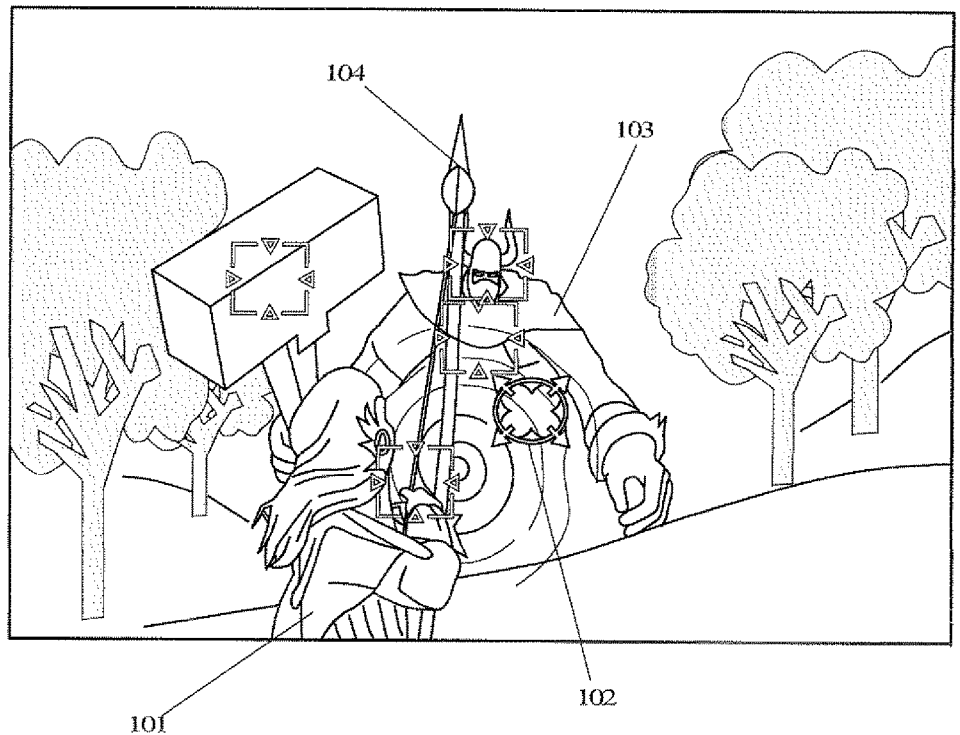
FIG. 21 is an example of the game image assumed in an embodiment of the present invention.
Figure 22:
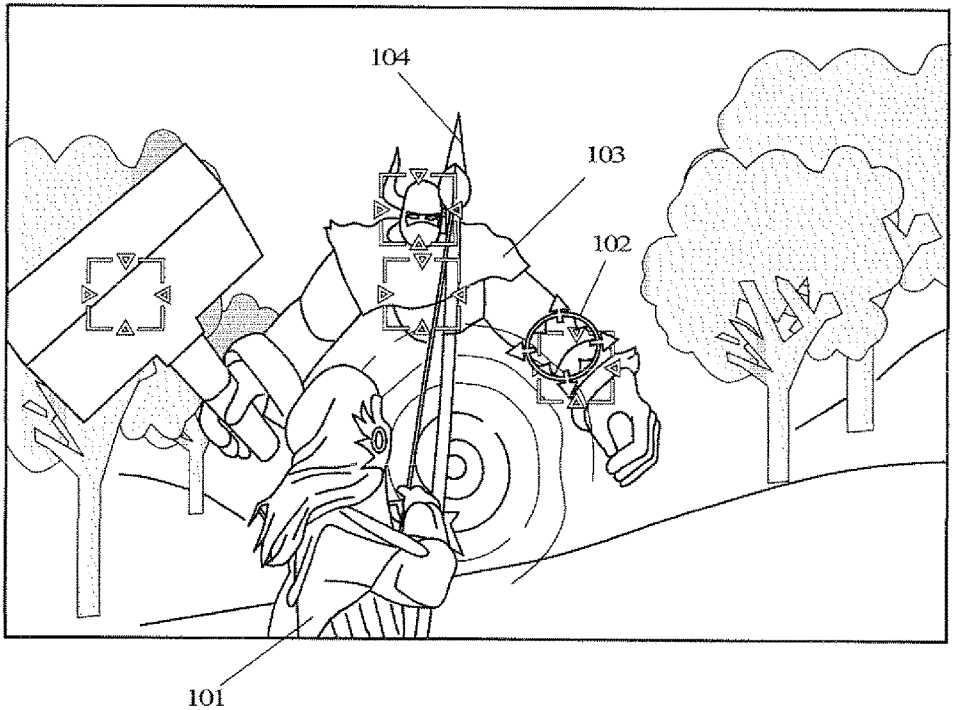
FIG. 22 is an example of the game image assumed in an embodiment of the present invention.

First, the features specific to the second embodiment will be briefly described with reference to FIG. 21 and FIG. 22. As shown in FIG. 21, the player sets a marking on a part of the enemy object 103 while looking at the enlarged game image, by causing the player object 101 to move the pointer 102 with the bowstring of the bow drawn. This marking is performed when it is detected that a part of the enemy object 103 has been pointed at by the pointer 102. In addition, the marking, once set, moves following the movement of the enemy object 103. In FIG. 21, markings are set on the head, the breast, the right leg, and the hammer, respectively, which are parts of the enemy object 103. Each marking is indicated by, for example, a square frame. As shown in FIG. 21 and FIG. 22, the marking that is set at, for example, a hammer moves following the movement of the hammer of the enemy object 103. Further, a predetermined number (e.g., four) of markings can be maintained. Specifically, in a case where a new marking operation is performed when the predetermined number of markings are already present, the oldest marking present is canceled. In FIG. 22, since a new marking is set on the left arm when four (the predetermined number) markings are already present, the oldest marking present, which has been set at the right leg, is canceled. It is noted that in the setting in FIG. 21 and FIG. 22, where the enemy object 103 is large, markings may be set on a plurality of parts, respectively, of the single enemy object 103. However, in a setting where the enemy objects 103 are small as in FIG. 12, only one marking may be set on each enemy object 103. In the following, with reference to FIG. 21 and FIG. 22, description will be given on an exemplary case where markings are set on parts of the large enemy object 103, respectively, and where the predetermined number for the markings that can be maintained is four.

Figure 23:
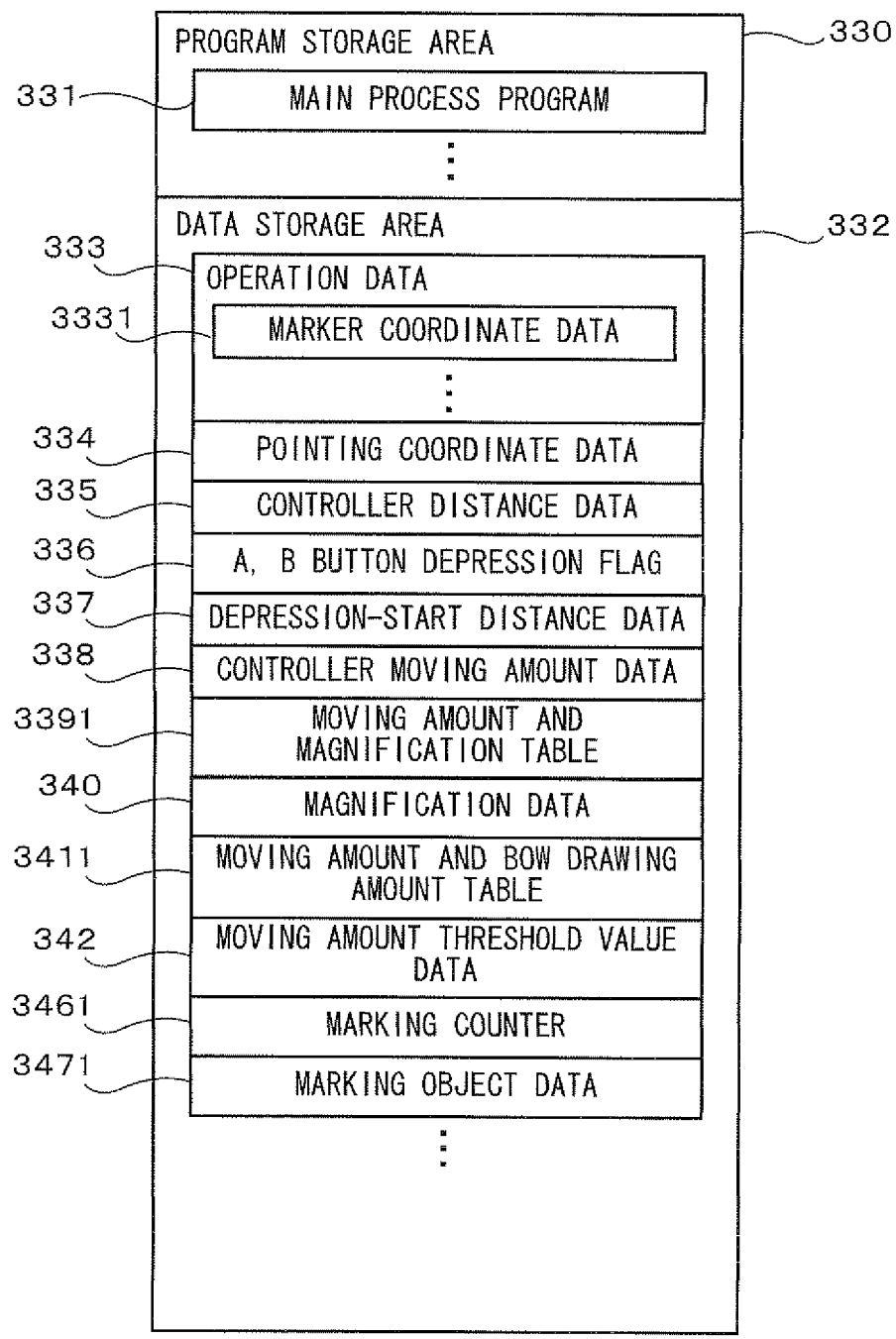
FIG. 23 is a view showing a memory map of the external main memory 12 in the game apparatus main body 3 according to the second embodiment of the present invention.

Next, data stored in the external main memory 12 in the game processing according to the second embodiment will be described. FIG. 23 is a view showing a memory map of the external main memory 12 in the game apparatus main body 3 according to the second embodiment. The memory map in FIG. 23 is different from the memory map in FIG. 16 described in the first embodiment in that: the former has a moving amount and magnification table 3391, a moving amount and bow drawing amount table 3411, moving amount threshold value data 342, a marking counter 3461 and marking object data 3471; instead of the straining value and magnification table 339, the straining value and bow drawing amount table 341, the straining value data 343, the straining threshold value data 344, the straining value and arrow speed table 345, the moving amount and upper limit straining value table 346, and the upper limit straining value data 347.

The moving amount and magnification table 3391 is a table that associates a moving amount indicated by the controller moving amount data 338 with a magnification of the game image, and that indicates the relationship in which the magnification of the game image increases in accordance with an increase of the moving amount indicated by the controller moving amount data 338. In addition, in the moving amount and magnification table 3391, the magnification at the time when the moving amount indicated by the controller moving amount data 338 is zero is 1-fold (base magnification), which serves as the base on which the magnification of the game image is determined. It is noted that the moving amount and magnification table 3391 may be replaced with a formula indicating a proportional relationship, and the like.

The moving amount and bow drawing amount table 3411 is a table that associates a moving amount indicated by the controller moving amount data 338 with an amount (length) by which a bow is drawn in the game space, and that indicates the relationship in which the amount by which the bow is drawn increases in accordance with an increase of the moving amount indicated by the controller moving amount data 338. It is noted that the moving amount and bow drawing amount table 3411 may be replaced with a formula indicating a proportional relationship, and the like.

The moving amount threshold value data 342 is data indicating a predetermined threshold value used with respect to the moving amount indicated by the controller moving amount data 338, and is data indicating, for example, 20 cm.

The marking counter 3461 is a counter that indicates the number of the markings.

The marking object data 3471 is data indicating an object or a part of an object on which a marking has been set, and the time (or order) at which the marking has been set thereon.

Next, the game processing performed by the game apparatus main body 3 according to the second embodiment will be described with reference to FIG. 17, FIG. 23, and FIG. 24. In the following, a typical flow of the processing performed per frame will be described in a manner similar to the description of the first embodiment.

Figure 17:
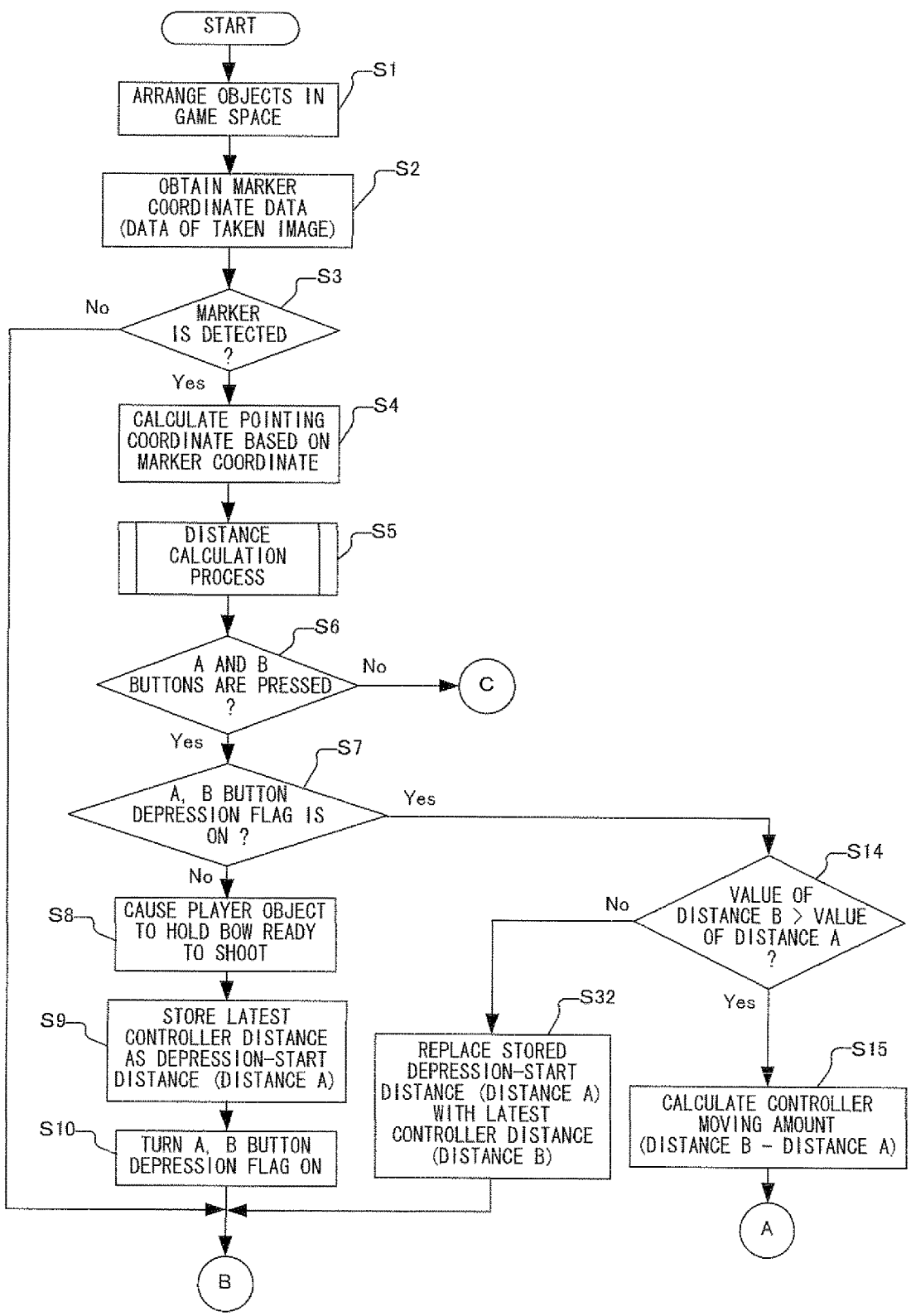
FIG. 17 is a flowchart showing processing according to the first embodiment through a third embodiment of the present invention.

First, description is given on a case where a process of step S60 in FIG. 24 is performed after the processing is performed by using the route of steps S1 to S7, S14, and S15 in FIG. 17.

In step S60, with reference to the moving amount and magnification table 3391, the CPU 10 determines a magnification of the game image corresponding to the latest moving amount indicated by the latest controller moving amount data 338 calculated in step S15, and updates the magnification data 340 with the determined magnification. As described above, the moving amount and magnification table 3391 is a table indicating the relationship in which the magnification of the game image increases in accordance with an increase of the moving amount indicated by the controller moving amount data 338.

Next, in step S61, the CPU 10 determines, with reference to the moving amount and bow drawing amount table 3411, an amount (length) by which the bow is drawn in the game space and which corresponds to the latest moving amount indicated by the latest controller moving amount data 338 calculated in step S15, and causes, by using the determined amount, the player object 101 to draw the bow in the game space (see FIG. 13). As described above, the moving amount and bow drawing amount table 3411 is a table indicating the relationship in which the amount by which the bow is drawn increases in accordance with an increase of the moving amount indicated by the controller moving amount data 338.

Next, in step S62, the CPU 10 determines whether or not the pointing coordinate (position of pointer 102) has designated a specific part of the enemy object 103. Here, the specific part is the head, the breast, the right arm, the left arm, the right leg, the left leg, the weapon, or the like. When the pointing coordinate has designated a specific part of the enemy object 103 (YES in step S62), the processing proceeds to step S63. On the other hand, when the pointing coordinate has not designated a specific part of the enemy object 103 (NO in step S62), the processing proceeds to step S67.

In step S67, with reference to the operation data 333, the CPU 10 determines whether or not at least one of the A and B buttons that have been pressed is released (canceled). When it is determined that at least one of the A and B buttons is released (YES in step S67), the processing proceeds to step S68. On the other hand, when it is determined that the A and B buttons are still in the state where they are both pressed (NO in step S67), the processing proceeds to step S75.

In step S75, when there is an arrow flying in the game space, the CPU 10 causes the arrow to move in the game space and updates the position of the arrow. Aspects of the movement of the flying arrow will be described in detail below.

Next, in step S76, when there is an arrow that has been shot and is flying in the game space, the CPU 10 determines whether or not the arrow has hit an enemy. When the arrow has hit an enemy, the CPU 10 does damage, for example, to the enemy in the game space.

Next, in step S77, the CPU 10 notifies the GPU 11*b* of a graphics command (command for generating graphics) based on a value of magnification data 340 stored in the external main memory 12, states and a positional relationship of objects in the game space, and the like. Then, the GPO 11*b* performs a rendering process of the game image in accordance with the notification, and the television 2 displays the game image. Thereafter, the processing returns to step S1 in FIG. 17.

In the time period of one frame described above, the processing is performed by using the route of steps S1 to S7, S14, S15, S60 to S62, S67, and S75 to S77. That is, in the time period of the present single frame, the player performs an action of drawing the controller 7 with the front surface of the controller 7 facing the television 2 and with the A, B buttons pressed. Accordingly, the game image generated in the present step S77 is a game image reflecting the process of step S61 (the process of causing the player object 101 to draw the bow in the game space). Also, the game image is the game image enlarged (zoomed-in), as in FIG. 13, at the latest magnification determined in step S60 (the latest magnification indicated by the magnification data 340).

Next, in step S62, a case where the pointing coordinate has designated a part of the enemy object 103 (YES in step S62) will be described. In this case, the processing proceeds to step S63.

In step S63, with reference to the marking counter 3461, the CPU 10 determines whether or not a counted number is four, which is the predetermined number. That is, the CPU 10 determines whether or not the number of the markings already present is four, which is the upper limit number. When the counted number is four (YES in step S63), the processing proceeds to step S65. On the other hand, when the counted number is not four (NO in step S63), which is the upper limit number, the processing proceeds to step S64.

In step S65, the CPU10 cancels the setting of the oldest marking present with reference to the marking object data 3471, and updates the marking object data 3471. This makes the number of the markings present three. Subsequently, the processing proceeds to step S66.

On the other hand, in step S64, the CPU 10 increments the value of the marking counter 3461. Subsequently, the processing proceeds to step S66.

In step S66, the CPU 10 sets a marking on the part, designated in step S62, of the enemy object 103 in the game space, and reflects the contents of the marking object data 3471.

Subsequently, if the determination in step S67 is NO and the processes of steps S75 to S77 are performed, then the processing is performed in the time period of the present single frame by using the route of steps S1 to S7, S14, S15, S60 to S63, S64 (or S65), S66, S67, and S75 to S77. In this case, the game image generated in step S77 is a game image reflecting the process of step S66 (the process of setting a marking on the part of the enemy object 103 designated in the game space) (see FIG. 21 and FIG. 22). Also, the game image is the game image enlarged (zoomed-in) at the latest magnification determined in step S60 (the latest magnification indicated by the magnification data 340).

Next, description is given on a case when it is determined in step S67 that at least one of the A and B buttons is released (YES in step S67). In this case, the processing proceeds to step S68.

In step S68, the CPU10 determines whether or not the moving amount indicated by the latest controller moving amount data 338 calculated in step S15 is equal to or greater than a predetermined moving amount threshold value indicated by the moving amount threshold value data 342. When it is determined that the moving amount indicated by the latest controller moving amount data 338 calculated in step S15 is less than the predetermined moving amount threshold value indicated by the moving amount threshold value data 342 (NO in step S68), the processing proceeds to step S78. On the other hand, when it is determined that the moving amount indicated by the latest controller moving amount data 338 calculated in step S15 is equal to or greater than the predetermined moving amount threshold value indicated by the moving amount threshold value data 342 (YES in step S68), the processing proceeds to step S69.

In step S69, with reference to the marking counter 3461, the CPU10 determines whether or not one or more markings have been set. When one or more markings have been set (YES in step S69), the processing proceeds to step S70. On the other hand, when no marking has been set (NO in step S69), the processing proceeds to step S71.

In step S71, the CPU10 causes, in the game space, the player object 101 to shoot the arrow toward the position in the game space indicated by the pointer 102. That is, when no marking is set, the arrow is shot towards the position in the game space indicated by the pointer 102. The arrow in this case moves in a straight line (or in a parabola) toward the position in the game space indicated at the time of shooting by the pointer 102. Hereinafter, the arrow shot toward the position in the game space pointed by the pointer 102 is referred to as a normal arrow. Subsequently, the processing proceeds to step S72.

On the other hand, in step S70, the CPU 10 causes, in the game space, the player object 101 to shoot the arrow toward the position in the game space indicated by the marking that has been set. That is, when a marking is set, the arrow is shot towards the position in the game space indicated by the marking. The arrow in this case moves toward the position in the game space indicated by the marking. Even if the marking has moved following the movement of the enemy object, the arrow moves toward the position in the game space indicated by the marking. Hereinafter, the arrow shot towards the position in the game space indicated by the marking is referred to as a tracking arrow. That is, the tracking arrow flies changing its flying direction so as to be directed toward the part of the enemy object on which the marking has been set. In this case, when a plurality of markings have been set, a plurality of arrows are shot towards positions in the game space indicated by the plurality of markings, respectively. Subsequently, the processing proceeds to step S72.

In step S72, the CPU 10 resets the value of the marking counter 3461.

Next, in step S73, the CPU 10 sets the magnification indicated by the magnification data 340 at 1-fold (base magnification).

Next, in step S74, the CPU 10 turns the A, B button depression flag 336 OFF.

Next, in step S75, when there is an arrow flying in the game space, the CPU10 causes the arrow to move in the game space, and updates the position of the arrow. In this case, as described above, the normal arrow moves in a straight line (or in a parabola) toward the position in the game space indicated by the pointer 102 at the time of shooting. On the other hand, as described above, the tracking arrow moves toward the position in the game space indicated by the marking, and even if the marking has moved following the movement of the enemy object, the arrow moves toward the position in the game space indicated by the marking.

Next, in step S76, as described above, an operation is performed of determining whether or not the arrow has hit the enemy. In this case, when the tracking arrow has hit the enemy, the CPU 10 deletes, from the marking object data 3471, the data corresponding to the tracking arrow that has hit the enemy. Subsequently, the process of step 77 is performed.

In the time period of one frame described above, the processing is performed by using the route of steps S67 to S69, S70 (or S71), and S72 to S77. Accordingly, when one or more markings have been set (YES in step S69), the game image generated in the present step S77 is a game image reflecting the process of the process of step S70 (the process of causing, in the game space, the player object 101 to shoot one or more tracking arrows toward the one or more positions in the game space indicated by the one or more markings, respectively). On the other hand, when no marking is set (NO in step S69), the game image generated in the present step S77 is a game image reflecting the process of step S71 (the process of causing, in the game space, the player object 101 to shoot the normal arrow toward the position in the game space indicated at the time of shooting by the position of pointer 102). Also, the above game image is, in either case, expressed at the magnification of 1-fold (base magnification) set in step S73, as in FIG. 15.

Next, description is given on a case where it is determined, in step S68, that the moving amount indicated by the latest controller moving amount data 338 calculated in step S15 is less than the predetermined moving amount threshold value indicated by the moving amount threshold value data 342 (NO in step S68). In this case, the processing proceeds to step S78.

In step S78, the CPU 10 resets the value of the marking counter 3461.

Next, in step S79, the CPU 10 sets the magnification indicated by the magnification data 340 at 1-fold (base magnification).

Next, in step S80, the CPU 10 causes the player object 101 to return to its normal state where the player object 101 does not hold the bow and arrow ready to shoot in the game space. Subsequently, the processes of steps S74 to S77 are performed.

In the time period of one frame described above, the processing is performed by using the route of step S67, S68, S78 to S80, and S74 to S77. Accordingly, the game image generated in the present step S77 is a game image reflecting the process of step S80 (the process of causing, in the game space, the player object 101 to return to its normal state where the player object 101 does not hold the bow and arrow ready to shoot). Also, the above game image is expressed at the magnification of 1-fold (base magnification) (see FIG. 9) set in step S79.

Next, description is given on the case where it is determined in step S6 in FIG. 17 that the A and B buttons are not in the state where they are both pressed (NO in step S6). In this case, the processing proceeds to the above-described step S78, and is performed by using the route of steps S78 to S80 and S74 to S77. In this case, the game image generated in step S77 is a game image reflecting the process of step S80 (the process of causing, in the game space, the player object 101 to return to its normal state where the player object 101 does not hold the bow and arrow ready to shoot). Also, the game image is expressed at the magnification of 1-fold (base magnification) (see FIG. 9) set in step S79.

Next, a case where at least one of the markers 8L and 8R is not detected in step S3 in FIG. 17 (NO in step S3) will be described. In this case, the processing proceeds to step S75, and the above-described processes of steps S75 to S77 are performed. The contents of the arrow-shooting operation of the game image generated in step S77 are the same as those of the image generated in the immediately preceding frame.

Next, a case where the process of step S32 in FIG. 17 is performed will be described. In this case, the above-described processes of steps S75 to S77 are subsequently performed. In this case, the game image generated in step S77 indicates a state where the player object 101 is holding the bow but not drawing the bowstring, and is expressed at the magnification of 1-fold (base magnification).

It is noted that, with respect to the processing of the second embodiment described above, the processing relevant to the "straining value" described in the first embodiment may be added to the processing of the second embodiment, or a part of the processing of the second embodiment described above may be replaced with the processing relevant to the "straining value" described in the first embodiment. For example, the processing of preventing the arrow from being shot until the straining value becomes equal to or greater than the straining threshold value (see step S23 and the like in FIG. 18) may be added to the processing of the second embodiment. Moreover, the processing of causing the arrow to be shot at a speed corresponding to the straining value (see step S28 and S29 in FIG. 18) may be added.

Moreover, in the processing of the second embodiment described above, the speed at which the arrow is shot may be changed (determined) so as to correspond to the moving amount of the controller 7. Specifically, a process of determining a speed of an arrow corresponding to the moving amount indicated by the latest controller moving amount data 338 calculated in step S15 in FIG. 17 may be added between the process of step S68 and the process of step S69 in FIG. 24. Then, in step S71 (or step S70), a normal arrow (or tracking arrow) may be shot at the determined speed. In this case, in order to realize the above processing, there is further stored, in the data storage area 332 in FIG. 23, a moving amount and arrow speed table that associates the moving amount indicated by the controller moving amount data 338 with the speed of the arrow, and that indicates the relationship in which the speed of the arrow increases in accordance with an increase of the moving amount indicated by the controller moving amount data 338. It is noted that the moving amount and arrow speed table may be replaced with a formula indicating a proportional relationship, and the like. Accordingly, the speed at which the arrow is shot can be changed in accordance with the distance by which the bow is drawn in the game space.

As described above, in the second embodiment of the present invention, as in the first embodiment, enlargement/reduction of the game image is automatically performed in accordance with the arrow-shooting operation that is performed by the player and that is similar to the action of shooting an actual arrow. As a result, in the second embodiment of the present invention, as in the first embodiment, the player can play the game with a highly realistic feeling, without performing onerous operations.

Moreover, according to the second embodiment of the present invention, the player can set markings on a predetermined number of parts of the enemy object 103 (or a predetermined number of enemy objects) and the like, by causing the player object 101 to move the pointer 102 while the player object 101 is holding the bow and arrow ready to shoot. Then, the player can cause the player object 101 to shoot at one time the number of tracking arrows, which number corresponds to the number of markings that have been set, so as to attack the enemy objects at the same time.

(Third Embodiment)

Figure 29:
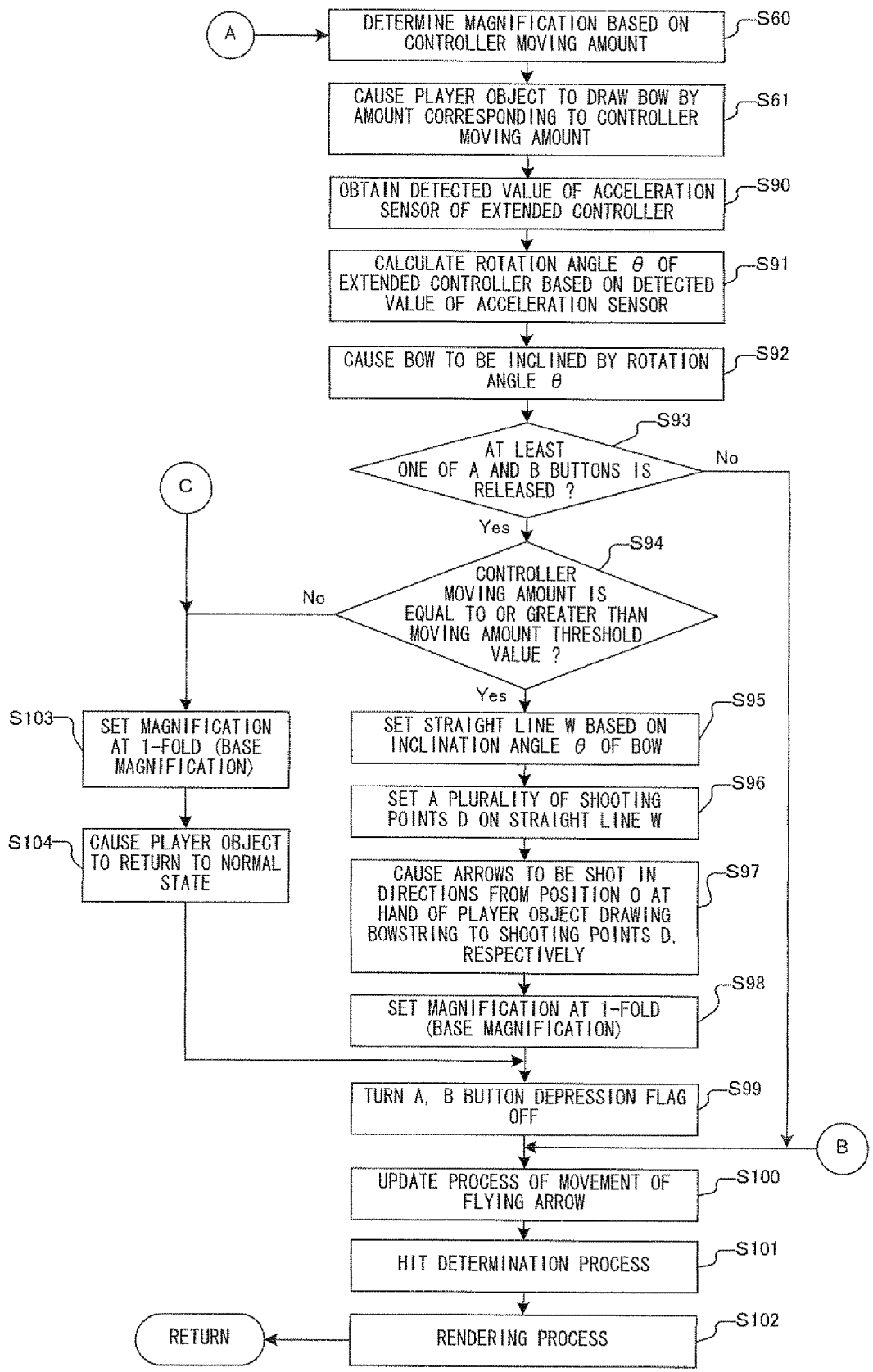
FIG. 29 is a flowchart showing processing according to the third embodiment of the present invention.

Processing according to a third embodiment has, in addition to the features described in the first embodiment, a feature particularly characterized in that the player object 101 can shoot a plurality of arrows radially at one time, while holding the bow in an inclined manner, and the like. Specifically, an information processing apparatus according to the third embodiment is different from the information processing apparatus according to the first embodiment in the following features: a part of the data stored in the external main memory 12 of the former is different from that of the latter, and below-described processing according to the flow chart in FIG. 29 is performed instead of the processing according to the flow chart in FIG. 18. Therefore, in the following, description of the contents similar to those of the first embodiment will be omitted in principle.

Figure 25:
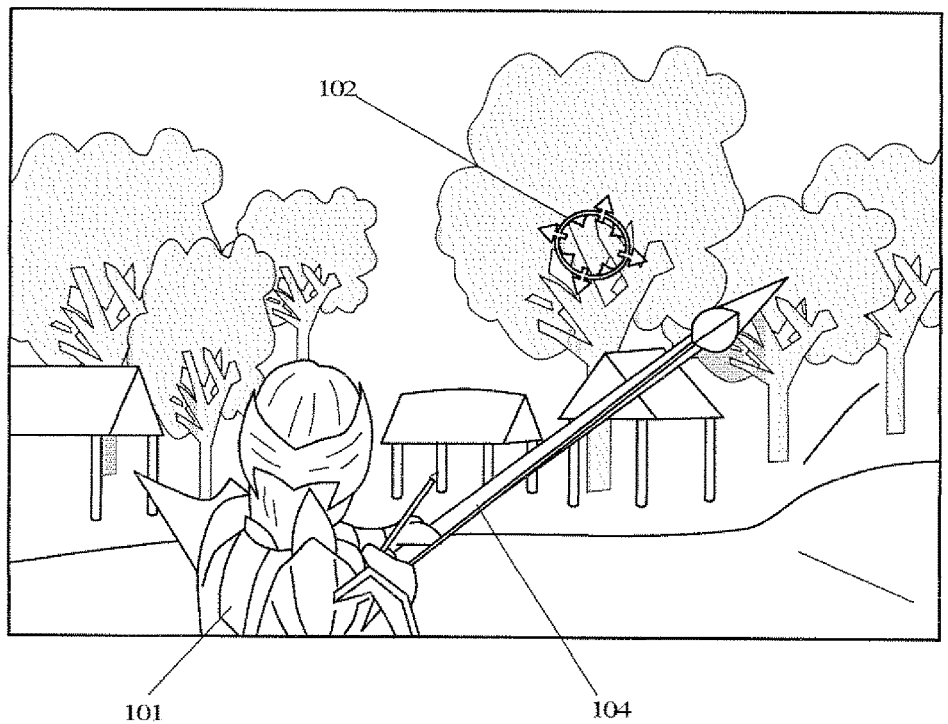
FIG. 25 is an example of the game image assumed in an embodiment of the present invention.
Figure 26:
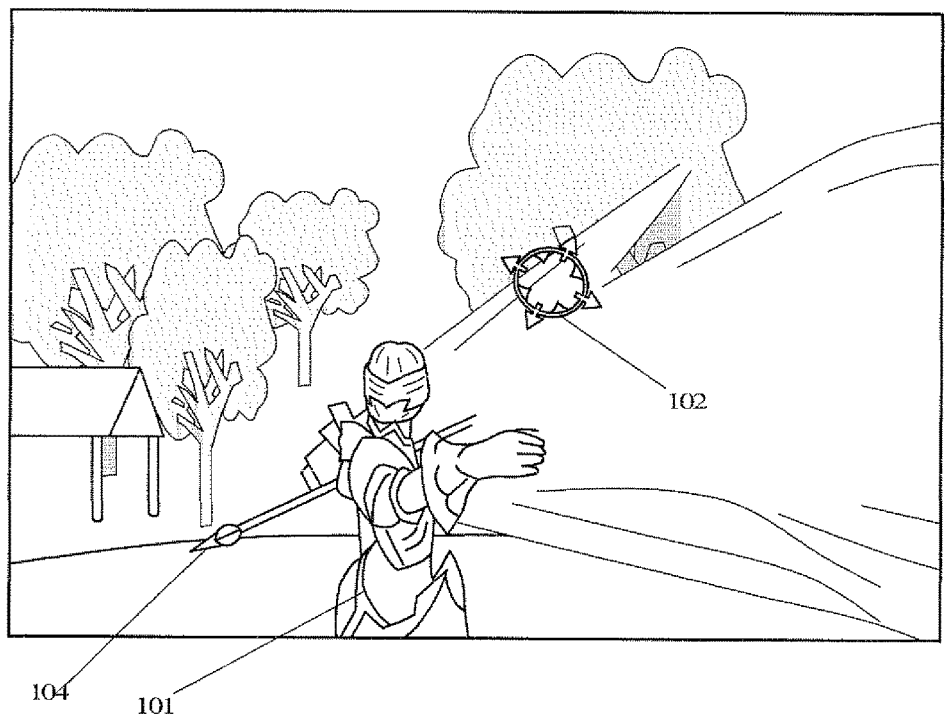
FIG. 26 is an example of the game image assumed in an embodiment of the present invention.
Figure 27:
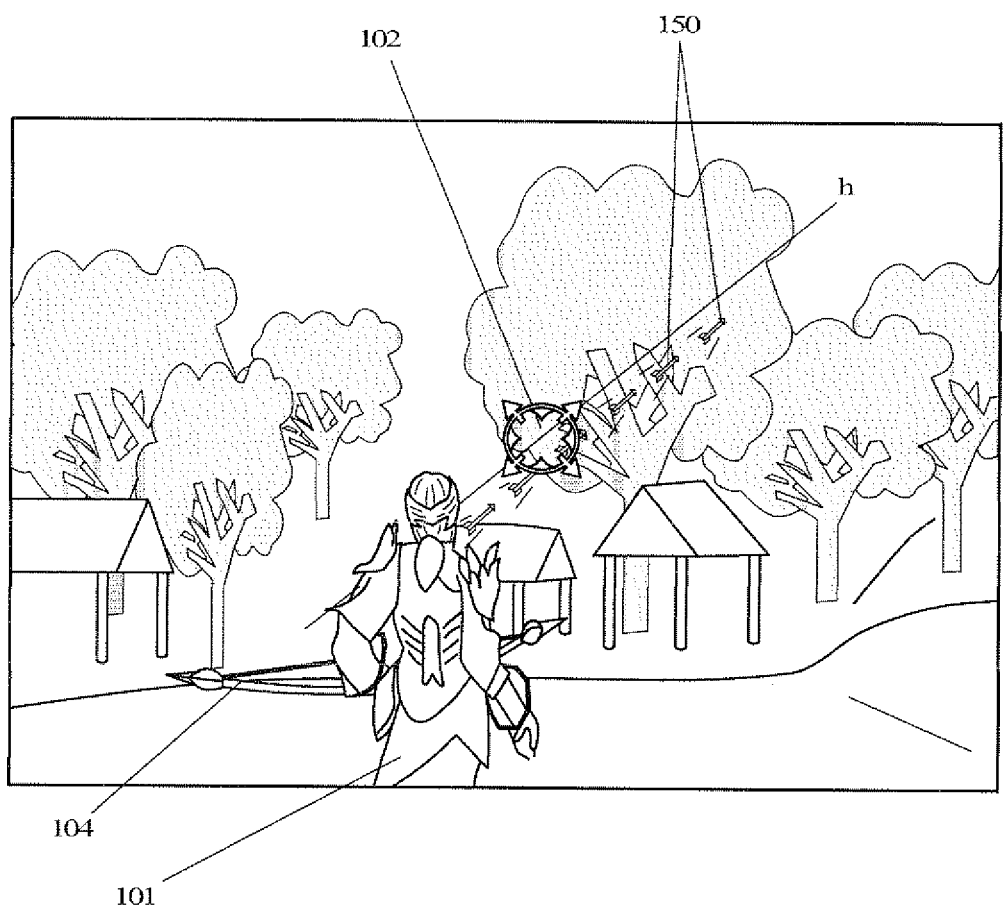
FIG. 27 is an example of the game image assumed in an embodiment of the present invention.

First, the features specific to the third embodiment will be briefly described with reference to FIG. 25 to FIG. 27. As shown in FIG. 25, the player can incline the bow by rotating the extended controller 36 about a y-axis (in a direction indicated by a curved arrow in FIG. 10) while the player object 101 is holding the bow and arrow ready to shoot. As shown in FIG. 26 and FIG. 27, the player can cause the player object 101 to shoot a plurality of arrows 150 at one time. In this case, the plurality of arrows 150 are shot in a direction based on the inclination of the arrow, and fly in such a manner as to draw a straight line (or a parabola). Specifically, as shown in FIG. 27, a plurality of arrows are radially shot toward points, in the game space, on a straight line h (a straight line that is not rendered) that passes through the pointer 102 and that is parallel to the bow at the time when the arrows are shot. It is noted that, in FIG. 26, the shot arrows are not visible due to a visual effect at the time when the arrows have been shot.

Figure 28:
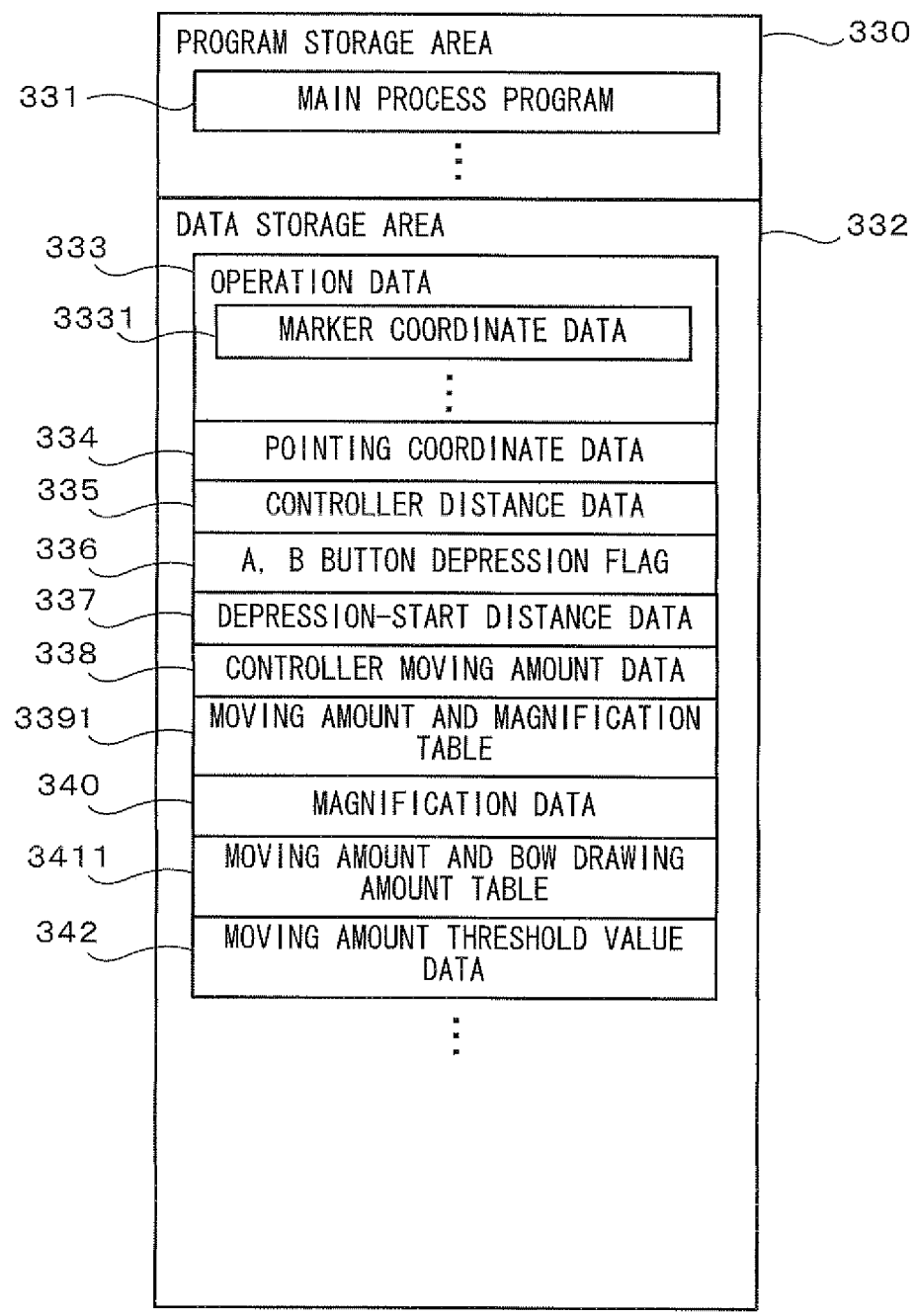
FIG. 28 is a view showing a memory map of the external main memory 12 in the game apparatus main body 3 according to the third embodiment of the present invention.

Next, description will be given on data to be stored in the external main memory 12 in the game processing in the third embodiment. FIG. 28 is a view showing a memory map of the external main memory 12 in the game apparatus main body 3 according to the third embodiment of the present invention. The memory map in FIG. 28 is different from the memory map in FIG. 16 described in the first embodiment in that: the former has the moving amount and magnification table 3391, the moving amount and bow drawing amount table 3411, and the moving amount threshold value data 342 instead of the straining value and magnification table 339, the straining value and bow drawing amount table 341, the straining value data 343, the straining threshold value data 344, the straining value and arrow speed table 345, the moving amount and upper limit straining value table 346, and the upper limit straining value data 347. Since the moving amount and magnification table 3391, the moving amount and bow drawing amount table 3411, and the moving amount threshold value data 342 have been described in the second embodiment, description thereof will be omitted.

Next, with reference to FIG. 10, and FIG. 25 to FIG. 30, the game processing performed by the game apparatus main body 3 according to the third embodiment will be described. In the following, a typical flow of the processing performed per frame will be described in a manner similar to the description of the first embodiment.

First, description is given on a case where a process of step S60 in FIG. 29 is performed after the processing is performed by using the route of steps S1 to S7, S14, and S15 in FIG. 17.

In step S60, with reference to the moving amount and magnification table 3391, the CPU 10 determines a magnification of the game image corresponding to the latest moving amount indicated by the latest controller moving amount data 338 calculated in step S15, and updates the magnification data 340 with the determined magnification.

Next, in step S61, the CPU 10 determines, with reference to the moving amount and bow drawing amount table 3411, an amount (length) by which the bow is drawn in the game space and which corresponds to the latest moving amount indicated by the latest controller moving amount data 338 calculated in step S15, and causes, by using the determined amount, the player object 101 to draw the bow in the game space. It is noted that the processes of steps S60 and S61 in FIG. 29 are the same as the processes of steps S60 and S61 in FIG. 24, respectively.

Next, in step S90, with reference to the operation data 333, the CPU 10 obtains acceleration data detected by the acceleration sensor of the extended controller 36.

Next, in step S91, based on the acceleration data obtained in step S90, the CPU 10 calculates a rotation angle θ about the y-axis of the extended controller 36 (see the curved arrow in FIG. 10). Hereinafter, the following description is given on an example in which: the rotation angle θ is an angle between 0° to 360°; when the z-axis positive direction of the extended controller 36 is directed vertically upward, the rotation angle θ is 0°; and when the extended controller 36 is rotated about the y-axis in the direction of the curved arrow, the value of the rotation angle θ is increased (see FIG. 10).

Next, in step S92, the CPU 10 causes, in the game space, the bow held by the player object 101 to be inclined by the rotation angle θ calculated in step S91. Specifically, when the rotation angle θ calculated in step S91 is 0°, the bow is held vertically; when the rotation angle θ is 60°, the bow is inclined by 60° as shown in FIG. 25; and when the rotation angle θ is 90°, the bow is inclined by 90° (that is, the bow is held horizontally). It is noted that the angle by which the bow is inclined may be limited to 0° to 90°. In this case, for example, when the rotation angle θ calculated in step S91 is 90°<θ≤180°, the bow may be inclined by 90°; and when the rotation angle θ is 180°<θ<360°, the bow may be held vertically.

Next, in step S93, with reference to the operation data 333, the CPU 10 determines whether or not at least one of the A and B buttons that have been pressed is released (canceled). When it is determined that the A and B buttons are still in the state where they are both pressed (NO in step S93), the processing proceeds to step S100. On the other hand, when it is determined that at least one of the A and B buttons is released (YES in step S93), the processing proceeds to step S94.

In step S94, the CPU10 determines whether or not the moving amount indicated by the latest controller moving amount data 338 calculated in step S15 is equal to or greater than a predetermined moving amount threshold value indicated by the moving amount threshold value data 342. When it is determined that the moving amount indicated by the latest controller moving amount data 338 calculated in step S15 is less than the predetermined moving amount threshold value indicated by the moving amount threshold value data 342 (NO in step S94), the processing proceeds to step S103. On the other hand, when it is determined that the moving amount indicated by the latest controller moving amount data 338 calculated in step S15 is equal to or greater than the predetermined moving amount threshold value indicated by the moving amount threshold value data 342 (YES in step S94), the processing proceeds to step S95.

Figure 30:
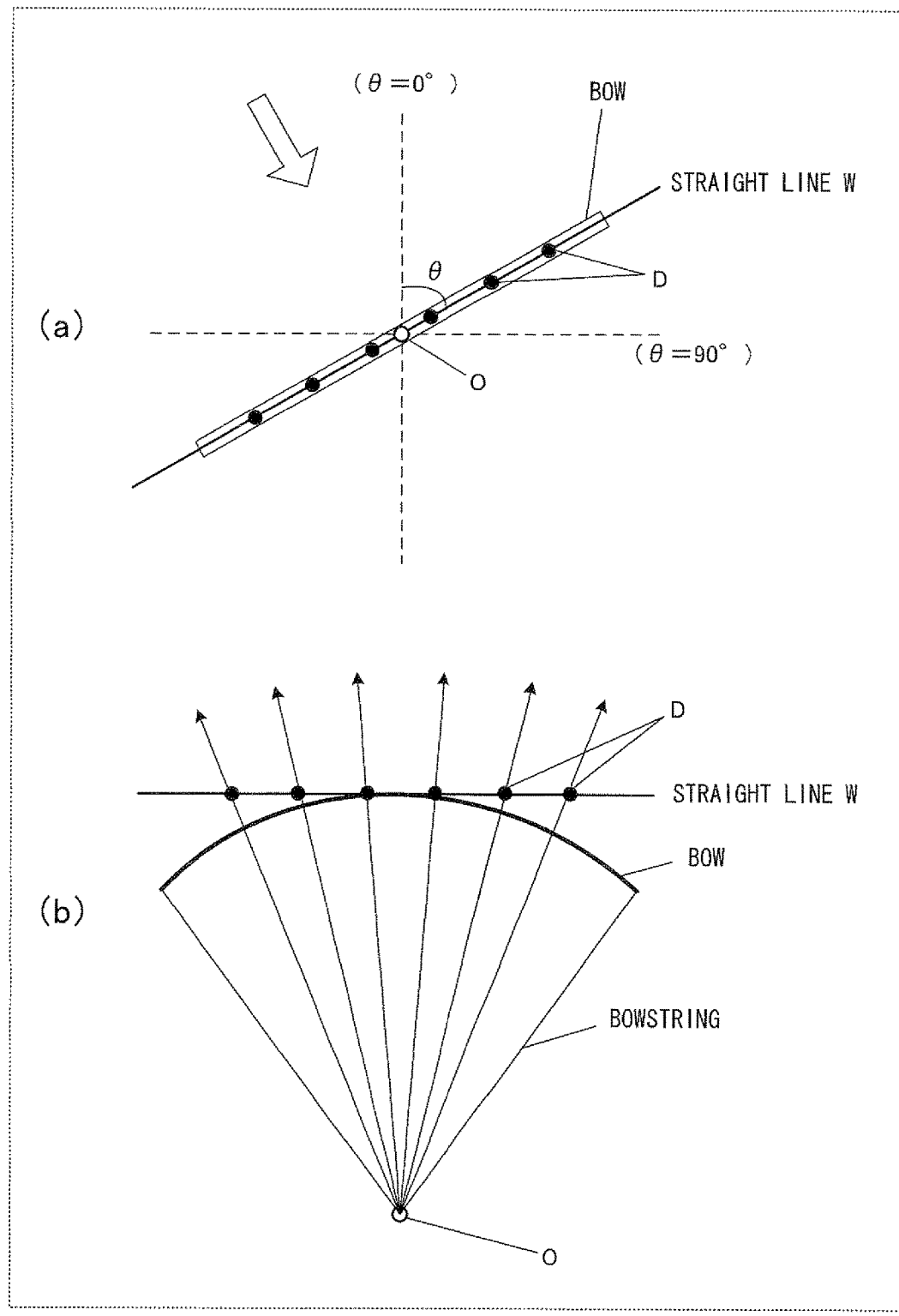
FIG. 30 is a view illustrating processes of shooting arrows in steps S95-S97 in FIG. 29.

FIG. 30 is a view illustrating processes of shooting the arrows in steps S95 to S97. FIG. 30 (*a*) is a schematic view showing an example of the arrows seen from behind the player object 101 in the game space, and corresponds to FIG. 25. FIG. 30 (*b*) is a schematic view showing the arrows seen from the direction indicated by the arrow shown in FIG. 30 (*a*). In FIGS. 30 (*a*) and (*b*), the bowstring of the bow has been drawn by a hand of the player object 101. Hereinafter, with respect to FIG. 30, processes of shooting the arrows in steps S95 to S97 will be described.

In step S95, the CPU 10 sets, in the game space, a straight line based on the inclination angle θ (rotation angle θ) of the bow by which the bow is inclined in step S92. Specifically, as shown in FIGS. 30 (*a*) and (*b*), the CPU 10 sets, in the game space, a straight line W that is present on a plane containing the bow and the bowstring and that contacts the center of the bow. It is noted that the straight line W is not rendered in the game image.

Next, in step S96, as shown in FIGS. 30 (*a*) and (*b*), the CPU10 sets a plurality of shooting points D on the straight line W set in step S95.

Next, in step S97, as shown in FIG. 30 (*b*), the CPU10 causes, in the game space, the arrows to be shot in the directions from the point D at the hand of the player object 101 drawing the bowstring to the shooting points D, respectively.

Next, in step S98, the CPU 10 sets the magnification indicated by the magnification data 340 at 1-fold (base magnification).

Next, in step S99, the CPU 10 turns the A, B button depression flag 336 OFF.

Next, in step S100, when there is an arrow flying in the game space, the CPU 10 causes the arrow to move in the game space and updates the position of the arrow.

Next, in step S101, when there is an arrow flying in the game space, the CPU 10 determines whether or not the arrow has hit an enemy. When the arrow has hit an enemy, the CPU 10 does damage, for example, to the enemy in the game space.

Next, in step S102, the CPU 10 notifies the GPU 11*b* of a graphics command (command for generating graphics) based on a value of magnification data 340 stored in the external main memory 12, states and a positional relationship of objects in the game space, and the like. Then, the GPU 11*b* performs a rendering process of the game image in accordance with the notification, and the television 2 displays the game image. Subsequently, the processing returns to step S1.

In the time period of one frame described above, the processing is performed by using the route of step S60, S61, and S90 to S102. Accordingly, the game image generated in the present step S102 is a game image reflecting the process of step S97 (the process of causing, in the game space, the player object 101 to radially shoot the plurality of arrows using the inclined bow), and is expressed at the magnification of 1-fold (base magnification) (see FIG. 26).

Next, description is given on a case where it is determined, in step S94, that the moving amount indicated by the latest controller moving amount data 338 calculated in step S15 is less than the predetermined moving amount threshold value indicated by the moving amount threshold value data 342 (NO in step S94). In this case, the processing proceeds to step S103.

In step S103, the CPU 10 sets the magnification indicated by the magnification data 340 at 1-fold (base magnification).

Next, in step S104, the CPU 10 causes the player object 101 to return to its normal state where the player object 101 does not hold the bow and arrow ready to shoot in the game space. Subsequently, the processes of steps S99 to S102 are performed.

In the time period of one frame described above, the processing is performed by using the route of S60, S61, S90 to S94, S103, S104, and S99 to S102. Accordingly, the game image generated in the present step S102 is a game image reflecting the process of step S104 (the process of causing, in the game space, the player object 101 to return to its normal state where the player object 101 does not hold the bow and arrow ready to shoot). Also, the game image is expressed at the magnification of 1-fold (base magnification) set in step S103 (see FIG. 9).

Next, description is given on a case where it is determined, in step S93, that the A and B buttons are still in the state where they are both pressed (NO in step S93). In this case, the processing proceeds to step S100. In this case, the game image generated in step S102 is a game image reflecting the process of step S92 (the process of causing, in the game space, the bow held by the player object 101 to be inclined by the rotation angle θ). The magnification of the game image is the magnification calculated in step S60 (see FIG. 25).

Next, description is given on a case where it is determined, in step S6 in FIG. 17, that the A and B buttons are not in the state where they are both pressed (NO in step S6). In this case, the processing proceeds to step S103, and the processing is performed by using the route of step S103, S104, and S99 to S102. In this case, the game image generated in step S102 is a game image reflecting the process of step S104 (the process of causing, in the game space, the player object 101 to return to its normal state where the player object 101 does not hold the bow and arrow ready to shoot). Also, the game image is expressed at the magnification of 1-fold (base magnification) set in step S103 (see FIG. 9)

Next, a case where at least one of the markers 8L and 8R is not detected in step S3 in FIG. 17 (NO in step S3) will be described. In this case, the processing proceeds to step S100, and the processes of steps S100 to S102 are performed. The contents of the arrow-shooting operation of the game image generated in step S102 are the same as those of the image generated in the immediately preceding frame.

Next, a case where the process of step S32 in FIG. 17 is performed will be described. In this case, the processes of steps S100 to S102 are performed. The game image generated in step S102 indicates a state where the player object 101 is holding the bow but not drawing the bowstring, and is expressed at the magnification of 1-fold (base magnification).

It is noted that, with respect to the processing of the third embodiment described above, the processing relevant to the "straining value" described in the first embodiment may be added to the processing of the third embodiment, or a part of the processing of the third embodiment described above may be replaced with the processing relevant to the "straining value" described in the first embodiment. For example, the processing of preventing the arrows from being shot until the straining value becomes equal to or greater than the straining threshold value (see step S23 and the like in FIG. 18) may be added to the processing of the third embodiment. Moreover, the processing of causing the arrows to be shot at a speed corresponding to the straining value (see step S28 and S29 in FIG. 18) may be added.

Moreover, in the processing of the third embodiment described above, the speed at which the arrows are shot may be changed so as to correspond to the moving amount of the controller 7. Specifically, a process of determining the speed of arrows corresponding to the moving amount indicated by the latest controller moving amount data 338 calculated in step S15 in FIG. 17 may be added between the process of step S94 and the process of step S95 in FIG. 29. Then, in step S97, the arrows may be shot at the determined speed. In this case, in order to realize the above processing, there is further stored, in the data storage area 332 in FIG. 28, a moving amount and arrow speed table that associates the moving amount indicated by the controller moving amount data 338 with the speed of the arrows, and that indicates the relationship in which the speed of the arrows increases in accordance an increase of the moving amount indicated by the controller moving amount data 338. It is noted that the moving amount and arrow speed table may be replaced with a formula indicating a proportional relationship, and the like. Accordingly, the speed at which the arrows are shot can be changed in accordance with the distance by which the bow is drawn in the game space.

Moreover, the processing of setting one or more markings and of shooting, at one time, one or more tracking arrows as described in the second embodiment (see FIG. 24) may be added to the processing of the third embodiment described above.

As described above, in the third embodiment of the present invention, as in the first embodiment, enlargement/reduction of the game image is automatically performed in accordance with the arrow-shooting operation that is performed by the player and that is similar to the action of shooting an actual arrow. As a result, in the third embodiment of the present invention, as in the first embodiment, the player can play the game with a highly realistic feeling, without performing onerous operations.

Moreover, according to the third embodiment of the present invention, the player can cause, by inclining (rotating) the extended controller 36 held in the left hand, the bow held in the left hand of the player object 101 to be inclined. That is, the player can cause the bow to be inclined in the game space, by performing an operation similar to the action of inclining an actual bow. Then, the player can cause, by operating the controller 7, the player object 101 to shoot at one time a plurality of arrows in the direction in accordance with the inclination angle of the bow, and to attack the enemy objects using the plurality of arrows.

In the above, an example of a stationary game apparatus is described as the information processing apparatus of the present invention. However, the information processing apparatus of the present invention may be, for example, a hand-held game apparatus, a personal computer, a PDA, or the like.

In the above description with reference to FIG. 19 and FIG. 20, the moving distance of the controller 7 is calculated by calculating the distance between the controller 7 and the television 2 by using the image taken by the controller 7. However, the moving distance of the controller 7 may be calculated by using, for example, the acceleration data detected by the acceleration sensor 701 (see FIG. 7) included in the controller 7. Further, the moving distance of the controller 7 may be calculated by using, for example, an image of controller 7 taken by the camera provided outside the controller 7. In this case, the controller 7 is provided with a marker section.

In the second and third embodiments, whether or not to shoot an arrow is determined by determining whether or not the moving distance of the controller 7 is equal to or greater than a predetermined value (step S68 and the like in FIG. 24). However, whether or not to shoot an arrow may be determined by determining whether or not the moving speed of the controller 7 is equal to or greater than a predetermined value.

In the first embodiment, the speed of the arrow is increased in accordance with the straining value (see step S28 and S29 in FIG. 18). However, the speed of the arrow may be always constant regardless of the straining value.

In the first embodiment, the arrow is not shot until the straining value becomes equal to or greater than the straining threshold value (see step S23 in FIG. 18). However, the straining threshold value may not be provided, and the arrow can be shot regardless of the straining value.

In the above description, the bow is drawn in the game space in accordance with the operation of drawing the controller 7, whereby the game image is enlarged. However, the bow may be drawn in the game space in accordance with the operation of pushing forward the controller 7, whereby the magnification of the game image may be reduced (the image generated in accordance with the backward movement of the virtual camera in the game space). Further, the bow may be drawn in the game space in accordance with the operation of drawing the controller 7, whereby the magnification of the game image may be reduced. Further, the bow may be drawn in the game space in accordance with the operation of pushing out the controller 7, whereby the magnification of the game image may be increased.

In the second embodiment, the marking moves following the movement of the enemy object, and the tracking arrow is shot toward the position in the game space indicated by the marking. However, for example, the marking may not move following the movement of the enemy object, and the tracking arrow may fly toward the position in the game space indicated by the marking that does not move from the position at the time of setting thereof. For example, the marking may move following the movement of the enemy object until the tracking arrow is shot but may not move after the tracking arrow is shot, and then the tracking arrow may simply fly to the position in the game space indicated by the marking that does not move.

In the second embodiment, the marking is rendered in the game image so as to be seen by the player (see FIG. 21 and FIG. 22). However, the marking may not be rendered in the game image.

In the third embodiment, the bow is inclined by the player performing the operation of inclining (rotating) the extended controller 36. However, the bow may be inclined by the player performing the operation of inclining the controller 7. In this case, the inclination of the controller 7 is calculated by using the acceleration data detected by the acceleration sensor 701 of the controller 7.

In addition, the processing described above in the first to third embodiments may be combined.

As means for detecting the operation of inclining the extended controller 36, a gyro-sensor may be used instead of the acceleration sensor. Further, the inclination of the extended controller may be calculated by using the image of the extended controller 36 taken by the camera provided outside the extended controller 36.

In the above description, the player object 101 shoots the arrow when the player performs the operation of releasing at least one of the A and B buttons that have been pressed (for example, step S22 in FIG. 18). However, the player object 101 may shoot the arrow when the player performs the operation of releasing both of the A and B buttons that have been pressed.

In the above description, an exemplary case is described where the game image is rendered in a so-called third person viewpoint. However, the game image may be rendered in a so-called first person viewpoint.

In the exemplary case described above, the processing described above is performed in the game system 1 shown in FIG. 1. However, the processing described above may be shared by a plurality of apparatuses (or systems) that communicate with each other via a wired or wireless connection.

While the invention has been described in detail, the foregoing description is in all aspects illustrative and not restrictive. It is understood that numerous other modifications and variations can be devised without departing from the scope of the invention.

What is claimed is:

1. A non-transitory computer-readable storage medium having stored therein an information processing program to be executed by a computer of an information processing apparatus that comprises a first input device having at least one operation key, the information processing program comprising instructions that cause the computer to:
   display an image on a display device at a first magnification;
   determine an input state of the at least one operation key;
   obtain movement information of the first input device;
   enlarge or reduce the displayed image from the first magnification to a second magnification that is different from the first magnification in accordance with a change of the obtained movement information during a time period in which the at least one operation key is determined to be in a predetermined input state;
   cause the enlarged or reduced displayed image that is being displayed at the second magnification to return to the first magnification in accordance with cancelation of the predetermined input state of the at least one operation key;
   measure the time period in which the at least one operation key is determined to continuously be in the predetermined input state;
   determine whether or not the time period is equal to or greater than a first threshold value, and
   when it is determined that the predetermined input state is canceled and when it is determined that the time period is equal to or greater than the first threshold value, cause the enlarged or reduced displayed image to return to the first magnification and
   control an action of at least one first object that is included in the displayed image.

2. A non-transitory computer-readable storage medium having stored therein an information processing program to be executed by a computer of an information processing apparatus that comprises a first input device having at least one operation key, the information processing program comprising instructions that cause the computer to:
   display an image on a display device at a first magnification;
   determine an input state of the at least one operation key;
   obtain movement information of the first input device;
   enlarge or reduce the displayed image from the first magnification to a second magnification that is different from the first magnification in accordance with a change of the obtained movement information during a time period in which the at least one operation key is determined to be in a predetermined input state;
   cause the enlarged or reduced displayed image that is being displayed at the second magnification to return to the first magnification in accordance with cancelation of the predetermined input state of the at least one operation key;
   control an action of at least one first object that is included in the displayed image; and
   measure the time period in which the at least one operation key is determined to continuously be in the predetermined input state, the displayed image is enlarged or reduced to the second magnification at a rate in accordance with the time period.

3. The non-transitory computer-readable storage medium of claim 2, wherein the information processing program further causes the computer to:
   calculate, based on the movement information, a moving amount at least in a predetermined direction of a movement of the first input device since a time point when the at least one operation key has entered the predetermined input state, the time period has an upper limit value, the upper limit value is determined so as to increase in accordance with an increase of the moving amount, and
   when the time period exceeds the upper limit value, the time period is set at the upper limit value.

4. The non-transitory computer-readable storage medium of claim 3, wherein when the moving amount is reduced and the time period has exceeded the upper limit value corresponding to the reduced moving amount, the time period is set at the upper limit value corresponding to the reduced moving amount.

5. The non-transitory computer-readable storage medium of claim 2, wherein the information processing program further causes the computer to:

determine, based on the time period, a moving speed of the at least one first object, and control, at the moving speed, a movement of the at least one first object.

6. A non-transitory computer-readable storage medium having stored therein an information processing program to be executed by a computer of an information processing apparatus that comprises a first input device having at least one operation key, the information processing program comprising instructions that cause the computer to:

display an image on a display device at a first magnification;

determine an input state of the at least one operation key;

obtain movement information of the first input device;

enlarge or reduce the displayed image from the first magnification to a second magnification that is different from the first magnification in accordance with a change of the obtained movement information during a time period in which the at least one operation key is determined to be in a predetermined input state;

cause the enlarged or reduced displayed image that is being displayed at the second magnification to return to the first magnification in accordance with cancelation of the predetermined input state of the at least one operation key;

calculate, based on the movement information, a moving amount at least in a predetermined direction of a movement of the first input device since a time point when the at least one operation key has entered the predetermined input state;

determine whether or not the moving amount is equal to or greater than a second threshold value, and when it is determined that the predetermined input state is canceled and when it is determined that the moving amount is equal to or greater than the second threshold value, cause the enlarged or reduced displayed image to return to the first magnification and control an action of at least one first object that is included in the displayed image.

7. A non-transitory computer-readable storage medium having stored therein an information processing program to be executed by a processing system of a game apparatus that comprises a first input device having at least one operation key and that generates a game image, the information processing program including instructions that are, when executed by the processing system, configured to cause the game apparatus to: display the game image at a first magnification; determine an input state of the at least one operation key; obtain movement information of the first input device;

enlarge or reduce the game image from the first magnification to a second and different magnification in accordance with a change of the movement information during a time period in which the at least one operation key is determined to be in a predetermined input state;

cause the enlarged or reduced game image that is displayed at the second magnification to return to the first magnification of the game image in accordance with cancelation of the predetermined input state of the at least one operation key;

control a shooting of at least one arrow object in the game image;

measure the time period in which the at least one operation key is determined to continuously be in a predetermined input state; and determine whether or not the time period is equal to or greater than a first threshold value, and cause the enlarged or reduced game image to return to the first magnification of in accordance with determination that the predetermined input state is canceled and when the time period is equal to or greater than the first threshold value.

* * * * *